United States Patent
Yang et al.

(10) Patent No.: US 12,198,300 B2
(45) Date of Patent: Jan. 14, 2025

(54) COMPUTATIONAL REFOCUSING-ASSISTED DEEP LEARNING

(71) Applicants: California Institute of Technology, Pasadena, CA (US); Washington University, Saint Louis, MO (US)

(72) Inventors: Changhuei Yang, South Pasadena, CA (US); Cheng Shen, Pasadena, CA (US); Richard J. Cote, Los Angeles, CA (US); Siddarth Rawal, St. Louis, MO (US)

(73) Assignees: California Institute of Technology, Pasadena, CA (US); Washington University, St. Louis, MO (US)

( * ) Notice: Subject to any disclaimer, the term of this patent is extended or adjusted under 35 U.S.C. 154(b) by 250 days.

(21) Appl. No.: 17/652,667

(22) Filed: Feb. 25, 2022

(65) Prior Publication Data

US 2022/0351347 A1  Nov. 3, 2022

Related U.S. Application Data

(60) Provisional application No. 63/153,736, filed on Feb. 25, 2021.

(51) Int. Cl.
*G06T 5/50* (2006.01)
*G06T 7/00* (2017.01)

(52) U.S. Cl.
CPC .............. *G06T 5/50* (2013.01); *G06T 7/0012* (2013.01); *G06T 2207/10056* (2013.01);
(Continued)

(58) Field of Classification Search
CPC ......... G01N 21/6458; G02B 2207/129; G06V 20/69; G06T 2207/20081; G06T 2207/20084; G06F 18/214; G06N 3/088
See application file for complete search history.

(56) References Cited

U.S. PATENT DOCUMENTS 4,873,653 A   10/1989  Grosskopf
4,917,494 A    4/1990  Poole et al.
(Continued)

FOREIGN PATENT DOCUMENTS

CA   3210010 A1 *  9/2022  ........ B01L 3/502715
CN   1688254 A     10/2005
(Continued)

OTHER PUBLICATIONS

Wu, Yichen, et al. "Three-dimensional virtual refocusing of fluorescence microscopy images using deep learning." Nature methods 16.12 (2019): 1323-1331. (Year: 2019).*

(Continued)

*Primary Examiner* — Michael Robert Cammarata
(74) *Attorney, Agent, or Firm* — Brian T. Hahn; Weaver Austin Villeneuve & Sampson LLP

(57) ABSTRACT

Computational refocusing-assisted deep learning methods, apparatus, and systems are described. In certain pathology examples, a representative image is generated using a machine learning model trained with uniformly focused training images generated by a Fourier ptychographic digital refocusing procedure and abnormalities are automatedly identified and/or enumerated based on the representative image.

31 Claims, 19 Drawing Sheets

(52) U.S. Cl.
CPC ........... *G06T 2207/20081* (2013.01); *G06T 2207/20084* (2013.01); *G06T 2207/30024* (2013.01); *G06T 2207/30096* (2013.01)

(56) References Cited

U.S. PATENT DOCUMENTS

| | | | |
|---|---|---|---|
| 5,475,527 A | 12/1995 | Hackel et al. | |
| 6,144,365 A | 11/2000 | Young et al. | |
| 6,154,196 A | 11/2000 | Fleck et al. | |
| 6,320,174 B1 | 11/2001 | Tafas et al. | |
| 6,320,648 B1 | 11/2001 | Brueck et al. | |
| 6,747,781 B2 | 6/2004 | Trisnadi | |
| 6,759,949 B2 | 7/2004 | Miyahara | |
| 6,905,838 B1 | 6/2005 | Bittner | |
| 7,436,503 B1 | 10/2008 | Chen et al. | |
| 7,460,248 B2 | 12/2008 | Kurtz et al. | |
| 7,706,419 B2 | 4/2010 | Wang et al. | |
| 7,738,095 B2 | 6/2010 | Gardner, Jr. et al. | |
| 7,787,588 B1 | 8/2010 | Yun et al. | |
| 8,271,251 B2 | 9/2012 | Schwartz et al. | |
| 8,313,031 B2 | 11/2012 | Vinogradov | |
| 8,497,934 B2 | 7/2013 | Milnes et al. | |
| 8,624,968 B1 | 1/2014 | Hersee et al. | |
| 8,654,201 B2 | 2/2014 | Lim et al. | |
| 8,942,449 B2 | 1/2015 | Maiden | |
| 9,029,745 B2 | 5/2015 | Maiden | |
| 9,182,387 B2* | 11/2015 | Goldkorn | G01N 1/4077 |
| 9,343,494 B2 | 5/2016 | Lee et al. | |
| 9,426,455 B2 | 8/2016 | Horstmeyer et al. | |
| 9,497,379 B2 | 11/2016 | Ou et al. | |
| 9,739,783 B1* | 8/2017 | Kumar | G01N 33/57449 |
| 9,829,695 B2 | 11/2017 | Kim et al. | |
| 9,864,184 B2* | 1/2018 | Ou | G02B 21/367 |
| 9,892,812 B2 | 2/2018 | Zheng et al. | |
| 9,983,397 B2 | 5/2018 | Horstmeyer et al. | |
| 9,993,149 B2 | 6/2018 | Chung et al. | |
| 9,998,658 B2 | 6/2018 | Ou et al. | |
| 10,162,161 B2 | 12/2018 | Horstmeyer et al. | |
| 10,168,525 B2 | 1/2019 | Kim et al. | |
| 10,222,605 B2 | 3/2019 | Kim et al. | |
| 10,228,550 B2 | 3/2019 | Ou et al. | |
| 10,401,609 B2 | 9/2019 | Ou et al. | |
| 10,419,665 B2 | 9/2019 | Ou et al. | |
| 10,568,507 B2 | 2/2020 | Chung et al. | |
| 10,572,996 B2* | 2/2020 | Eurèn | G06F 18/214 |
| 10,606,055 B2 | 3/2020 | Horstmeyer et al. | |
| 10,652,444 B2 | 5/2020 | Horstmeyer et al. | |
| 10,665,001 B2* | 5/2020 | Horstmeyer | G02B 21/365 |
| 10,679,763 B2 | 6/2020 | Zheng et al. | |
| 10,684,458 B2 | 6/2020 | Chung et al. | |
| 10,718,934 B2 | 7/2020 | Horstmeyer et al. | |
| 10,732,396 B2 | 8/2020 | Kim et al. | |
| 10,740,896 B2* | 8/2020 | Georgescu | G06N 20/00 |
| 10,754,138 B2 | 8/2020 | Kim et al. | |
| 10,754,140 B2 | 8/2020 | Chan et al. | |
| 11,092,795 B2 | 8/2021 | Chung et al. | |
| 11,385,450 B2 | 7/2022 | Kwon et al. | |
| 11,468,557 B2 | 10/2022 | Ou et al. | |
| 11,893,739 B2* | 2/2024 | Ozcan | G06N 3/08 |
| 11,915,360 B2* | 2/2024 | Ozcan | G06F 18/214 |
| 2001/0055062 A1 | 12/2001 | Shioda et al. | |
| 2002/0141051 A1 | 10/2002 | Vogt et al. | |
| 2003/0116436 A1 | 6/2003 | Amirkhanian et al. | |
| 2003/0118223 A1 | 6/2003 | Rahn et al. | |
| 2004/0057094 A1 | 3/2004 | Olszak et al. | |
| 2004/0146196 A1 | 7/2004 | Van Heel | |
| 2004/0190762 A1 | 9/2004 | Dowski, Jr. et al. | |
| 2005/0211912 A1 | 9/2005 | Fox | |
| 2006/0098293 A1 | 5/2006 | Garoutte et al. | |
| 2006/0158754 A1 | 7/2006 | Tsukagoshi et al. | |
| 2006/0173313 A1 | 8/2006 | Liu et al. | |
| 2006/0291707 A1 | 12/2006 | Kothapalli et al. | |
| 2007/0057184 A1 | 3/2007 | Uto et al. | |
| 2007/0133113 A1 | 6/2007 | Minabe et al. | |
| 2007/0159639 A1 | 7/2007 | Teramura et al. | |
| 2007/0171430 A1 | 7/2007 | Tearney et al. | |
| 2007/0189436 A1 | 8/2007 | Goto et al. | |
| 2007/0206200 A1 | 9/2007 | Lindner et al. | |
| 2007/0269826 A1 | 11/2007 | Geddes | |
| 2008/0101664 A1 | 5/2008 | Perez | |
| 2008/0182336 A1 | 7/2008 | Zhuang et al. | |
| 2008/0192343 A1 | 8/2008 | Miyawaki et al. | |
| 2008/0205833 A1 | 8/2008 | Fu et al. | |
| 2009/0008580 A1 | 1/2009 | Luberek | |
| 2009/0046164 A1 | 2/2009 | Shroff et al. | |
| 2009/0079987 A1 | 3/2009 | Ben-Ezra et al. | |
| 2009/0125242 A1 | 5/2009 | Choi et al. | |
| 2009/0284831 A1 | 11/2009 | Schuster et al. | |
| 2009/0316141 A1 | 12/2009 | Feldkhun | |
| 2010/0135547 A1 | 6/2010 | Lee et al. | |
| 2010/0271705 A1 | 10/2010 | Hung | |
| 2011/0075928 A1 | 3/2011 | Jeong et al. | |
| 2011/0181869 A1 | 7/2011 | Yamaguchi et al. | |
| 2011/0192976 A1 | 8/2011 | Own et al. | |
| 2011/0235863 A1 | 9/2011 | Maiden | |
| 2011/0255163 A1 | 10/2011 | Merrill et al. | |
| 2012/0069344 A1 | 3/2012 | Liu | |
| 2012/0099803 A1 | 4/2012 | Ozcan et al. | |
| 2012/0105618 A1 | 5/2012 | Brueck et al. | |
| 2012/0118967 A1 | 5/2012 | Gerst, III et al. | |
| 2012/0157160 A1 | 6/2012 | Ozcan et al. | |
| 2012/0176673 A1 | 7/2012 | Cooper | |
| 2012/0182541 A1 | 7/2012 | Canham | |
| 2012/0218379 A1 | 8/2012 | Ozcan et al. | |
| 2012/0248292 A1 | 10/2012 | Ozcan et al. | |
| 2012/0250032 A1 | 10/2012 | Wilde et al. | |
| 2012/0281929 A1 | 11/2012 | Brand et al. | |
| 2013/0057748 A1 | 3/2013 | Duparre et al. | |
| 2013/0083886 A1 | 4/2013 | Carmi et al. | |
| 2013/0093871 A1 | 4/2013 | Nowatzyk et al. | |
| 2013/0094077 A1 | 4/2013 | Brueck et al. | |
| 2013/0100525 A1 | 4/2013 | Chiang et al. | |
| 2013/0170767 A1 | 7/2013 | Choudhury et al. | |
| 2013/0182096 A1 | 7/2013 | Boccara et al. | |
| 2013/0223685 A1 | 8/2013 | Maiden | |
| 2013/0321908 A1 | 12/2013 | Babacan et al. | |
| 2014/0007307 A1 | 1/2014 | Routh, Jr. et al. | |
| 2014/0029824 A1 | 1/2014 | Shi et al. | |
| 2014/0043616 A1 | 2/2014 | Maiden et al. | |
| 2014/0049817 A1 | 2/2014 | Yang | |
| 2014/0050382 A1 | 2/2014 | Adie et al. | |
| 2014/0085629 A1 | 3/2014 | Bodkin et al. | |
| 2014/0118529 A1* | 5/2014 | Zheng | G21K 7/00 348/80 |
| 2014/0126691 A1 | 5/2014 | Zheng et al. | |
| 2014/0133702 A1 | 5/2014 | Zheng et al. | |
| 2014/0139840 A1 | 5/2014 | Judkewitz et al. | |
| 2014/0152801 A1 | 6/2014 | Fine et al. | |
| 2014/0153692 A1 | 6/2014 | Larkin et al. | |
| 2014/0160236 A1 | 6/2014 | Ozcan et al. | |
| 2014/0160488 A1 | 6/2014 | Zhou | |
| 2014/0217268 A1 | 8/2014 | Schleipen et al. | |
| 2014/0267674 A1 | 9/2014 | Mertz et al. | |
| 2014/0347672 A1 | 11/2014 | Pavillon et al. | |
| 2014/0368812 A1 | 12/2014 | Humphry et al. | |
| 2015/0003714 A1 | 1/2015 | McCarty et al. | |
| 2015/0036038 A1 | 2/2015 | Horstmeyer et al. | |
| 2015/0044098 A1 | 2/2015 | Smart et al. | |
| 2015/0054979 A1 | 2/2015 | Ou et al. | |
| 2015/0160450 A1* | 6/2015 | Ou | G02B 21/365 348/80 |
| 2015/0264250 A1 | 9/2015 | Ou et al. | |
| 2015/0286042 A1 | 10/2015 | Hilbert et al. | |
| 2015/0331228 A1 | 11/2015 | Horstmeyer et al. | |
| 2016/0088205 A1 | 3/2016 | Horstmeyer et al. | |
| 2016/0110584 A1 | 4/2016 | Remiszewski et al. | |
| 2016/0156880 A1 | 6/2016 | Teich et al. | |
| 2016/0178883 A1 | 6/2016 | Horstmeyer et al. | |
| 2016/0202460 A1 | 7/2016 | Zheng | |
| 2016/0210763 A1 | 7/2016 | Horstmeyer et al. | |
| 2016/0216208 A1 | 7/2016 | Kim et al. | |
| 2016/0216503 A1 | 7/2016 | Kim et al. | |
| 2016/0266366 A1 | 9/2016 | Chung et al. | |
| 2016/0320595 A1 | 11/2016 | Horstmeyer et al. | |

(56) References Cited

U.S. PATENT DOCUMENTS

| | | | |
|---|---|---|---|
| 2016/0320605 A1 | 11/2016 | Ou et al. | |
| 2016/0341945 A1 | 11/2016 | Ou et al. | |
| 2017/0061599 A1 | 3/2017 | Remiszewski et al. | |
| 2017/0146788 A1 | 5/2017 | Waller et al. | |
| 2017/0178317 A1 | 6/2017 | Besley et al. | |
| 2017/0188853 A1 | 7/2017 | Nakao et al. | |
| 2017/0273551 A1 | 9/2017 | Chung et al. | |
| 2017/0299854 A1 | 10/2017 | Kim et al. | |
| 2017/0354329 A1 | 12/2017 | Chung et al. | |
| 2017/0363853 A1 | 12/2017 | Besley | |
| 2017/0371141 A1 | 12/2017 | Besley | |
| 2017/0372471 A1* | 12/2017 | Eurèn | G06F 18/214 |
| 2018/0045569 A1 | 2/2018 | Nath et al. | |
| 2018/0048811 A1 | 2/2018 | Waller et al. | |
| 2018/0078447 A1 | 3/2018 | Viner et al. | |
| 2018/0078448 A9 | 3/2018 | Shockley, Jr. et al. | |
| 2018/0088309 A1 | 3/2018 | Ou et al. | |
| 2018/0120553 A1 | 5/2018 | Leshem et al. | |
| 2018/0191948 A1 | 7/2018 | Zheng | |
| 2018/0231761 A1 | 8/2018 | Dai et al. | |
| 2018/0232883 A1 | 8/2018 | Sethi et al. | |
| 2018/0307017 A1 | 10/2018 | Horstmeyer et al. | |
| 2018/0316855 A1 | 11/2018 | Ou et al. | |
| 2018/0329194 A1 | 11/2018 | Small et al. | |
| 2018/0348500 A1 | 12/2018 | Naaman, III et al. | |
| 2018/0373016 A1 | 12/2018 | Leshem, III et al. | |
| 2019/0049712 A1 | 2/2019 | Kim et al. | |
| 2019/0056578 A1 | 2/2019 | Horstmeyer et al. | |
| 2019/0077610 A1 | 3/2019 | Flammann | |
| 2019/0097523 A1 | 3/2019 | Schaefer | |
| 2019/0097524 A1 | 3/2019 | Lin | |
| 2019/0137753 A1 | 5/2019 | Chan et al. | |
| 2019/0206056 A1 | 7/2019 | Georgescu et al. | |
| 2019/0244347 A1 | 8/2019 | Buckler et al. | |
| 2019/0317311 A1 | 10/2019 | Kim et al. | |
| 2019/0331902 A1 | 10/2019 | Ou et al. | |
| 2019/0391382 A1 | 12/2019 | Chung et al. | |
| 2020/0124691 A1 | 4/2020 | Douglas et al. | |
| 2020/0186705 A1 | 6/2020 | Ou et al. | |
| 2020/0294231 A1* | 9/2020 | Tosun | G06V 20/69 |
| 2020/0351454 A1 | 11/2020 | Wu et al. | |
| 2020/0371335 A1* | 11/2020 | Amthor | G06T 7/60 |
| 2021/0018742 A1 | 1/2021 | Stumpe | |
| 2021/0082595 A1 | 3/2021 | Zheng et al. | |
| 2021/0164883 A1* | 6/2021 | Imakubo | G01N 15/1436 |
| 2021/0164886 A1* | 6/2021 | Shirai | G06V 20/69 |
| 2021/0349075 A1* | 11/2021 | Bronevetsky | G01N 33/505 |
| 2022/0028116 A1* | 1/2022 | Sieckmann | H04N 23/67 |
| 2022/0058776 A1* | 2/2022 | Ozcan | G06T 3/4046 |
| 2022/0122313 A1* | 4/2022 | Ozcan | G02B 21/367 |
| 2022/0254538 A1 | 8/2022 | Zheng et al. | |
| 2023/0014453 A1 | 1/2023 | Lee et al. | |
| 2023/0030424 A1* | 2/2023 | Ozcan | G06F 18/24137 |
| 2023/0055979 A1 | 2/2023 | Wang et al. | |
| 2023/0085827 A1* | 3/2023 | Ozcan | G06N 3/08 348/79 |
| 2023/0098031 A1* | 3/2023 | Weissleder | C07D 209/14 435/7.23 |
| 2024/0354942 A1 | 10/2024 | Yang et al. | |

FOREIGN PATENT DOCUMENTS

| | | |
|---|---|---|
| CN | 1932565 A | 3/2007 |
| CN | 1311392 C | 4/2007 |
| CN | 101372179 A | 2/2009 |
| CN | 101408623 A | 4/2009 |
| CN | 101680848 A | 3/2010 |
| CN | 101726366 A | 6/2010 |
| CN | 101743519 A | 6/2010 |
| CN | 101868740 A | 10/2010 |
| CN | 101872033 A | 10/2010 |
| CN | 101957183 A | 1/2011 |
| CN | 102292662 A | 12/2011 |
| CN | 102608597 A | 7/2012 |
| CN | 102629371 A | 8/2012 |
| CN | 102652680 A | 9/2012 |
| CN | 102753935 A | 10/2012 |
| CN | 103096804 A | 5/2013 |
| CN | 103154662 A | 6/2013 |
| CN | 103201648 A | 7/2013 |
| CN | 103377746 A | 10/2013 |
| CN | 103842799 A | 6/2014 |
| CN | 104101993 A | 10/2014 |
| CN | 104181686 A | 12/2014 |
| CN | 104200449 A | 12/2014 |
| EP | 1640706 A1 | 3/2006 |
| EP | 0760109 B1 | 4/2007 |
| EP | 2703871 A2 | 3/2014 |
| JP | 2002163660 A | 6/2002 |
| JP | 2007299604 A | 11/2007 |
| JP | 2008147629 A | 6/2008 |
| JP | 2010012222 A | 1/2010 |
| KR | 19980075050 A | 11/1998 |
| TW | 201428339 A | 7/2014 |
| WO | WO-9628751 A1 | 9/1996 |
| WO | WO-9953469 A1 | 10/1999 |
| WO | WO-02102128 A1 | 12/2002 |
| WO | WO-03062744 A1 | 7/2003 |
| WO | WO-2004034121 A2 | 4/2004 |
| WO | WO-2008017076 A2 | 2/2008 |
| WO | WO-2008116070 A2 | 9/2008 |
| WO | WO-2009141467 A1 * | 11/2009 ........... G02B 21/241 |
| WO | WO-2011093043 A1 | 8/2011 |
| WO | WO-2012037182 A1 | 3/2012 |
| WO | WO-2014033459 A1 | 3/2014 |
| WO | WO-2014070656 A1 | 5/2014 |
| WO | WO-2015017730 A1 | 2/2015 |
| WO | WO-2015027188 A1 | 2/2015 |
| WO | WO-2015069827 A2 | 5/2015 |
| WO | WO-2016090331 A1 | 6/2016 |
| WO | WO-2016106379 A1 | 6/2016 |
| WO | WO-2016118761 A1 | 7/2016 |
| WO | WO-2016123156 A1 | 8/2016 |
| WO | WO-2016123157 A1 | 8/2016 |
| WO | WO-2016149120 A1 | 9/2016 |
| WO | WO-2016187591 A1 | 11/2016 |
| WO | WO-2017066198 A1 | 4/2017 |
| WO | WO-2017081539 A1 | 5/2017 |
| WO | WO-2017081540 A1 | 5/2017 |
| WO | WO-2017081542 A2 | 5/2017 |
| WO | WO-2022132496 A1 | 6/2022 |

OTHER PUBLICATIONS

Luo, Yilin, et al. "Single-shot autofocusing of microscopy images using deep learning." ACS Photonics 8.2 (2021): 625-638. (Year: 2021).*

Abadi, Martin, et al, "Tensorflow: Large-scale machine learning on heterogeneous distributed systems" arXiv preprint, 2016. arXiv:1603.04467.

About Molemap, About US-Skin Cancer Mole Check NZ, pp. 1-2. [retrieved Oct. 23, 2015 ] URL:http://molemap.net.au/about-us/.

Abrahamsson, S., et al., "Fast multicolor 3D imaging using aberration-corrected mulitfocus microscopy," Brief Communications: Nature Methods, vol. 10, No. 1, Jan. 2013, pp. 60-65. doi:10.1038/nmeth.2277.

Abramowitz, M., et al, "Field Curvature," Olympus Microscopy Resource Center, 2012 Olympus America Inc., pp. 1-3. [retrieved on Feb. 24, 2016] URL:http://www.olympusmicro.com/primer/anatomy/fieldcurvature.html.

Abramowitz, M. et al, "Immersion Media," Olympus Microscopy Resource Center: Microscope Optical Components, Published 2012, pp. 1-6.[retrieved on Feb. 6, 2012] URL: http://www.olympusmicro.com/primer/anatomy/immersion.html.

Adie, et al., "Computational adaptive optics for broadband optical interferometric tomography of biological tissue," Proc. Natl. Acad. Sci. USA 109, 7175-7180 (May 8, 2012).

Age-Related Macular Degeneration (AMD) | National Eye Institute. 2010 Table, pp. 1-8. [retrieved Apr. 5, 2016] URL: https://www.nei.nih.gov/eyedata/amd#top.

(56) References Cited

OTHER PUBLICATIONS

Alexandrov, S., et al, "Spatial information transmission beyond a system's diffraction limit using optical spectral encoding of the spatial frequency," Journal of Optics A: Pure and Applied Optics 10, Feb. 4, 2008, 025304, pp. 1-5. doi:10.1088/1464-4258/10/2/025304 [retrieved Dec. 2, 2015] URL: http://www.stacks.iop.org/JOptA/10/025304.

Alexandrov, S.A., et al, "Synthetic Aperture Fourier Holographic Optical Microscopy," Physical Review Letters, vol. 97, No. 16, Oct. 20, 2006, pp. 168102-1-168102-4. doi: 0.1103/PhysRevLett.97.168102.

Aresta et al., "Bach: Grand challenge on breast cancer histology images" Medical image analysis. Aug. 1, 2019;56:122-39.

Arimoto, H., et al, "Integral three-dimensional imaging with digital reconstruction," Optics Letters, Optical Society of America, Feb. 1, 2001, vol. 26, No. 3, pp. 157-159. doi: 10.1364/OL.26.000157.

Australian Examination Report No. 1, dated Jan. 18, 2018 issued in Application No. AU 2014308673.

Australian Office Action dated Sep. 18, 2017 issued in Application No. AU 2014296034.

Bach, ICIAR 2018 Grand Challenge on Breast Cancer Histology images, "Home", [Webpage] as retrieved from the internet on Jun. 2, 2022. URL: https://iciar2018-challenge.grand-challenge.org/.

Balan, R., et al, "On signal reconstruction without phase," Applied and Computational Harmonic Analysis, vol. 20, Issue 3, May 2006, pp. 345-356. doi:10.1016/j.acha.2005.07.001.

Balan, R., et al, "Painless Reconstruction from Magnitudes of Frame Coefficients," Journal Fourier Analysis and Applications, vol. 15, Issue 4, Mar. 25, 2009, pp. 488-501. doi:10.1007/s00041-009-9065-1.

Bauschke, H., et al, "Phase retrieval, error reduction algorithm, and Fienup variants: a view from convex optimization," Journal of the Optical Society America, A., vol. 19, No. 7, Jul. 2002, pp. 1334-1345. doi: 10.1364/JOSAA.19.001334.

Becker, S.R., et al, "Templates for Convex Cone Problems with Applications to Sparse Signal Recovery," Mathematical Programming Computation, Sep. 2010, vol. 3, No. 3, pp. 1-49. doi: 10.1007/s12532-011-0029-5.

BenTaieb A., et al., "Deep learning models for digital pathology", arXiv preprint arXiv:1910.12329, (Oct. 27, 2019).

Betti, R., et al, "Observational study on the mitotic rate and other prognostic factors in cutaneous primary melanoma arising from naevi and from melanoma de novo," Journal of the European Academy of Dermatology and Venereology (JEADV), Dec. 2014, vol. 28, No. 12, pp. 1738-1741. doi: 10.1111/jdv.12395.

Bian, et al., "Content adaptive illumination for Fourier ptychography," Optics Letters, vol. 39, Aug. 2014, pp. 1-6.

Bian, L., et al, "Fourier ptychographic reconstruction using Poisson maximum likelihood and truncated Wirtinger gradient," Nature Publishing Group; Scientific Reports, vol. 6, No. 27384, Jun. 10, 2016, pp. 1-10. doi: 10.1038/srep27384.

Bian, L., et al, "Fourier ptychographic reconstruction using Wirtinger flow optimization," Optics Express, vol. 23, No. 4, Feb. 23, 2015, pp. 4856-4866. doi: 10.1364/OE.23.004856.

Bian, Z., et al, "Adaptive system correction for robust Fourier ptychographic imaging," Optics express, Dec. 30, 2013, vol. 21, No. 26, pp. 32400-32410. doi: 10.1364/OE.21.032400.

BioTek® Brochure: BioTek's Multi-Mode Microplate Reading Technologies, BioTek Instruments, Inc. pp. 2. [retrieved on Mar. 14, 2016] URL: http://www.biotek.com.

Bioucas-Dias, et al., "Total variation-based image deconvolution: a majorization-minimization approach," ICASSP (2), pp. 861-864 (May 14, 2006).

Bishara, W., et al, "Holographic pixel super-resolution in portable lensless on-chip microscopy using a fiber-optic array," NIH-PA, Lab Chip, Author manuscript; available in PMC Aug. 8, 2011, pp. 1-9. (Published in final edited form as: Lab Chip. Apr. 7, 2011; 11(7): 1276-1279. doi:10.1039/c01c00684j).

Bishara W., et al., "Lensfree On-Chip Microscopy Over a Wide Field-of-View using Pixel Super-Resolution," Optics Express, May 24, 2010, vol. 18(11), pp. 11181-11191.

Blum, A., et al, "Clear differences in hand-held dermoscopes," Journal der Deutschen Dermatologischen Gesellschaft (JDDG); Case Reports, Dec. 2006, vol. 4, No. 12, pp. 1054-1057. doi:10.1111/j.1610-0387.2006.06128.x.

Blum, A., et al, "Dermatoskopisch sichtbare Strukturen," Chapter 4.1 Grundlagen, Dermatoskopie von Hauttumoren: Auflichtmikroskopie; Dermoskopie; Digitale Bildanalyse; mit 28 Tabellen. Springer-Verlag Berlin Heidelberg 2003, pp. 15-66. (English Translation of Summary) doi: 10.1007/978-3-642-57446-7_4.

Booth, "Adaptive optical microscopy: the ongoing quest for a perfect image," Light Sci. Appl. 3, e165 (Apr. 25, 2014).

Born, M., et al, "Principles of Optics: Electromagnetic theory of propagation, interference and diffraction of light," Seventh (Expanded) Edition, Cambridge University Press, England 1999, pp. 1-31. [ISBN 0 521 642221 hardback].

Brady, D. et al., "Multiscale gigapixel photography," Nature, vol. 486, Jun. 21, 2012, pp. 386-389. doi:10.1038/nature11150.

Bunk, O., et al, "Influence of the overlap parameter on the convergence of the ptychographical iterative engine," Ultramicroscopy, vol. 108, (2008), pp. 481-487. doi:10.1016/j.ultramic.2007.08.003.

Burer, S., et al, "A nonlinear programming algorithm for solving semidefinite programs via low-rank factorization," Mathematical Programming, Series B., vol. 95, No. 2, Feb. 2003, pp. 329-357. doi:10.1007/s10107-002-0352-8.

Burer, S., et al, "Local Minima and Convergence in Low-Rank Semidefinite Programming," Mathematical Programming, Series A., vol. 103, No. 3, Jul. 1, 2005, pp. 427-444. doi:10.1007/s10107-004-0564-1.

Candes, E.J., et al, "Phase Retrieval via Wirtinger Flow: Theory and Algorithms," IEEE Transaction On Information Theory, vol. 61, No. 4, Apr. 2015, pp. 1985-2007. doi: 10.1109/TIT.2015.2399924.

Candes, E.J., et al, pre-published manuscript of "Phase Retrieval via Matrix Completion," ArXiv e-prints, 24 pages (Submitted on Sep. 2, 2011 (v1), last revised Sep. 20, 2011 (this version, v2)). [retrieved Nov. 9, 2015] URL: arXiv:1109.0573v2 [cs.IT] Sep. 20, 2011.

Candes, E.J., et al, pre-published Manuscript of "PhaseLift: Exact and Stable Signal Recovery from Magnitude Measurements via Convex Programming," ArXiv e-prints, 31 pages (Submitted Sep. 2011 (v1)). [retrieved Nov. 9, 2015] URL: arXiv:1109.4499v1 [cs.IT] Sep. 21, 2011.

Carroll, J., "Adaptive Optics Retinal Imaging: Applications for Studying Retinal Degeneration," Archives of Ophthalmology, vol. 126, No. 6, Jun. 9, 2008, pp. 857-858. [retrieved Feb. 24, 2016] doi:10.1001/archopht.126.6.857.

Chai, A., et al, "Array imaging using intensity-only measurements," IOP Publishing: Inverse Problems, vol. 27, No. 1, Jan. 2011, pp. 1-16. doi:10.1088/0266-5611/27/1/015005.

Chao, W. et al, "Soft X-ray microscopy at a spatial resolution better than 15 nm," Nature Letters, vol. 435, Jun. 30, 2005, pp. 1210-1213. doi:10.1038/nature03719.

Chen, T., et al, "Polarization and Phase-Shifting for 3D Scanning of Translucent Objects," 2007 IEEE Conference on Computer Vision and Pattern Recognition; on Jun. 17-22, 2007, pp. 1-8. doi:10.1109/CVPR.2007.383209.

Chin, L., et al, "Malignant melanoma: genetics and therapeutics in the genomic era," CSH Press: Genes & Development, Aug. 15, 2006, vol. 20, pp. 2149-2182. doi: 10.1101/gad.1437206 [retrieved Sep. 9, 2015] URL:http://genesdev.cshlp.org/content/20/16/2149.

Chinese First Office Action dated Apr. 16, 2020 issued in Application No. CN 201810576437.8.

Chinese First Office Action dated Apr. 19, 2019 issued in Application No. CN 201680006738.6.

Chinese First Office Action dated Apr. 19, 2019 issued in Application No. CN 201680014898.5.

Chinese First Office Action dated Aug. 2, 2017 issued in Application No. CN 201480054301.0.

Chinese First Office Action dated Dec. 13, 2016 issued in Application No. CN201480057911.6.

Chinese First Office Action dated Dec. 26, 2018 issued in Application No. CN 201580067354.0.

(56) References Cited

OTHER PUBLICATIONS

Chinese First Office Action dated Dec. 28, 2018 issued in Application No. CN 201680005491.6.
Chinese First Office Action dated Feb. 24, 2018 issued in CN 201680003937.1.
Chinese First Office Action dated Jan. 28, 2019 issued in CN 201580072950.8.
Chinese First Office Action dated Jan. 28, 2021 issued in Application No. CN 201910181199.5.
Chinese First Office Action dated Jan. 4, 2021 issued in Application No. CN 201811585066.6.
Chinese First Office Action dated Oct. 11, 2020 issued in CN 201811184731.0.
Chinese Office Action [Description in English] dated May 31, 2016 issued in Application No. CN 201380068831.6.
Chinese Second Office Action dated Dec. 31, 2019 issued in CN 201580072950.8.
Chinese Second Office Action dated Jul. 3, 2018 issued in Application No. CN 201480054301.0.
Chinese Second Office Action dated Mar. 19, 2020 issued in Application No. CN 201680014898.5.
Chinese Second Office Action dated Nov. 12, 2019 issued in Application No. CN 201680005491.6.
Chinese Second Office Action dated Nov. 28, 2019 issued in Application No. CN 201680006738.6.
Chinese Second Office Action dated Oct. 26, 2017 issued in Application No. CN 201480057911.6.
Chinese Second Office Action dated Oct. 8, 2021 issued in Application No. CN 201811585066.6.
Chinese Second Office Action [Description in English] dated Jan. 22, 2017 issued in Application No. CN201380068831.6.
Chinese Third Office Action dated Jul. 13, 2018 issued in Application No. CN 201480057911.6.
Chinese Third Office Action dated May 15, 2020 issued in Application No. CN 201680005491.6.
Chinese Third Office Action [Summary in English] dated Jul. 24, 2017 issued in Application No. 201380068831.6.
Choi, W., et al., "Tomographic phase microscopy," NPG: Nature Methods | Advance Online Publication, Aug. 12, 2007, pp. 1-3. doi:10.1038/NMETH1078.
Chung, et al., "Computational aberration compensation by coded-aperture-based correction of aberration obtained from optical Fourier coding and blur estimation," Optica, vol. 6, May 10, 2019, pp. 647-661.
Chung, J., et al, "Counting White Blood Cells from a Blood Smear Using Fourier Ptychographic Microscopy," PLoS ONE, vol. 10, No. 7, Jul. 17, 2015, pp. 1-10. doi:10.1371/journal.pone.0133489.
Chung, J., et al, pre-published manuscript of "Wide-field Fourier ptychographic microscopy using laser illumination source," ArXiv e-prints (Submitted on Feb. 9, 2016 (v1), last revised Mar. 23, 2016 (this version, v2)). [retrieved on May 20, 2016] URL:arXiv:1602.02901v2 [physics.Optics] Mar. 23, 2016.
Chung, J., et al, "Wide field-of-view fluorescence image deconvolution with aberration- estimation from Fourier ptychography," Biomedical Optics Express, vol. 7, No. 2, Feb. 1, 2016, pp. 352-368. doi: 10.1364/BOE.7.000352.
Cisse, Moustapha M., et al, "Houdini: Fooling deep structured visual and speech recognition models with adversarial examples" Advances in neural information processing systems, 2017. 6977-6987.
CN Office Action dated Oct. 8, 2021, in application No. CN201811585067 with English translation.
CN Office Action dated Oct. 11, 2021, in Application No. CN201910181199.5 with English translation.
Colomb, T., et al, "Automatic procedure for aberration compensation in digital holographic microscopy and applications to specimen shape compensation," Applied Optics, vol. 45, No. 5, Feb. 10, 2006, pp. 851-863. doi: 10.1364/AO.45.000851.
De Sa, C., et al, "Global Convergence of Stochastic Gradient Descent for Some Non-convex Matrix Problems," Proceedings of the 32nd International Conference on Machine Learning, Lille, France, 2015. JMLR: W&CP, vol. 37, pp. 10. [retrieved on Nov. 9, 2015]URL: https://arxiv.org/abs/1411.1134.
Debailleul, M., et al, "High-resolution three-dimensional tomographic diffractive microscopy of transparent inorganic and biological samples," Optics Letters, Optical Society of America, vol. 34, No. 1, Jan. 1, 2009, pp. 79-81. doi: 10.1364/OL.34.000079.
Denis, L., et al, "Inline hologram reconstruction with sparsity constraints," Optics Letters, Optical Society of America, vol. 34, No. 22, Oct. 12, 2009, pp. 3475-3477. doi:10.1364/OL.34.003475 ujm-00397994v2.
Desjardins, et al., "Angle-resolved Optical Coherence Tomography with sequential selectivity for speckle reduction" Optics Express, vol. 15, No. 10, May 14, 2007, pp. 6200-6209.
Di, J., et al, "High resolution digital holographic microscopy with a wide field of view based on a synthetic aperture technique and use of linear CCD scanning," Applied Optics, vol. 47, No. 30, Oct. 20, 2008, pp. 5654-5659. doi: 10.1364/AO.47.005654.
Dierolf, M., et al, "Ptychographic coherent diffractive imaging of weakly scattering specimens," New Journal of Physics, vol. 12, Mar. 31, 2010, 035017, p. 14. doi: 10.1088/1367-2630/12/3/035017.
Dierolf, M., et al, "Ptychographic X-ray computed tomography at the nanoscale," Nature Letter, vol. 467, Sep. 23, 2010, pp. 436-439. doi: 10.1038/nature09419.
Dimitriou, et al., "Deep Learning for Whole Slide Image Analysis: An Overview" Frontiers in Medicine, 2019. 6: 264.
Doctor Mole—Skin Cancer App, App to check skin cancer by Dr. Mole, p. 1. (Webpage) [retrieved on Oct. 23, 2015] URL: http://www.doctormole.com.
Dong, S., et al, "Aperture-scanning Fourier ptychography for 3D refocusing and super-resolution macroscopic imaging," Optics Express, vol. 22, No. 11, Jun. 2, 2014, pp. 13586-13599. doi:10.1364/OE.22.013586.
Dong, S., et al, "FPscope: a field-portable high-resolution microscope using a cellphone lens," Biomedical Optics Express, vol. 5, No. 10, Oct. 1, 2014, pp. 3305-3310. doi:10.1364/BOE.5.003305.
Dong, S., et al, "High-resolution fluorescence imaging via pattern-illuminated Fourier ptychography," Optics Express, vol. 22, No. 17, Aug. 25, 2014, pp. 20856-20870. doi:10.1364/OE.22.020856.
Dowski, et al., "Extended depth of field through wavefront coding," Applied Optics, vol. 34, No. 11, Apr. 10, 1995, pp. 1859-1866.
Eldar, Y.C., et al, "Sparse Phase Retrieval from Short-Time Fourier Measurements," IEEE Signal Processing Letters, vol. 22, No. 5, May 2015, pp. 638-642. doi:10.1109/LSP.2014.2364225.
Emile, O., et al, "Rotating polarization imaging in turbid media," Optics Letters, vol. 21, No. 20, Oct. 15, 1996, pp. 1706-1708. doi: 10.1364/OL.21.001706.
Essen BioScience, "Real-time, quantitative live-cell analysis, IncuCyte® ZOOM System," IncuCyte Zoom System Brochure 2016, pp. 1-4. [retrieved Feb. 25, 2016] [URL: http://www.essenbioscience.com/IncuCyte].
European Extended Search Report dated Aug. 14, 2018 issued in EP 16744003.1.
European Extended Search Report dated Jun. 6, 2018 issued in Application No. 15865492.1.
European Extended Search Report dated Mar. 31, 2016 in EP Application No. 13851670.3.
European First Examination Report dated Jan. 21, 2021 issued in Application No. EP 16744002.3.
European First Examination Report dated Jan. 27, 2021 issued in EP 16744003.1.
European First Examination Report dated Sep. 28, 2020 issued in Application No. 14837844.1.
European Office Action dated May 16, 2017 issued in European Patent Application No. 13851670.3.
European Third-Party Observations, dated Jan. 20, 2016 in EP Application No. 13851670.3.
Evered, et al., "Accuracy and perceptions of virtual microscopy compared with glass slide microscopy in cervical cytology," Cytopathology, vol. 22, Feb. 2, 2010, pp. 82-87.
Extended European Search Report dated Aug. 8, 2018 issued in Application No. EP 16744002.3.

(56) References Cited

OTHER PUBLICATIONS

Extended European Search Report dated Feb. 15, 2017 issued in Application No. 14832857.8.
Extended European Search Report dated Feb. 16, 2017 issued in Application No. 14837844.1.
Extended European Search Report dated Jul. 3, 2018 issued in Application No. EP 15874344.3.
Extended European Search Report dated Oct. 25, 2018 issued in Application No. EP 16765505.9.
Extended European Search Report dated Sep. 12, 2018 issued in Application No. EP 16740769.1.
Falk, Thorsten, et al, "U-Net: deep learning for cell counting, detection, and morphometry" Nature methods, 2019. 16(1): 67-70.
Faulkner, H.M.L., et al, "Error tolerance of an iterative phase retrieval algorithm for moveable illumination microscopy," Ultramicroscopy, vol. 103, No. 2, May 2005, pp. 153-164. doi:10.1016/j.ultramic.2004.11.006.
Faulkner, H.M.L., et al., "Movable Aperture Lensless Transmission Microscopy: A Novel Phase Retrieval Algorithm," Physical Review Letters, vol. 93, No. 2, Jul. 9, 2004, pp. 023903-1-023903-4. doi:10.1103/PhysRevLett.93.023903.
Fazel, M., "Matrix rank minimization with applications," PhD dissertation submitted to the Dept. of Electrical Engineering and Committee on Graduate Studies of Stanford University, Mar. 2002, pp. 1-117. [retrieved on Nov. 9, 2015] URL:http://faculty.washington.edu/mfazel/thesis-final.pdf.
Feldman, L.D., et al, "Pathological assessment of response to induction chemotherapy in breast cancer" Cancer Research, 1986. 46(5): 2578-2581.
Feng, P., et al, "Long-working-distance synthetic aperture Fresnel off-axis digital holography," Optics Express, vol. 17, No. 7, Mar. 30, 2009, pp. 5473-5480. doi: 10.1364/OE.17.005473.
Fergus, et al., "Removing camera shake from a single photograph," ACM Trans. Graph. 25, 787-794 (2006).
Fienup and Miller, "Aberration correction by maximizing generalized sharpness metrics," J. Opt. Soc. Am. A 20, pp. 609-620 (Apr. 2003).
Fienup, J. R., "Invariant error metrics for image reconstruction," Applied Optics, vol. 36, No. 32, Nov. 10, 1997, pp. 8352-8357. doi: 10.1364/AO.36.008352.
Fienup, J. R., "Lensless coherent imaging by phase retrieval with an illumination pattern constraint," Optics Express, vol. 14, No. 2, Jan. 23, 2006, pp. 498-508. doi: 10.1364/OPEX.14.000498.
Fienup, J. R., "Phase retrieval algorithms: a comparison," Applied Optics, vol. 21, No. 15, Aug. 1, 1982, pp. 2758-2769. doi: 10.1364/AO.21.002758.
Fienup, J. R., "Reconstruction of a complex-valued object from the modulus of its Fourier transform using a support constraint," Journal of the Optical Society of America A, vol. 4, No. 1, Jan. 1987, pp. 118-123. doi: 10.1364/JOSAA.4.000118.
Fienup, J. R., "Reconstruction of an object from the modulus of its Fourier transform," Optics Letter, vol. 3, No. 1, Jul. 1978, pp. 27-29. doi: 10.1364/OL.3.000027.
Fisher, B., et al, "Effect of preoperative chemotherapy on the outcome of women with operable breast cancer" Journal of Clinical Oncology, 1998. 16(8): 2672-2685.
Forster, B., et al., "Complex wavelets for extended depth-of-field: A new method for the fusion of multichannel microscopy images", Microscopy research and technique, (Sep. 2004), 65(1-2):33-42.
Fried, D.L.,"Anisoplanatism in adaptive optics," J. Opt. Soc. Am. vol. 72, No. 1, Jan. 1982, pp. 52-61.
Gan, X., et al, "Image enhancement through turbid media under a microscope by use of polarization gating methods," Journal of the Optical Society of America A, vol. 16, No. 9, Sep. 1999, pp. 2177-2184. doi: 10.1364/JOSAA.16.002177.
Gerke T.D., et al, "Aperiodic volume optics," Nature Photonics, vol. 4, Feb. 7, 2010, pp. 188-193. doi:10.1038/nphoton.2009.290.
Ghosh, A., et al, pre-published manuscript of "Multiview Face Capture using Polarized Spherical Gradient Illumination," via USC Institute for Creative Technologies; To appear in ACM Transactions on Graphics (TOG), vol. 30, No. 6, Dec. 2011, pp. 1-10. [Retrieved Sep. 28, 2011] URL:http://doi.acm.org/10.1145/2024156.2024163.
Ginner, et al., "Holographic line field en-face OCT with digital adaptive optics in the retina in vivo," Biomed. Opt. Express 9, 472-485 (Feb. 1, 2018).
Ginner, et al, "Noniterative digital aberration correction for cellular resolution retinal optical coherence tomography in vivo," Optica, vol. 4, Aug. 2017, pp. 924-931.
Godara, P., et al, "Adaptive Optics Retinal Imaging: Emerging Clinical Applications," NIH-PA Author Manuscript; available in PMC Dec. 1, 2011. Published in final edited form as: Optom. Vis. Sci .. Dec. 2010; 87(12): 930-941. doi: 10.1097/OPX.0b013e3181ff9a8b.
Godden, T.M et al., "Ptychographic microscope for three-dimensional imaging," Optics Express, vol. 22, No. 10, May 19, 2014, pp. 12513-12523.
Goodman, J.W., "Introduction to Fourier Optics," Third Ed., Roberts & Company Publishers (Englewood, Colorado 2005) pp. 1-172. ISBN 0-9747077-2-4.
Goodson, A.G., et al, "Comparative analysis of total body vs. dermatoscopic photographic monitoring of nevi in similar patient populations at risk for cutaneous melanoma," NIH-PA Author Manuscript; available in PMC Jul. 1, 2011. Published in final edited form as: Dermatol. Surg. Jul. 2010; 36(7): 1087-1098. doi: 10.1111/j.1524-4725.2010.01589.x.
Granero, L., et al, "Synthetic aperture superresolved microscopy in digital lensless Fourier holography by time and angular multiplexing of the object information," Applied Optics, vol. 49, No. 5, Feb. 10, 2010, pp. 845-857. doi: 10.1364/AO.49.000845.
Grant, M., et al, "CVX: Matlab Software for Disciplined Convex Programming," CVX Research Inc., pp. 1-3. [Webpage] [retrieved on Dec. 18, 2015] URL: http://cvxr.com/cvx.
Greenbaum, A., et al, "Field-portable wide-field microscopy of dense samples using multi-height pixel super-resolution based lensfree imaging," Lab Chip, The Royal Society of Chemistry, vol. 12, No. 7, Jan. 31, 2012, pp. 1242-1245. [retrieved on Feb. 27, 2016] URL:http://dx.doi.org/10.1039/C2LC21072J.
Greenbaum, A., et al, "Increased space-bandwidth product in pixel super-resolved lensfree on-chip microscopy," Scientific Reports, vol. 3, No. 1717, Apr. 24, 2013, pp. 1-8. [doi: 10.1038/srep01717].
Gruev, V., et al, "Dual-tier thin film polymer polarization imaging sensor," Optics Express, vol. 18, No. 18, Aug. 30, 2010, pp. 19292-19303. doi: 10.1364/OE.18.019292.
Guizar-Sicairos, M., and Fienup, J.R., "Phase retrieval with transverse translation diversity: a nonlinear optimization approach," Optics Express, vol. 16, No. 10, May 12, 2008, pp. 7264-7278. doi: 10.1364/OE.16.007264.
Gunjala, et al., "Aberration recovery by imaging a weak diffuser," Optics Express vol. 26, No. 16, Aug. 6, 2018, pp. 21054-21068.
Gunturk, B.K., et al, "Restoration in the Presence of Unknown Spatially Varying Blur," Image Restoration: Fundamentals and Advances (CRC Press 2012), vol. 7, Chapter 3, Sep. 11, 2012, pp. 63-68. ISBN 978-1-4398-6955-0.
Guo, K., et al, "Optimization of sampling pattern and the design of Fourier ptychographic illuminator," Optics Express, vol. 23, No. 5, Mar. 9, 2015, pp. 6171-6180. doi: 10.1364/OE.23.006171.
Gustafsson, M.G.L., "Surpassing the lateral resolution limit by a factor of two using structured illumination microscopy," Journal of Microscopy, vol. 198, Pt. 2, May 2000, pp. 82-87. doi:10.1046/j.1365-2818.2000.00710.x.
Gustafsson, M.,"Nonlinear structured-illumination microscopy: wide-field fluorescence imaging with theoretically unlimited resolution," Proc. Natl. Acad. Sci. USA 102, 13081-13086 (Sep. 13, 2005).
Gutzler, T., et al, "Coherent aperture-synthesis, wide-field, high-resolution holographic microscopy of biological tissue," Optics Letters, vol. 35, No. 8, Apr. 15, 2010, pp. 1136-1138. doi: 10.1364/OL.35.001136.
Haigh, S. J., et al, "Atomic Structure Imaging beyond Conventional Resolution Limits in the Transmission Electron Microscope," Physical Review Letters, vol. 103, Issue 12, Sep. 18, 2009, pp. 126101.1-126101.4. doi: 10.1103/PhysRevLett.103.126101.
Han, C., et al, "Wide Field-of-View On-Chip Talbot Fluorescence Microscopy for Longitudinal Cell Culture Monitoring from within

(56) References Cited

OTHER PUBLICATIONS the Incubator" Analytical Chemistry, vol. 85, No. 4, Jan. 28, 2013, pp. 2356-2360. doi:10.1021/ac303356v.

Hue, F., et al, "Wave-front phase retrieval in transmission electron microscopy via ptychography," Rapid Communications: Physical Review B, vol. 82, No. 12, Sep. 15, 2010, pp. 121415-1-121415-4. doi:10.1103/PhysRevB.82.121415.

Hillman, T.R., et al, "High-resolution, wide-field object reconstruction with synthetic aperture Fourier holographic optical microscopy," Optics Express, vol. 17, No. 10, May 11, 2009, pp. 7873-7892. doi:10.1364/OE.17.007873.

Hillmann, et al., "Aberration-free volumetric high-speed imaging of in vivo retina," Sci. Rep. 6, 35209 (Oct. 20, 2016).

Hofer, et al., "Improvement in retinal image quality with dynamic correction of the eye's aberrations," Opt. Express 8, May 21, 2001, pp. 631-643.

Hofer, H., et al, "Dynamics of the eye's wave aberration," Journal of Optical Society of America A., vol. 18, No. 3, Mar. 2001, pp. 497-506. doi: 10.1364/JOSAA.18.000497.

Hofer, H., et al, "Organization of the Human Trichromatic Cone Mosaic," The Journal of Neuroscience, vol. 25, No. 42, Oct. 19, 2005, pp. 9669-9679. doi: 10.1523/JNEUROSCI.2414-05.2005.

Holloway, J., et al. "SAVI: Synthetic apertures for long-range, subdiffraction-limited visible imaging using Fourier ptychography," Science Advances | Research Article, vol. 3, No. 4, Apr. 14, 2017, pp. 1-11. doi:10.1126/sciadv.1602564 [retrieved on Nov. 28, 2017] URL:http://advances.sciencemag.org/.

Hong, S-H., et al, "Three-dimensional volumetric object reconstruction using computational integral imaging," OSA Publishing: Optics Express, vol. 12, No. 3, Feb. 9, 2004, pp. 483-491. doi:10.1364/OPEX.12.000483.

Hoppe, W., "Diffraction in inhomogeneous primary wave fields. 1. Principle of phase determination from electron diffraction interference." Acta Crystallographica Section a—Crystal Physics Diffraction Theoretical and General Crystallography, A25, Jan. 1, 1969, pp. 495-501. (English Machine Translation Incl.).

Horstmeyer, R., et al, "A phase space model of Fourier ptychographic microscopy," Optics Express, vol. 22, No. 1, Jan. 13, 2014, pp. 338-358. doi:10.1364/OE.22.000338.

Horstmeyer, R., et al, "Diffraction tomography with Fourier ptychography," Optica, Optical Society of America, vol. 3, No. 8, Aug. 2016, pp. 827-835. doi:10.1364/OPTICA.3.000827.

Horstmeyer, R., et al, "Digital pathology with Fourier Ptychography," Computerized Medical Imaging and Graphics, vol. 42, Jun. 2015, pp. 38-43. doi:10.1016/j.compmedimag.2014.11.005.

Horstmeyer, R., et al, "Solving ptychography with a convex relaxation," New Journal of Physics, vol. 17, May 27, 2015, pp. 1-14. doi: 10.1088/1367-2630/17/5/053044 [URL: http://iopscience.iop.org/1367-2630/17/5/053044].

Horstmeyer, R., et al, "Overlapped Fourier coding for optical aberration removal," Optics Express, vol. 22, No. 20, Oct. 6, 2014, pp. 24062-24080. doi: 10.1364/OE.22.024062.

Horstmeyer, R., et al, "Standardizing the resolution claims for coherent microscopy," Nature Photonics | Commentary, vol. 10, No. 2, Feb. 2016, pp. 68-71. doi:10.1038/nphoton.2015.279 [URL:http://dx.doi.org/10.1038/nphoton.2015.279].

Hortobagyi, G.N., et al, "Management of stage III primary breast cancer with primary chemotherapy, surgery, and radiation therapy" Cancer, 1988. 62(12): 2507-2516.

Humphry, M., et al, "Ptychographic electron microscopy using high-angle dark-field scattering for sub-nanometre resolution imaging," Nature Communications, vol. 3, Mar. 6, 2012, pp. 1-7. doi: 10.1038/ncomms1733.

International Preliminary Report on Patentability dated Aug. 10, 2017 issued in Application No. PCT/US2016/015001.

International Preliminary Report on Patentability dated Aug. 10, 2017 issued in Application No. PCT/US2016/015002.

International Preliminary Report on Patentability dated Aug. 3, 2017 issued in Application No. PCT/US2016/014343.

International Preliminary Report on Patentability dated Feb. 11, 2016 issued in PCT/US2014/049297.

International Preliminary Report on Patentability dated Jul. 6, 2017 issued in Application No. PCT/US2015/067498.

International Preliminary Report on Patentability dated Jun. 15, 2017 issued in Application No. PCT/US2015/064126.

International Preliminary Report on Patentability dated Mar. 3, 2016 issued in PCT/US2014/052351.

International Preliminary Report on Patentability dated May 14, 2015 in PCT/US2013/067068.

International Preliminary Report on Patentability dated May 14, 2020 issued in PCT/US2018/059059.

International Preliminary Report on Patentability dated Nov. 30, 2017 issued in PCT/US2016/033638.

International Preliminary Report on Patentability dated Sep. 28, 2017 issued in Application No. PCT/US2016/022116.

International Search Report and Written Opinion dated Apr. 19, 2016 issued in PCT/US2015/067498.

International Search Report and Written Opinion dated Dec. 5, 2014 issued in Application No. PCT/US2014/052351.

International Search Report and Written Opinion dated Feb. 21, 2014 in PCT/US2013/067068.

International Search Report and Written Opinion dated Feb. 22, 2016 issued in PCT/US2015/064126.

International Search Report and Written Opinion dated Feb. 22, 2019 issued in PCT/US2018/059059.

International Search Report and Written Opinion dated Jun. 27, 2016 issued in PCT/US2016/022116.

International Search Report and Written Opinion dated Jun. 30, 2016 issued in PCT/US2016/014343.

International Search Report and Written Opinion dated May 11, 2016 issued in PCT/US2016/015002.

International Search Report and Written Opinion dated May 4, 2016 issued in PCT/US2016/015001.

International Search Report and Written Opinion dated Nov. 13, 2014 issued in PCT/US2014/049297.

International Search Report and Written Opinion dated Sep. 5, 2016 issued in PCT/US2016/033638.

Jacques, et al., "Imaging Superficial Tissues With Polarized Light," Lasers in Surgery and Medicine, vol. 26, No. 2, Apr. 25, 2000, pp. 119-129.

Jaganathan, K., et al, "Phase retrieval with masks using convex optimization," 2015 IEEE International Symposium on Information Theory (ISIT), Hong Kong, 2015, pp. 1655-1659. doi: 10.1109/ISIT.2015.7282737.

Jaganathan, K., et al, pre-published manuscript of "STFT Phase retrieval: uniqueness guarantees and recovery algorithms," ArXiv e-prints, 10 pages, (Submitted on Aug. 12, 2015 (v1). doi: 10.1109/JSTSP.2016.2549507 [retrieved Nov. 9, 2015] URL: https://arxiv.org/abs/1508.02820v1.

Jaganathan, K., et al, "Recovery of sparse 1-D signals from the magnitudes of their Fourier transform," 2012 IEEE International Symposium on Information Theory Proceedings, Cambridge, MA, 2012, pp. 1473-1477. doi: 10.1109/ISIT.2012.6283508.

Japanese First Office Action dated Aug. 7, 2018 issued in Application No. JP 2016-531919.

Japanese Office Action dated Oct. 17, 2017 issued in Application No. 2015-539884.

Jensen, et al. "Types of imaging, Part 2: An Overview of Fluorescence Microscopy." The Anatomical Record, vol. 295, No. 10, Oct. 1, 2012, pp. 1621-1627.

Joeres, S., et al, "Retinal Imaging With Adaptive Optics Scanning Laser Ophthalmoscopy in Unexplained Central Ring Scotoma," Arch. Ophthalmol., vol. 126, No. 4, Apr. 2008, pp. 543-547. [retrieved Jun. 10, 2015] [URL:http://archopht.jamanetwork.com/].

Jung, J.H., et al, Author Manuscript of "Microfluidic-integrated laser-controlled microactuators with on-chip microscopy imaging functionality," Published in final edited form as: Lab Chip, Oct. 7, 2014, vol. 14, No. 19, pp. 3781-3789. doi: 10.1039/c41c00790e.

Junker, K., et al, "Grading of tumor regression in non-small cell lung cancer: morphology and prognosis" Chest, 2001. 120(5): 1584-1591.

(56) References Cited

OTHER PUBLICATIONS

Junker, K., et al, "Tumour regression in non-small-cell lung cancer following neoadjuvant therapy" Histological assessment J Cancer Res Clin Oncol, 1997. 123(9): 469-477.

Kamal, et al., "In situ retrieval and correction of aberrations in moldless lenses using Fourier ptychography," Opt. Express, vol. 26, No. 3, pp. 2708-2719 (Feb. 5, 2018).

Kawata, S. et al, "Optical microscope tomography. I. Support constraint," Journal Optical Society America A, vol. 4, No. 1, Jan. 1987, pp. 292-297. doi:10.1364/JOSAA.4.000292.

Kay, D. B., et al, Author Manuscript of "Outer Retinal Structure in Best Vitelliform Macular Dystrophy," Published in final edited form as: JAMA Ophthalmol., Sep. 2013, vol. 131, No. 9, pp. 1207-1215. doi: 10.1001/jamaophthalmol.2013.387.

Kim, J., et al, "Incubator embedded cell culture imaging system (EmSight) based on Fourier ptychographic microscopy," Biomedical Optics Express, vol. 7, No. 8, Aug. 1, 2016, pp. 3097-3110. doi: 10.1364/BOE.7.003097.

Kim, M., et al, "High-speed synthetic aperture microscopy for live cell imaging," NIH-PA, Author Manuscript available in PMC Mar. 30, 2011. Published in final edited form as: Opt Lett. Jan. 1, 20115; 36(2): pp. 148-150. PMCID: PMC3068016.

Kirkland, A.I., et al, "Multiple beam tilt microscopy for super resolved imaging," Journal of Electron Microscopy (Tokyo) Jan. 1, 1997, vol. 46, No. 1, pp. 11-22. [doi: 10.1093/oxfordjournals.jmicro. a023486].

Kirkland, A.I., et al, "Super-resolution by aperture synthesis: tilt series reconstruction in CTEM," Elsevier Science B.V., Ultramicroscopy 57, Mar. 1995, pp. 355-374. doi:10.1016/0304-3991(94)00191-O.

Kittler, H., et al, "Morphologic changes of pigmented skin lesions: A useful extension of the ABCD rule for dermatoscopy," Journal of the American Academy of Dermatology (JAAD), Apr. 1999. vol. 40, No. 4, pp. 558-562. doi: 10.1016/S0190-9622(99)70437-8.

Kner, P., "Phase diversity for three-dimensional imaging," Journal of the Optical Society of America A, vol. 30, No. 10, Oct. 1, 2013, pp. 1980-1987. doi:10.1364/JOSAA.30.001980.

Kohlberger, et al., "Whole-slide image focus quality: Automatic assessment and impact on AI cancer detection" Journal of Pathology Informatics, 2019. 10: 39.

Kozak, I., "Retinal imaging using adaptive optics technology," Saudi Journal of Ophthalmology, vol. 28, No. 2, Feb. 25, 2014, pp. 117-122. doi:10.1016/j.sjopt.2014.02.005.

Kuang, et al., "Digital micromirror device-based laserillumination Fourier ptychographic microscopy," Optics Express, vol. 23, Oct. 5, 2015, pp. 26999-27010.

Kubala, et al., "Reducing complexity in computational imaging systems," Optics Express vol. 11, Sep. 8, 2003, pp. 2102-2108.

Kuerer, H.M., et al, "Clinical course of breast cancer patients with complete pathologic primary tumor and axillary lymph node response to doxorubicin-based neoadjuvant chemotherapy" Journal of Clinical Oncology, 1999. 17(2): 460-469.

Kumar, et al., "Subaperture correlation based digital adaptive optics for full field optical coherence tomography," Optics Express, vol. 21, May 6, 2013, pp. 10850-10866.

Kundur, et al., "Blind Image Deconvolution," IEEE Signal Processing Magazine, vol. 13, No. 3, May 1996, pp. 43-64.

Lauer, V., "New Approach to optical diffraction tomography yielding a vector equation of diffraction tomography and a novel tomographic microscope," Journal of Microscopy, Feb. 2002, vol. 205, No. 2, pp. 165-176. doi: 10.1046/j.0022-2720.2001.00980.x.

Lee, K., et al, "Synthetic Fourier transform light scattering," Optics Express, vol. 21, No. 19, Sep. 23, 2013, pp. 22453-22463. doi:10. 1364/OE.21.022453.

Lee R Dice, "Measures of the amount of ecologic association between species" Ecology, 1945. 26(3): 297-302.

Levin et al., "Image and depth from a conventional camera with a coded aperture," ACM Transactions on Graphics, vol. 26, No. 3, Article 70, Jul. 2007, pp. 70-71-70-9.

Levin, et al., "Understanding blind deconvolution algorithms," IEEE Trans. Pattern Anal. Mach. Intell., vol. 33, No. 12, Dec. 2011, pp. 2354-2367.

Levoy, M., et al, "Light field microscopy," ACM Transactions Graphics, vol. 25, No. 3, proceedings of ACM SIGGRAPH Jul. 2006, pp. 1-11. [doi: 10.1145/1141911.1141976].

Levoy, M., et al, "Recording and controlling the 4D light field in a microscope using microlens arrays," Journal of Microscopy, vol. 235, Pt. 2, Aug. 2009, pp. 144-162. doi:10.1111/j.1365-2818.2009. 03195.x.

Li, et al., "Separation of three dimensional scattering effects in tilt-series Fourier ptychography," Ultramicroscopy 158, 1-7 (Jun. 14, 2015).

Li, et al., "GPU accelerated parallel FFT processing for Fourier transform hyperspectral imaging," Applied Optics, vol. 54, No. 13, May 1, 2015, pp. D91-D98.

Li, X., et al, "Sparse Signal Recovery from Quadratic Measurements via Convex Programming," SIAM Journal on Mathematical Analysis, vol. 45, No. 5, Sep. 26, 2013, pp. 3019-3033. [doi:10. 1137/120893707] [retrieved Feb. 13, 2014] URL: http://dx.doi.org/10.1137/120893707.

Liu-Jarin, Xiaolin, et al, "Histologic Assessment of Non-Small Cell Lung Carcinoma after Neoadjuvant Therapy" Modern pathology, 2003. 16(11): 1102-1108.

Lohmann, A. W., et al, "Space-bandwidth product of optical signals and systems," Journal of the Optical Society of America A, vol. 13, No. 3, Mar. 1996, pp. 470-473. doi: 10.1364/JOSAA.13.000470.

Lu, H., et al, "Quantitative phase imaging and complex field reconstruction by pupil modulation differential phase contrast," Optics Express, vol. 24, No. 22, Oct. 31, 2016, pp. 25345-25361. doi:10.1364/OE.24.025345.

Lue, N., et al, "Live Cell Refractometry Using Hilbert Phase Microscopy and Confocal Reflectance Microscopy," NIH-PA Author Manuscript, available in PMC Apr. 2, 20102. Published in final edited form as: J Phys Chem A. Nov. 26, 2009; 113(47); 13327-13330. PMCID: PMC2858636.

LUXEXCEL® Brochure, "LUXEXCEL: 3D Printing Service Description" pp. 1-5. [retrieved on Mar. 7, 2016] URL: http://www.luxexcel.com.

LYTRO | ILLUM, Lytro-Products [webpages], pp. 1-6. [Online] [retrieved Oct. 23, 2015] URL:https://www.lytro.com/.

Ma, W., et al, "Rapid Acquisition of Specular and Diffuse Normal Maps from Polarized Spherical Gradient Illumination," EGSR'07 Proceedings of the 18th Eurographics conference on Rendering Techniques, Eurographics Association, Aire-la-Ville, Switzerland 2007, pp. 183-194. doi: 10.2312/EGWR/EGSR07/183-194.

Mahajan, V.N., "Zernike Circle Polynomials and Optical Aberrations of Systems with Circular Pupils," Engineering Laboratory Notes: Supplemental to Applied Optics, vol. 33 no. 34, Dec. 1, 1994, pp. 8121-8124. doi:10.1364/AO.33.008121.

Maiden, A.M., et al, "A new method of high resolution, quantitative phase scanning microscopy," in Proceedings of SPIE, Jun. 2, 2010, vol. 7729, pp. 77291I-1-77291I-8. doi: 10.1117/12.853339 [retrieved on Dec. 16, 2015] URL: proceedings.spiedigitallibrary.org.

Maiden, A.M., et al, "An improved ptychographical phase retrieval algorithm for diffractive imaging," Ultramicroscopy, vol. 109, No. 10, Sep. 2009, pp. 1256-1262. doi:10.1016/j.ultramic.2009.05.012.

Maiden, A.M., et al, "Optical ptychography: a practical implementation with useful resolution," Optics Letters, vol. 35, No. 15, Aug. 1, 2010, pp. 2585-2587. doi: 10.1364/OL.35.002585.

Maiden, A.M., et al., "Ptychographic transmission microscopy in three dimensions using a multi-slice approach," Journal of the Optical Society of America A., vol. 29, No. 8, Aug. 1, 2012, pp. 1606-1614.

Maiden, A.M., et al, "Superresolution imaging via ptychography," Journal of the Optical Society of America A. (JOSAA), vol. 28, No. 4, Apr. 1, 2011, pp. 604-612. doi: 10.1364/JOSAA.28.000604.

Majurski, Michael, et al, "Cell image segmentation using generative adversarial networks, transfer learning, and augmentations" Proceedings of the IEEE Conference on Computer Vision and Pattern Recognition Workshops, 2019.

Marchesini S., et al, pre-published manuscript of "Augmented projections for ptychographic imaging," (Submitted on Sep. 21,

(56) References Cited

OTHER PUBLICATIONS 2012 (v1), last revised Aug. 29, 2013 (this version, v5)) pp. 1-18. Published in Inverse Problems vol. 29, No. 11 (2013). [retrieved on Nov. 9, 2015] URL: https://arxiv.org/pdf/1209.4924.

Marchesini S., "Invited Article: A unified evaluation of iterative projection algorithms for phase retrieval," Review of Scientific Instruments, vol. 78, No. 1, Apr. 19, 2007, pp. 011301-1-011301-10. doi: 10.1063/1.2403783 [retrieved May 7, 2014] URL:http://dx.doi.org/10.1063/1.2403783.

Marcos, et al., "Vision science and adaptive optics, the state of the field," Vision Research, vol. 132, Feb. 27, 2017, pp. 3-33.

Marrison, J., et al, "Ptychography—a label free, high-contrast imaging technique for live cells using quantitative phase information," Scientific Reports, vol. 3, No. 2369, Aug. 6, 2013, pp. 1-7. doi: 10.1038/srep02369.

Martins da Silva et al., "Photosensitivity and epilepsy: current concepts and perspectives—a narrative review," Seizure, vol. 50, Apr. 4, 2017, pp. 209-218.

McConnell, et al., "A novel optical microscope for imaging large embryos and tissue vols. with sub-cellular resolution throughout," eLife 5, e18659, Sep. 23, 2016, pp. 1-15.

Medoff, B.P., et al, "Iterative convolution backprojection algorithms for image reconstruction from limited data," Journal of the Optical Society of America, vol. 73, No. 11, Nov. 1, 1983, pp. 1493-1500. doi: 10.1364/JOSA.73.001493.

Melafind, Optics by Carl Zeiss, MELA Sciences 2015, pp. 1-4. [Webpage] [retrieved Oct. 23, 2015] URL: http://www.melafind.com/.

Meyer, R.R., et al., "A new method for the determination of the wave aberration function of high-resolution TEM. 2. Measurement of the antisymmetric aberrations," Ultramicroscopy, vol. 99, No. 2-3, May 2004, pp. 115-123. doi: 10.1016/j.ultramic.2003.11.001.

Miao, J., et al, "High Resolution 3D X-Ray Diffraction Microscopy," Physical Review Letters, vol. 89, No. 8, Aug. 19, 2002, pp. 088303-1-088303-4. doi: 10.1103/PhysRevLett.89.088303.

Mico, V., et al, "Synthetic aperture microscopy using off-axis illumination and polarization coding," Optics Communications, vol. 276, No. 2, Aug. 15, 2007, pp. 209-217. doi:10.1016/j.optcom.2007.04.020.

Mico, V., et al, "Synthetic aperture superresolution with multiple off-axis holograms," Journal of the Optical Society of America A, vol. 23, No. 12, Dec. 1, 2006, pp. 3162-3170. doi:10.1364/JOSAA.23.003162.

Mir, M., et al, "Blood screening using diffraction phase cytometry," Journal of Biomedical Optics: vol. 15, No. 2, Mar./Apr. 2010, pp. 027016-1-027014-4. doi:10.1117/1.3369965 [retrieved on Feb. 6, 2015] URL:http://dx.doi.org/10.1117/1.3369965.

Mir, M. et al, "Optical measurement of cycle-dependent cell growth," Proceedings of the National Academy of Sciences (PNAS) vol. 108, No. 32, Aug. 9, 2011, pp. 13124-13129. doi:10.1073/pnas.1100506108.

Moreno, I., "Creating a desired lighting pattern with an LED array," Proceedings of SPIE, Eighth International Conference on Solid State Lighting, vol. 705811, Sep. 2, 2008, pp. 9. doi:10.1117/12.795673.

Mrejen, S., et al, "Adaptive Optics Imaging of Cone Mosaic Abnormalities in Acute Macular Neuroretinopathy," Ophthalmic Surgery, Lasers & Imaging Retina, vol. 45, No. 6, Nov./Dec. 2014, pp. 562-569. doi:10.3928/23258160-20141118-12.

Muyo, et al., "Infrared imaging with a wavefront-coded singlet lens," Optics Express, vol. 17, Nov. 5, 2009, pp. 21118-21123.

Muyo, et al., "Wavefront coding for athermalization of infrared imaging systems," Proc. SPIE 5612, Dec. 6, 2004, pp. 227-235.

Nayar, S. K., et al, pre-published manuscript of "Fast separation of direct and global components of a scene using high frequency illumination," (Submitted 2006, this one (v.1)), Published in: ACM SIGGRAPH 2006 Papers, Boston, Massachusetts Jul.-Aug. 3, 2006, pp. 935-944. doi: http://dx.doi.org/10.1145/1179352.1141977.

Neumaier, "Solving ill-conditioned and singular linear systems: a tutorial on regularization," SIAM Rev. 40, (1998), pp. 636-666.

Ng, R., et al, "Light Field Photography with a Hand-held Plenoptic Camera," Stanford Tech Report, Computer Science Technical Report (CSTR) Apr. 20, 2005, vol. 2, No. 11, pp. 1-11. URL: https://classes.soe.ucsc.edu/cmps290b/Fall05/readings/lfcamera-150dpi.pdf.

Nomura, H., et al., "Techniques for measuring aberrations in lenses used in photolithography with printed patterns," Applied Optics, vol. 38, No. 13, May 1, 1999, pp. 2800-2807. doi:10.1364/AO.38.002800.

Ohlsson, H., et al, "Compressive Phase Retrieval From Squared Output Measurements Via Semidefinite Programming," arXiv:1111.6323, Technical Report; Nov. 28, 2011, pp. 6. URL:http://cds.cern.ch/record/1402765.

Ou, X., et al, "Aperture scanning Fourier ptychographic microscopy," Biomedical Optics Express, vol. 7, No. 8, Aug. 1, 2016, pp. 3140-3150. doi:10.1364/BOE.7.003140.

Ou. X., et al, "Embedded pupil function recovery for Fourier ptychographic microscopy," Optics Express, vol. 22, No. 5, Mar. 10, 2014, pp. 4960-4972. doi:10.1364/OE.22.004960 Erratum Attached, dated Dec. 28, 2015, vol. 23, No. 26, p. 33027. doi:10.1364/OE.23.033027.

Ou, X., et al, "High numerical aperture Fourier ptychography: principle, implementation and characterization," Optics Express, vol. 23, No. 3, Feb. 9, 2015, pp. 3472-3491. doi: 10.1364/oe.23.003472.

Ou. X., et al, pre-published manuscript of "Embedded pupil function recovery for Fourier ptychographic microscopy," (submitted on Dec. 26, 2013 (this version, v1); revised Feb. 12, 2014; accepted Feb. 17, 2014; published Feb. 24, 2014) pp. 1-13. doi: 10.1364/OE.22.004960.

Ou, X., et al, "Quantitative phase imaging via Fourier ptychographic microscopy," NIH-PA Author Manuscript; available in PMC Dec. 26, 2014. Published in final edited form as: Opt Lett. Nov. 15, 2013; 38(22): 4845-4848. doi: 10.1364/OL.38.004845.

Pacheco, S., et al, "Reflective Fourier Ptychography," Journal of Biomedical Optics, vol. 21, No. 2, Feb. 18, 2016, pp. 026010-1-026010-7. doi:10.1117/1.JBO.21.2.026010 [retrieved on Mar. 8, 2016] URL:http://biomedicaloptics.spiedigitallibrary.org.

Pan, et al., "Three-dimensional space optimization for near-field ptychography," Opt. Express 27, 5433-5446 (Feb. 18, 2019).

Pan, et al., "Subwavelength resolution Fourier ptychography with hemispherical digital condensers," Opt. Express 26, 23119-23131 (Sep. 3, 2018).

Pan, et al., "System calibration method for Fourier ptychographic microscopy," J. Biomed. Opt. 22, 096005 (Sep. 12, 2017).

Pankajakshan, P., "Blind Deconvolution for Confocal Laser Scanning Microscopy," Doctoral dissertation, Universite Nice Sophia Antipolis, 2009. URL: https://tel.archives-ouvertes.fr/tel-00474264.

Pataer, Apar, et al, "Histopathologic response criteria predict survival of patients with resected lung cancer after neoadjuvant chemotherapy" Journal of Thoracic Oncology, 2012. 7(5): 825-832.

Pei, Ziang, et al, "Direct Cellularity Estimation on Breast Cancer Histopathology Images Using Transfer Learning" Computational and Mathematical Methods in Medicine, 2019. 2019: 3041250.

Petrick, et al., "SPIE-AAPM-NCI BreastPathQ Challenge: an image analysis challenge for quantitative tumor cellularity assessment in breast cancer histology images following neoadjuvant treatment" May 8, 2021; J. of Medical Imaging, 8(3), 034501 (2021). URL:https://doi.org/10.1117/1.JMI.8.3.034501.

Phillips, et al., "Multi-Contrast Imaging and Digital Refocusing on a Mobile Microscope with a Domed LED Array," PLoS One, vol. 10, No. 5, May 13, 2015, pp. 1-13. doi:10.1371/journal.pone.0124938.

Qian, et al., "Large-scale 3D imaging of insects with natural color," Opt. Express 27, 4845-4857 (Feb. 18, 2019).

Rakhlin, Alexander, et al, "Breast tumor cellularity assessment using deep neural networks" Proceedings of the IEEE International Conference on Computer Vision Workshops, 2019.

Recht, B., et al, "Guaranteed Minimum-Rank Solutions of Linear Matrix Equations via Nuclear Norm Minimization," SIAM Review, vol. 52, No. 3, Aug. 5, 2010, pp. 471-501. doi: 10.1137/070697835 [retrieved on Nov. 20, 2015] URL:https://doi.org/10.1137/070697835.

(56) References Cited

OTHER PUBLICATIONS

Reinhard, et al, "High Dynamic Range Imaging: Acquisition, Display, and Image-based Lighting" Second Edition § 5.2 HDR Image Capture: Morgan Kaufmann, May 28, 2010, pp. 148-151. ISBN: 9780123749147.

Reinig, et al., "Adaptative optics microscopy enhances image quality in deep layers of CLARITY processed brains of YFP-H mice" Proc., of SPIE, vol. 9690, (Mar. 9, 2016) pp. 969008-1-969008-12. doi:10.1117/12.2213283.

Rha, et al., "Adaptive optics flood-illumination camera for high speed retinal imaging," Opt. Express vol. 14, May 15, 2006, pp. 4552-4569.

Rodenburg, J. M., et al, "A phase retrieval algorithm for shifting illumination," Applied Physics Letters, vol. 85, No. 20, Nov. 15, 2004, pp. 4795-4797. doi: 10.1063/1.1823034.

Rodenburg, J. M., et al, "Hard-X-ray Lensless Imaging of Extended Objects," Physical Review Letters, vol. 98, No. 3, Jan. 19, 2007, pp. 034801-1-034801-4. doi: 10.1103/PhysRevLett.98.034801.

Rodenburg, J. M., et al, "The Theory of Super-Resolution Electron Microscopy Via Wigner-Distribution Deconvolution," Philosophical Transactions of the Royal Society A, vol. 339, No. 1655, Jun. 15, 1992, pp. 521-553. doi: 10.1098/rsta.1992.0050.

Rodenburg, J.M., "Ptychography and related Diffractive Imaging Methods," Adv. Imaging Electron Phys., vol. 150, Dec. 31, 2008, pp. 87-184. doi: 10.1016/S1076-5670(07)00003-1.

Ronneberger, et al., "U-Net: Convolutional Networks for Biomedical Image Segmentation", arXiv:1505.04597v1, 2015, 8 pages.

Rossi, E.A., et al, "In vivo imaging of retinal pigment epithelium cells in age related macular degeneration," Biomedical Optics Express, vol. 4, No. 11, Nov. 1, 2013, pp. 2527-2539. doi: 10./1364/BOE.4.002527].

Rowe, M., et al, "Polarization-difference imaging: a biologically inspired technique for observation through scattering media," Optics Letters, vol. 20, No. 6, Mar. 15, 1995, pp. 608-610. doi:10.1364/OL.20.000608.

Sankaranarayanan, Aswin C., et al., "CS-MUVI: Video Compressive Sensing for Spatial-Multiplexing Cameras," Proceedings of the IEEE International Conference Computational Photography (ICCP), Apr. 2012, pp. 11. doi:10.1109/ICCPhot.2012.6215212.

Sarder, et al. "Deconvolution Methods for 3-D Fluorescence Microscopy Images," IEEE Signal Processing Magazine, vol. 23, No. 3, May 2006, pp. 32-45.

Schechner, Y., "Multiplexing for Optimal Lighting," IEEE Transactions on Pattern Analysis and Machine Intelligence, vol. 29, No. 8, Aug. 2007, pp. 1339-1354. doi: 10.1109/TPAMI.2007.1151.

Schnars, U., et al, "Digital recording and numerical reconstruction of holograms," Measurement Science and Technology, vol. 13, No. 9, Aug. 7, 2002, pp. R85-R101. doi: 10.1088/0957-0233/13/9/201.

Schwarz, C., et al, "Imaging interferometric microscopy," Optics letters, vol. 28, No. 16, Aug. 15, 2003, pp. 1424-1426. doi: 10.1364/OL.28.001424.

Shechner, Y., et al, "Polarization-based vision through haze," Applied Optics, vol. 42, No. 3, Jan. 20, 2003, pp. 511-525. doi: 10.1364/AO.42.000511.

Shechtman, Y., et al, "Sparsity based sub-wavelength imaging with partially incoherent light via quadratic compressed sensing," Optics Express, vol. 19, No. 16, Aug. 1, 2011, pp. 14807-14822. doi:10.1364/OE.19.014807.

Shemonski, et al., "Computational high-resolution optical imaging of the living human retina," Nat. Photonics, vol. 9, Jul. 2015, pp. 440-443.

Shen, C., et al., "Computational aberration correction of VIS-NIR multispectral imaging microscopy based on Fourier ptychography" Optics Express, 2019. 27(18): 24923-24937.

Siegel, R., et al., "Cancer Statistics 2013," CA: A Cancer Journal for Clinicians, vol. 63, No. 1, Jan. 1, 2013, pp. 11-30. doi: 10.3322/caac.21166.

Soulez, et al., "Blind deconvolution of 3D data in wide field fluorescence microscopy" In 2012 9th IEEE International Symposium on Biomedical Imaging (ISBI) May 2, 2012, pp. 1735-1738.

SPIE-AAPM-NCI BreastPathQ: Cancer Cellularity Challenge 2019, "Overview", [Webpage] as retrieved from the internet on Jun. 2, 2022. URL: https://breastpathq.grand-challenge.org/.

Stoecker, W., et al, "Diagnostic Inaccuracy of Smartphone Applications for Melanoma Detection: Representative Lesion Sets and the Role for Adjunctive Technologies," JAMA Dermatology, vol. 149, No. 7, Jul. 1, 2013, pp. 884-884. doi:10.1001/jamadermatol.2013.4334.

Sun, D., et al, "Estimating a signal from a magnitude spectrogram via convex optimization," arXiv preprint arXiv:1209.2076, Sep. 10, 2012, pp. 1-7. [retrieved Nov. 9, 2015] URL: https://arxiv.org/abs/1209.2076.

Sun, et al., "Sampling criteria for Fourier ptychographic microscopy in object space and frequency space," Optics Express vol. 24, No. 14, Jul. 11, 2016, pp. 15765-15781.

Sun, et al., "Efficient positional misalignment correction method for Fourier ptychographic microscopy," Biomedical Optics Express vol. 7, No. 4, Mar. 17, 2016, pp. 1336-1350.

Sun, et al., "Resolution-enhanced Fourier ptychographic microscopy based on high-numerical-aperture illuminations," Scientific Reports, vol. 7, No. 1187, Apr. 26, 2017, pp. 1-11.

Sun, J., "Coded multi-angular illumination for Fourier ptychography based on Hadamard codes," In Proc. SPIE, vol. 9524, Jul. 17, 2015, pp. 95242C-1-94242C-5. doi:10.1117/12.2189655 [retrieved Jul. 23, 2015] URL: http://proceedings.spiedigitallibrary.org.

Symmans, W. Fraser, et al, "Measurement of residual breast cancer burden to predict survival after neoadjuvant chemotherapy" Journal of Clinical Oncology, 2007. 25(28): 4414-4422.

Tam, K., et al, "Tomographical imaging with limited-angle input," Journal of the Optical Society of America, vol. 71, No. 5, May 1981, pp. 582-592. doi:doi.org/10.1364/JOSA.71.000582.

Thibault, P., et al, "High-resolution scanning X-ray diffraction microscopy," Science AAAS, vol. 321, No. 5887, Jul. 18, 2008, pp. 379-382. doi:10.1126/science. 1158573.

Thibault, P. et al, "Probe retrieval in ptychographic coherent diffractive imaging," Ultramicroscopy, vol. 109, No. 4, Mar. 2009, pp. 338-343. doi:10.1016/j.ultramic.2008.12.011.

Thiébaut and Conan, "Strict a priori constraints for maximumlikelihood blind deconvolution," J. Opt. Soc. Am. A, vol. 12, No. 3, Mar. 1995, pp. 485-492.

Thomas, L., et al, "Semiological Value of ABCDE Criteria in the Diagnosis of Cutaneous Pigmented Tumors," Dermatology, vol. 197, No. 1, Jul. 13, 1998, p. 11-17. doi:10.1159/000017969.

Tian and Waller, "3D intensity and phase imaging from light field measurements in an LED array microscope," Optica vol. 2, No. 2, Feb. 2015, pp. 104-111.

Tian, L., et al, "3D differential phase-contrast microscopy with computational illumination using an LED array," Optics Letters, vol. 39, No. 5, Mar. 1, 2014, pp. 1326-1329. doi:10.1364/OL39.001326.

Tian, L., et al, "Computational illumination for high-speed in vitro Fourier ptychographic microscopy," Optica: Research Article, vol. 2, No. 10, Oct. 14, 2015, pp. 904-911. doi:10.1364/OPTICA.2.000904.

Tian, L., et al, "Multiplexed Coded Illumination for Fourier Ptychography with an LED Array Microscope," Biomedical Optics Express, vol. 5, No. 7, Jul. 1, 2014, pp. 14. doi:10.1364/BOE.5.002376.

Tippie, A.E., et al, "High-resolution synthetic-aperture digital holography with digital phase and pupil correction," Optics Express, vol. 19, No. 13, Jun. 20, 2011, pp. 12027-12038. doi:10.1364/OE.19.012027.

Tomer et al., "Advanced CLARITY for rapid and high-resolution imaging of intact tissues," Nat. Protoc., vol. 9, No. 7, Jul. 2014, pp. 1682-1697.

Turpin, T., et al, "Theory of the synthetic aperture microscope," SPIE Proceedings, vol. 2566: Advanced Imaging Technologies and Commercial Applications, Aug. 23, 1995, pp. 230-240. [retrieved Mar. 16, 2015] URL: http://dx.doi.org/10.1117/12.217378.

Tyson, R., "Principles of Adaptive Optics" Third Ed., Series In Optics and Optoelectronics, CRC Press, Sep. 14, 2010, pp. 1-299. ISBN: 13: 978-1-4398-0859-7.

(56) References Cited

OTHER PUBLICATIONS

U.S. Appl. No. 17/455,640, Inventors Zheng et al., filed Nov. 18, 2021.
U.S. Appl. No. 63/153,736, inventors Yang et al., filed Feb. 25, 2021.
US Ex Parte Quayle Action dated Aug. 8, 2019 issued in U.S. Appl. No. 16/242,934.
U.S. Final Office Action dated Apr. 3, 2017 in U.S. Appl. No. 14/065,280.
U.S. Final Office Action dated Dec. 10, 2018 issued in U.S. Appl. No. 15/003,559.
U.S. Final Office Action dated Dec. 14, 2017 in U.S. Appl. No. 14/960,252.
U.S. Final Office Action dated Dec. 28, 2017 in U.S. Appl. No. 14/710,947.
U.S. Final Office Action dated Jan. 17, 2018 in U.S. Appl. No. 14/658,019.
U.S. Final Office Action dated Jan. 23, 2017 in Application No. 15/007,196.
U.S. Final Office Action dated Jul. 27, 2017 in U.S. Appl. No. 15/003,559.
U.S. Final Office Action dated Jun. 19, 2019 issued in U.S. Appl. No. 15/068,389.
U.S. Final Office Action dated Jun. 3, 2019 in U.S. Appl. No. 15/959,050.
U.S. Final Office Action dated Jun. 6, 2018 issued in U.S. Appl. No. 15/068,389.
U.S. Final Office Action dated May 1, 2020 issued in U.S. Appl. No. 16/252,465.
U.S. Final Office Action dated May 30, 2019 in U.S. Appl. No. 14/658,019.
U.S. Final Office Action dated May 30, 2019 in U.S. Appl. No. 14/979,154.
U.S. Final Office Action dated Nov. 29, 2018 in U.S. Appl. No. 14/065,280.
U.S. Final Office Action dated Oct. 29, 2020 in U.S. Appl. No. 14/658,019.
U.S. Notice of Allowance dated Apr. 13, 2016 in U.S. Appl. No. 14/448,850.
U.S. Notice of Allowance dated Apr. 13, 2022 in U.S. Appl. No. 14/658,019.
U.S. Notice of Allowance dated Apr. 16, 2019 in U.S. Appl. No. 15/820,295.
U.S. Notice of Allowance dated Apr. 19, 2019 in U.S. Appl. No. 15/963,966.
U.S. Notice of Allowance dated Apr. 22, 2016 in U.S. Appl. No. 14/466,481.
U.S. Notice of Allowance dated Apr. 29, 2019 issued in U.S. Appl. No. 15/620,674.
U.S. Notice of Allowance dated Apr. 3, 2020 in U.S. Appl. No. 16/162,271.
U.S. Notice of Allowance dated Apr. 6, 2021 issued in U.S. Appl. No. 16/552,948.
U.S. Notice of Allowance dated Apr. 7, 2020 issued in U.S. Appl. No. 16/179,688.
U.S. Notice of Allowance dated Aug. 12, 2019 in U.S. Appl. No. 14/960,252.
U.S. Notice of Allowance dated Aug. 14, 2019 issued in U.S. Appl. No. 15/620,674.
U.S. Notice of Allowance dated Aug. 16, 2017 in U.S. Appl. No. 15/209,604.
U.S. Notice of Allowance dated Aug. 23, 2016 in U.S. Appl. No. 14/466,481.
U.S. Notice of Allowance dated Dec. 4, 2015 in U.S. Appl. No. 14/065,305.
U.S. Notice of Allowance dated Dec. 4, 2017 in U.S. Appl. No. 14/065,305.
U.S. Notice of Allowance dated Dec. 9, 2019 in U.S. Appl. No. 16/162,271.
U.S. Notice of Allowance dated Feb. 18, 2020 issued in U.S. Appl. No. 16/242,934.
U.S. Notice of Allowance dated Feb. 9, 2018 in U.S. Appl. No. 15/081,659.
U.S. Notice of Allowance dated Jan. 13, 2017 in U.S. Appl. No. 14/065,305.
U.S. Notice of Allowance dated Jan. 14, 2016 in U.S. Appl. No. 14/448,850.
U.S. Notice of Allowance dated Jan. 14, 2019 in U.S. Appl. No. 15/820,295.
U.S. Notice of Allowance dated Jan. 15, 2019 issued in U.S. Appl. No. 15/620,674.
U.S. Notice of Allowance dated Jan. 17, 2020 issued in U.S. Appl. No. 15/003,559.
U.S. Notice of Allowance dated Jan. 22, 2016 in U.S. Appl. No. 14/466,481.
U.S. Notice of Allowance dated Jan. 23, 2018 in U.S. Appl. No. 15/206,859.
U.S. Notice of Allowance dated Jan. 24, 2020 issued in U.S. Appl. No. 15/068,389.
U.S. Notice of Allowance dated Jan. 26, 2018 in U.S. Appl. No. 15/209,604.
U.S. Notice of Allowance dated Jan. 29, 2020 issued in U.S. Appl. No. 14/065,280.
U.S. Notice of Allowance dated Jan. 6, 2020 in U.S. Appl. No. 14/960,252.
U.S. Notice of Allowance dated Jul. 16, 2018 in U.S. Appl. No. 15/007,159.
U.S. Notice of Allowance dated Jul. 25, 2018 in U.S. Appl. No. 14/710,947.
U.S. Notice of Allowance dated Jun. 20, 2017 in U.S. Appl. No. 14/572,493.
U.S. Notice of Allowance dated Jun. 27, 2018 in U.S. Appl. No. 15/636,494.
U.S. Notice of Allowance dated Jun. 9, 2017 U.S. Appl. No. 15/007,196.
U.S. Notice of Allowance dated Jun. 9, 2017 in U.S. Appl. No. 14/065,305.
U.S. Notice of Allowance dated Jun. 9, 2017 in U.S. Appl. No. 15/206,859.
U.S. Notice of Allowance dated Mar. 2, 2020 in U.S. Appl. No. 14/979,154.
U.S. Notice of Allowance dated Mar. 22, 2017 in U.S. Appl. No. 15/007,196.
U.S. Notice of Allowance dated Mar. 31, 2017 in U.S. Appl. No. 14/572,493.
U.S. Notice of Allowance dated Mar. 8, 2017 in U.S. Appl. No. 14/572,493.
U.S. Notice of Allowance dated Nov. 2, 2016 in U.S. Appl. No. 14/572,493.
U.S. Notice of Allowance dated Nov. 20, 2019 in U.S. Appl. No. 15/959,050.
U.S. Notice of Allowance dated Nov. 4, 2019 issued in U.S. Appl. No. 16/242,934.
U.S. Notice of Allowance dated Oct. 11, 2017 in U.S. Appl. No. 14/572,493.
U.S. Notice of Allowance dated Oct. 19, 2018 issued in U.S. Appl. No. 15/160,941.
U.S. Notice of Allowance dated Oct. 20, 2017 in U.S. Appl. No. 15/081,659.
U.S. Notice of Allowance dated Oct. 5, 2018 in U.S. Appl. No. 15/636,494.
U.S. Notice of Allowance dated Sep. 1, 2017 in U.S. Appl. No. 15/206,859.
U.S. Notice of Allowance dated Sep. 16, 2019 issued in U.S. Appl. No. 15/068,389.
U.S. Notice of Allowance dated Sep. 17, 2018 in U.S. Appl. No. 15/820,295.
U.S. Notice of Allowance dated Sep. 17, 2019 in U.S. Appl. No. 14/960,252.
U.S. Notice of Allowance dated Sep. 20, 2017 in U.S. Appl. No. 15/007,196.

(56) References Cited

OTHER PUBLICATIONS

U.S. Notice of Allowance dated Sep. 25, 2019 issued in U.S. Appl. No. 15/620,674.
U.S Office Action dated Apr. 13, 2018 issued in U.S. Appl. No. 15/160,941.
U.S. Office Action dated Apr. 4, 2018 issued in U.S. Appl. No. 15/003,559.
U.S. Office Action dated Apr. 4, 2019 in U.S. Appl. No. 16/162,271.
U.S. Office Action dated Aug. 16, 2016 in U.S. Appl. No. 14/065,280.
U.S. Office Action dated Aug. 28, 2020 in U.S. Appl. No. 16/572,497.
U.S. Office Action dated Aug. 31, 2017 in U.S. Appl. No. 15/636,494.
U.S. Office Action dated Aug. 7, 2020 issued in U.S. Appl. No. 16/552,948.
U.S. Office Action dated Dec. 13, 2018 in U.S. Appl. No. 14/960,252.
U.S. Office Action dated Dec. 26, 2018 in U.S. Appl. No. 15/959,050.
U.S. Office Action dated Dec. 26, 2018 in U.S. Appl. No. 15/963,966.
U.S. Office Action dated Feb. 21, 2017 in U.S. Appl. No. 14/960,252.
U.S. Office Action dated Jan. 17, 2019 issued in U.S. Appl. No. 15/068,389.
U.S. Office Action dated Jan. 25, 2018 in U.S. Appl. No. 14/065,280.
U.S. Office Action dated Jan. 9, 2020 in U.S. Appl. No. 14/658,019.
U.S. Office Action dated Jul. 14, 2016 in U.S. Appl. No. 15/007,196.
U.S. Office Action dated Jun. 10, 2021 in U.S. Appl. No. 14/658,019.
U.S. Office Action dated Jun. 26, 2019 issued in U.S. Appl. No. 14/065,280.
U.S. Office Action dated Jun. 26, 2019 issued in U.S. Appl. No. 15/003,559.
U.S. Office Action dated Mar. 13, 2017 in U.S. Appl. No. 14/658,019.
U.S. Office Action dated Mar. 24, 2017 in U.S. Appl. No. 14/710,947.
U.S. Office Action dated Mar. 8, 2019 in U.S. Appl. No. 16/171,270.
U.S. Office Action dated May 19, 2017 in U.S. Appl. No. 15/081,659.
U.S. Office Action dated May 25, 2021 issued in U.S. Appl. No. 16/864,618.
U.S. Office Action dated Nov. 22, 2016 in U.S. Appl. No. 15/003,559.
U.S. Office Action dated Nov. 3, 2017 in U.S. Appl. No. 15/068,389.
U.S. Office Action dated Nov. 30, 2017 in U.S. Appl. No. 15/007,159.
U.S. Office Action dated Oct. 11, 2019 issued in U.S. Appl. No. 16/179,688.
U.S. Office Action dated Oct. 4, 2018 in U.S. Appl. No. 14/658,019.
U.S. Office Action dated Oct. 5, 2015 in U.S. Appl. No. 14/065,305.
U.S. Office Action dated Sep. 16, 2016 in U.S. Appl. No. 14/065,305.
U.S. Office Action dated Sep. 23, 2019 issued in U.S. Appl. No. 16/252,465.
U.S. Office Action dated Sep. 7, 2018 in U.S. Appl. No. 14/979,154.
U.S. Office Action Interview Summary dated May 3, 2018 in U.S. Appl. No. 15/068,389.
Vulovic, M., et al, "When to use the projection assumption and the weak-phase object approximation in phase contrast cryo-EM," Ultramicroscopy, vol. 136, Jan. 2014, pp. 61-66.doi:10.1016/j.ultramic.2013.08.002.
Wade, et al., "A fast, robust pattern recognition system for low light level image registration and its application to retinal imaging," Optics Express vol. 3, No. 5, Aug. 31, 1998, pp. 190-197.
Waldspurger, I., et al, "Phase recovery, MaxCut and complex semidefinite programming," Mathematical Programming, vol. 149, No. 1-2, Feb. 2015, pp. 47-81. doi:10.1007/s10107-013-0738-9.
Wang, Q., et al, "Adaptive Optics Microperimetry and OCT Images Show Preserved Function and Recovery of Cone Visibility in Macular Telangiectasia Type 2 Retinal Lesions," Investigative Ophthalmology Visual Science, vol. 56, No. 2, Feb. 2015, pp. 778-786. doi:10.1167/iovs.14-15576 [retrieved on Apr. 5, 2016] [URL: http://iovs.arvojournals.org].
Wang, Z., et al, "Tissue refractive index as marker of disease," Journal of Biomedical Optics, vol. 16, No. 11, Nov. 2011, pp. 116017-1-16017-7. doi:10.1117/1.3656732.
Watanabe, M., et al, "Telecentric optics for focus analysis," IEEE Transactions on Pattern Analysis and Machine Intelligence: Short Papers, vol. 19, No. 12, Dec. 1997, pp. 1360-1365. doi:10.1109/34.643894.
Weigert, Martin, et al, "Content-aware image restoration: pushing the limits of fluorescence microscopy" Nature methods, 2018. 15(12): 1090-1097.
Wesner, J., et al, "Reconstructing the pupil function of microscope objectives from the intensity PSF," Proc. SPIE 4767, Current Developments in Lens Design and Optical Engineering III, 32 (Oct. 1, 2002), pp. 32-43. doi:10.1117/12.451320 [retrieved Dec. 16, 2015] URL:http://proceedings.spiedigitallibrary.org.
Williams, A., et al., "Fourier ptychographic microscopy for filtration-based circulating tumor cell enumeration and analysis," Journal of Biomedical Optics, vol. 19, No. 6, Jun. 20, 2014, pp. 066007.1-66007.8. doi:10.1117/1.JBO.19.6.066007 [retrieved Feb. 10, 2016] URL:http://biomedicaloptics.spiedigitallibrary.org.
Williams, D., "Imaging Single Cells in the Living Retina," Vis. Res. 51, pp. 1379-1396 (Jul. 1, 2011).
Wills, S., "Synthetic Apertures for the Optical Domain," Optics & Photonics News Article [webpage], The Optical Society (OSA), Apr. 18, 2017, pp. 2. URL:https://www.osa-opn.org/home/newsroom/2017/april/synthetic_apertures_for_the_optical_domain/.
Wolf, J., et al, "Diagnostic Inaccuracy of Smartphone Applications for Melanoma Detection," JAMA Dermatol. Author Manuscript; available in PMC May 13, 2014. Published in final edited form as: JAMA Dermatol. Apr. 2013; 149(4): 422-426. doi:10.1001/jamadermatol.2013.2382.
Wu, J., et al, "Focal plane tuning in wide-field-of-view microscope with Talbot pattern illumination," Optics Letters, vol. 36, No. 12, Jun. 15, 2011, pp. 2179-2181. doi:145985.
Wu, J., et al, "Harmonically matched grating-based full-field quantitative high-resolution phase microscope for observing dynamics of transparent biological samples," Optics Express, vol. 15, No. 26, Dec. 24, 2007, pp. 18141-18155. doi:10.1364/OE.15.018141.
Wu, J., et al, "Paired-angle-rotation scanning optical coherence tomography forward-imaging probe," Optics Letters, vol. 31, No. 9, May 1, 2006, pp. 1265-1267. doi:10.1364/OL.31.001265.
Wu, J., et al, "Wide field-of-view microscope based on holographic focus grid illumination," Optics Letters, vol. 35, No. 13, Jul. 1, 2010, pp. 2188-2190. doi:10.1364/OL.35.002188.
Wu, Yichen, et al, "Three-dimensional virtual refocusing of fluorescence microscopy images using deep learning" Nature methods, 2019. 16(12): 1323-1331.
Xu, W., et al, "Digital in-line holography for biological applications," Proceedings of the National Academy of Sciences of the USA (PNAS), vol. 98, No. 20, Sep. 25, 2001, pp. 11301-11305. doi:10.1073/pnas.191361398.
Yamane, Yuki, et al, "A novel histopathological evaluation method predicting the outcome of non-small cell lung cancer treated by neoadjuvant therapy: the prognostic importance of the area of residual tumor" Journal of Thoracic Oncology, 2010. 5(1): 49-55.
Yaroslavsky, "Image Resampling and Building Continuous Image Models", Chapter 6, Theoretical Foundations of Digital Imaging Using MATLAB , pp. 293-342 (CRC Press, 1 edition, Nov. 26, 2012).
Yeh, et al., "Experimental robustness of Fourier ptychography phase retrieval algorithms," Optics Express, vol. 23, No. 26, Dec. 28, 2015, pp. 33214-33240. doi: 10.1364/OE.23.033214.
Yuan, C., et al, "Angular multiplexing in pulsed digital holography for aperture synthesis," Optics Letters, vol. 33, No. 20, Oct. 15, 2008, pp. 2356-2358. doi:10.1364/OL.33.002356.
Yuan, et al., "Image deblurring with blurred/noisy image pairs," ACM Trans. Graph. 26, Jul. 29, 2007, pp. 1-10.
Zeiss, C., "Microscopy: Cells Need The Perfect Climate. System Solutions for Live Cell Imaging under Physiological Conditions," ZEISS Product Brochure, Carl Zeiss Microscopy GmbH Co., Feb. 2008, pp. 42. URL: http://www.zeiss.de/incubation.
Zhang, Y., et al, "Self-learning based Fourier ptychographic microscopy," Optics Express, vol. 23, No. 14, Jul. 13, 2015, pp. 18471-18486. doi: 10.1364/OE.23.018471.
Zhang, Y., et al, "Photoreceptor perturbation around subretinal drusenoid deposits as revealed by adaptive optics scanning laser ophthalmoscopy," HHS Public Access, Am J Ophthalmol. Author Manuscript, Sep. 1, 2015, pp. 22. (Published in final edited form as: Am J Ophthalmol. Sep. 2014; 158(3): 584-96.e1.).

(56) References Cited

OTHER PUBLICATIONS

Zheng, G., et al, "0.5 gigapixel microscopy using a flatbed scanner," Biomedical Optics Express, vol. 5, No. 1, Jan. 1, 2014, pp. 1-8. doi: 10.1364/BOE.5.000001.
Zheng, G., et al, "Characterization of spatially varying aberrations for wide field-of-view microscopy," Optics Express, vol. 21, No. 13, Jul. 1, 2013, pp. 15131-15143. doi:10.1364/OE.21.015131.
Zheng, G., et al., "Microscopy refocusing and dark-field imaging by using a simple LED array," Optics Letters, vol. 36, No. 20, Oct. 15, 2011, pp. 3987-3989. doi: 10.1364/OL.36.003987.
Zheng, G., et al, "Sub-pixel resolving optofluidic microscope for on-chip cell imaging," Lab Chip, vol. 10, Sep. 29, 2010, pp. 3125-3129. doi: 10.1039/c0Lc00213e [retrieved on Oct. 4, 2010] URL: http://pubs.rsc.org.
Zheng, G., et al, "Wide-field, high-resolution Fourier ptychographic microscopy," Nature Photonics, vol. 7, Sep. 2013, Published Online Jul. 28, 2013, pp. 739-746. doi:10.1038/NPHOTON.2013.187.
Zheng, G., "Fourier Ptychographic Imaging: A MATLAB tutorial," IOP Concise Physics, Morgan & Claypool Publication, San Rafael, CA., May 2016, pp. 96. ISBN: 978-1-6817-4272-4 (ebook) doi: 10.1088/978-1-6817-4273-1.
Zheng, G. "The ePetri dish, an on-chip cell imaging platform based on subpixel perspective sweeping microscopy (SPSM)," PNAS Early Edition, Published online before print Oct. 3, 2011, pp. 6. doi:10.1073/pnas.1110681108.
Zhou, et al., "What are Good Apertures for Defocus Deblurring?" in 2009 IEEE International Conference on Computational Photography (IEEE, Apr. 16-17, 2009), pp. 1-8.
Bai, B., et al., "Deep Learning-enabled Virtual Histological Staining of Biological Samples," Light, science & applications, 2023, vol. 12(1), pp. 1-20.
International Search Report and Written Opinion dated Aug. 5, 2024 in PCT Application No. PCT/US2024/024868.
Tomita, M., et al., "Attention-based Deep Neural Networks for Detection of Cancerous and Precancerous Esophagus Tissue on Histopathological Slides," JAMA network open, 2019, vol. 2(11), pp. 1-13.
An, N., et al., Risk Factors for Brain Metastases in Patients With Non-small-cell Lung Cancer, Cancer medicine, 2018, vol. 7(12), pp. 6357-6364.
Binnewies, M., et al., Understanding the Tumor Immune Microenvironment (Time) for Effective Therapy, Nature medicine, 2018, vol. 24(5), pp. 541-550.
Bunn, P., "Early-Stage Non-Small-Cell Lung Cancer: Current Perspectives in Combined-Modality Therapy," Journal of the National Comprehensive Cancer Network, 2004, vol. 6(2), pp. 85-98.
Bychkov, D., et al., Deep learning based tissue analysis predicts outcome in colorectal cancer, Scientific reports, 2018, vol. 8(1), 1-11.
Campanella, G., et al., Clinical-grade Computational Pathology Using Weakly Supervised Deep Learning on Whole Slide Images, Nature medicine, 2019, vol. 25(8), pp. 1301-1309.
Carolan, H., et al., "Does the Incidence and Outcome of Brain Metastases in Locally Advanced Non-small Cell Lung Cancer Justify Prophylactic Cranial Irradiation or Early Detection?," Lung cancer, 2005, vol. 49(1), pp. 109-115.
Chen, R., et al., "Scaling Vision Transformers to Gigapixel Images via Hierarchical Self-Supervised Learning," IEEE, 2022, pp. 16123-16134.
Choi, H., et al., "S100b and S100b Autoantibody as Biomarkers for Early Detection of Brain Metastases in Lung Cancer," Translational lung cancer research, 2016, vol. 5(4), pp. 413-419.
Claveau. R, et al., "Digital refocusing and extended depth of field reconstruction in Fourier ptychographic microscopy", Biomed Optic Express, Jan. 2022. vol. 11(1). pp. 215-226.
Coudray, N., et al., Classification and Mutation Prediction From Non-small Cell Lung Cancer Histopathology Images Using Deep Learning, Nature medicine, 2018, vol. 24(10), pp. 1559-1567.

Echle, A., et al., "Deep Learning in Cancer Pathology: a New Generation of Clinical Biomarkers," British journal of cancer, 2021, vol. 124(4), pp. 686-696.
English Translated document of JP-2002163660-A (Year: 2002).
EP Examination report dated Aug. 16, 2022 in Application No. EP20160744003.
European Office Action dated Feb. 22, 2022 in Application No. EP16765505.9.
Felip, E., et al., "Overall Survival with Adjuvant Atezolizumab After Chemotherapy in Resected Stage II-IIIA Non-small-cell Lung Cancer (IMpower010): A Randomised, Multicentre, Open-label, Phase III Trial," Annals of Oncology, 2023, vol. 34(10), pp. 907-919.
Ganti, A., et al., "Update of Incidence, Prevalence, Survival, and Initial Treatment in Patients With Non-Small Cell Lung Cancer in the US," JAMA oncology, 2021, vol. 7(12), pp. 1824-1832.
Godoy, L., et al., "Emerging Precision Neoadjuvant Systemic Therapy for Patients With Resectable Non-small Cell Lung Cancer: Current Status and Perspectives," Biomarker research, 2023, vol. 11(1), pp. 1-29.
He, K. et al., "deep Residual Learning for Image Recognition", Microsoft Research, 2015, pp. 1-12 URL: https://arxiv.org/abs/1512.03385v1.
International Search Report and Written Opinion dated Jun. 13, 2022, in International Application No. PCT/US2022/018040.
International Preliminary Report on Patentability dated Sep. 7, 2023, in PCT Application No. PCT/US2022/018040.
Johnson, B., et al., "Patient Subsets Benefiting From Adjuvant Therapy Following Surgical Resection of Non-small Cell Lung Cancer," Clinical cancer research, 2005, vol. 11(13), pp. 5022s-5026s.
MERCK & Co., Inc., "FDA Approves KEYTRUDA® (pembrolizumab) as Adjuvant Treatment Following Surgical Resection and Platinum-Based Chemotherapy for Patients With Stage IB (T2a >4 Centimeters), II or IIIA Non-Small Cell Lung Cancer (NSCLC)," Jan. 2023, 23 pages.
Otsu, N., "A Threshold Selection Method from Gray-Level Histograms," IEEE, 1979, vol. 9(1), pp. 62-66.
Shintani, Y., et al., "Therapeutic Targeting of Cancer-Associated Fibroblasts in the Non-Small Cell Lung Cancer Tumor Microenvironment," Cancers, 2023, vol. 15(2), p. 335.
Souza, V., et al., Advances in the Molecular Landscape of Lung Cancer Brain Metastasis, Cancers, 2023, vol. 15(3), pp. 1-28.
Stogbauer, F., et al., Tumour Cell Budding and Spread Through Air Spaces in Squamous Cell Carcinoma of the Lung—Determination and Validation of Optimal Prognostic Cut-offs, Lung cancer, 2022, vol. 169, pp. 1-12.
Tsai, P., et al., "Histopathology images predict multi-omics aberrations and prognoses in colorectal cancer patients," Nature communications, 2023, vol. 14(1), pp. 1-13.
Tsui, D., et al., "Managing Central Nervous System Spread of Lung Cancer: The State of the Art," Journal of clinical oncology, 2022, vol. 40(6), pp. 642-660.
U.S. Corrected Notice of Allowance dated Aug. 4, 2022 in U.S. Appl. No. 14/658,019.
U.S. Final Office Action dated Apr. 1, 2024 in U.S. Appl. No. 17/455,640.
U.S. Final Office Action dated Apr. 18, 2023 in U.S. Appl. No. 17/455,640.
U.S. Non-Final Office Action dated Oct. 12, 2023, in U.S. Appl. No. 17/455,640.
U.S. Non-Final Office Action dated Oct. 20, 2022, in U.S. Appl. No. 17/455,640.
U.S. Appl. No. 18/638,327, inventor Yang C, filed Apr. 17, 2024.
Vahadane, A., et al., Structure-Preserving Color Normalization and Sparse Stain Separation for Histological Images, IEEE transactions on medical imaging, 2016, vol. 35(8), pp. 1962-1971.
Visona, G., et al., Machine-Learning-Aided Prediction of Brain Metastases Development in Non-Small-Cell Lung Cancers, Clinical lung cancer, 2023, vol. 24(8), pp. e311-e322.
Waqar, S., et al., "Systemic Treatment of Brain Metastases," Hematology/oncology clinics of North America, 2017, vol. 31(1), pp. 157-176.

(56) References Cited

OTHER PUBLICATIONS

Weaver, C., et al., "Treatment of Stage I-IIIA Non-Small Cell Lung Cancer," CancerConnect, 2021, pp. 1-13.
Wood, S., et al., "The Role of the Tumor-microenvironment in Lung Cancer-metastasis and Its Relationship to Potential Therapeutic Targets," Cancer treatment reviews, 2014, vol. 40(4), pp. 558-566.
Yokoi, K., et al., "Detection of brain metastasis in potentially operable non-small cell lung cancer: a comparison of CT and MRI," Chest, 1999, vol. 115(3), pp. 714-719.
Yu, K., et al., "Predicting Non-small Cell Lung Cancer Prognosis by Fully Automated Microscopic Pathology Image Features," Nature communications, 2016, vol. 7, pp. 1-10.
Zhou H., et al., "AI-guided Histopathology Predicts Brain Metastasis in Lung Cancer Patients," Journal of Pathology, 2024, vol. 263, pp. 89-98.
U.S. Notice of Allowance dated Oct. 25, 2024 in U.S. Appl. No. 17/455,640.
U.S. Restriction Requirement dated Sep. 16, 2024 in U.S. Appl. No. 17/820,496.

\* cited by examiner

COMPUTATIONAL REFOCUSING-ASSISTED DEEP LEARNING

CROSS-REFERENCES TO RELATED APPLICATIONS

This application claims priority to and the benefit of U.S. Provisional Patent Application No. 63/153,736, titled "USING FPM'S REFOCUSING WITH AI (INCLUDING DEEP LEARNING) TO GET BETTER QUALITY TRAINING AND ANALYSIS" and filed on Feb. 25, 2021, which is hereby incorporated by reference in its entirety and for all purposes.

FIELD

Certain aspects pertain generally to computational refocusing methods, apparatus, and systems, and more particularly, to methods, apparatus, and systems that implement a Fourier ptychography digital refocusing procedure to enhance deep learning and machine learning models in applications such as, for example, pathology.

BACKGROUND

Deep learning and machine learning can have profound and lasting impacts in pathology. Benefits may include automation and off-loading of certain labor-intensive pathology analysis tasks to computers. This is particularly true for analysis of histologic/cytologic images, which require both the ability to distinguish subtle features (requiring years of training) and the ability to recognize these subtle changes through the analysis of mostly routine images, requiring significant time and concentration. Tasks characterized by these subjective and labor-intensive analyses may be suited to automated deep learning approaches. For example, deep learning-based image analysis can dramatically improve the work efficiency of trained pathologists and provide an objective basis for a wide range of pathology applications. In resource-poor environments (e.g., with few annotated histology/cytology samples), automated image analysis may even be the only source of pathology expertise available.

SUMMARY

Certain aspects pertain to computational refocusing-assisted deep learning methods, apparatus, and systems.

One aspect pertains to a computational refocusing-assisted deep learning method that comprises generating a representative image of an analysis image of a specimen using a machine learning model trained by a first training dataset comprising one or more substantially uniformly focused images generated using a Fourier ptychography digital refocusing procedure. The one or more substantially uniformly focused images are annotated to indicate portions of interest. The method further comprises automatedly identifying portions of interest in the analysis image based on the representative image.

Certain aspects pertain to methods of analyzing a cytology specimen. In one aspect, the method comprises obtaining an all-in-focus analysis image of the cytology specimen using a Fourier ptychographic digital refocusing procedure, generating a representative image of the all-in-focus analysis image based on a machine learning model, and automatedly identifying one or more points of interest in the cytology specimen based on the representative image. The machine learning model is trained by at least one or more all-in-focus training images generated by the Fourier ptychographic digital refocusing procedure and at least one training segmented image indicative of positions of points of interest in the one or more all-in-focus training images.

Certain aspects pertains to methods of identifying points of interest (e.g., abnormalities and/or spatial relationships) in a specimen. In one aspect, a method for identifying points of interest in a specimen comprises obtaining an analysis image of the specimen, generating a representative image of the analysis image obtained based on a machine learning model, and automatedly identifying one or more points of interest in the specimen based on the representative image. The machine learning model comprises an encoder-decoder network trained by at least receiving at least one substantially uniformly focused training image determined based on digitally refocused images at different lateral positions and generating at least one training segmented image indicative of positions of points of interest in the at least one substantially uniformly focused training image.

Certain aspects pertains to methods of training a machine learning model for identifying points of interest (e.g., abnormalities and/or spatial relationships) in a specimen. In one aspect, a method of training a machine learning model for identifying abnormalities in a specimen comprises using a Fourier ptychographic digital refocusing procedure to determine at least one substantially uniformly focused training image and generating, using an encoder-decoder convolutional network, at least one training segmented image indicative of positions of abnormalities in the at least one substantially uniformly focused training image.

Certain aspects are directed to apparatus for identifying abnormalities in a specimen. In some implementations, the apparatus comprises a machine learning model, one or more processor apparatus configured to operate the machine learning model, and a non-transitory computer-readable apparatus. The non-transitory computer-readable apparatus coupled to the one or more processor apparatus and comprising a storage medium. The storage medium comprising instructions configured to, when executed by the one or more processor apparatus, cause the apparatus to obtain an analysis image of the specimen, generate a representative image of the analysis image obtained of the specimen using the machine learning model, the machine learning model trained by (i) generation of one or more convolutional representations of at least one substantially uniformly focused image obtained using a Fourier ptychography digital refocusing procedure, and (ii) generation of at least one training segmented image based on the one or more convolutional representations of the at least one substantially uniformly focused training image; and based on the representative image, automatedly identify one or more abnormalities in the specimen. In one case, the machine learning model has further been trained by (i) determination of a performance metric based at least on an intersection of the at least one training segmented image with respect to a ground truth image. In one case, the analysis image of the specimen comprises a pathology image acquired using a refocusing procedure other than the Fourier ptychographic digital refocusing procedure or a pathology image acquired based on a microscopy procedure.

Certain aspects are directed to non-transitory computer-readable apparatus comprising a storage medium. The storage medium comprising instructions configured to, when executed by one or more processors, cause a computerized apparatus to (a) obtain an analysis image of a specimen, (b) generate a training dataset, the training dataset comprising one or more substantially uniformly focused training images generated using a Fourier ptychographic digital refocusing procedure, and (c) train a machine learning model using the training dataset, The training of the machine learning model comprises (I) generation, via one or more first sets of layers, one or more convolutional representations of the one or more training images and (II) generation, via one or more second sets of layers, a segmented image based on the one or more convolutional representations of the one or more training images. In one implementation, the analysis image is determined based on digitally refocused images at different lateral positions generated using the Fourier ptychographic digital refocusing procedure. In one implementation, the training of the machine learning model further comprises determination of a performance metric associated with the segmented image with respect to a ground truth image, the ground truth image comprising an indication of locations of one or more cells of interest. In one implementation, the training dataset comprises a pathology image from a first portion of a body; and the machine learning model has further been trained by applying one or more weights associated with the training dataset to another training dataset comprising a pathology image from a second portion of the body. In one implementation, the trained machine learning model is configured to enable enumeration of one or more cells of interest during inference with a first pathology image acquired based on a refocusing procedure other than the Fourier ptychographic digital refocusing procedure or a second pathology image acquired based on a microscopy procedure. In one implementation, the one or more first sets of layers comprise one or more sets of encoding layers, each set of encoding layers comprising one or more of: a convolution layer, a normalization layer, an activation layer, or a pooling layer; and the one or more second sets of layers comprise one or more sets of decoding layers, each set of decoding layers corresponding to one of the one or more sets of encoding layers, each set of decoding layers comprising one or more of: an upsampling layer, a deconvolution layer, the normalization layer, the activation layer, or an output layer, the output layer configured to output the segmented image, the segmented image having dimensions equal to those of the training image.

These and other features are described in more detail below with reference to the associated drawings.

DETAILED DESCRIPTION

Figure 1:
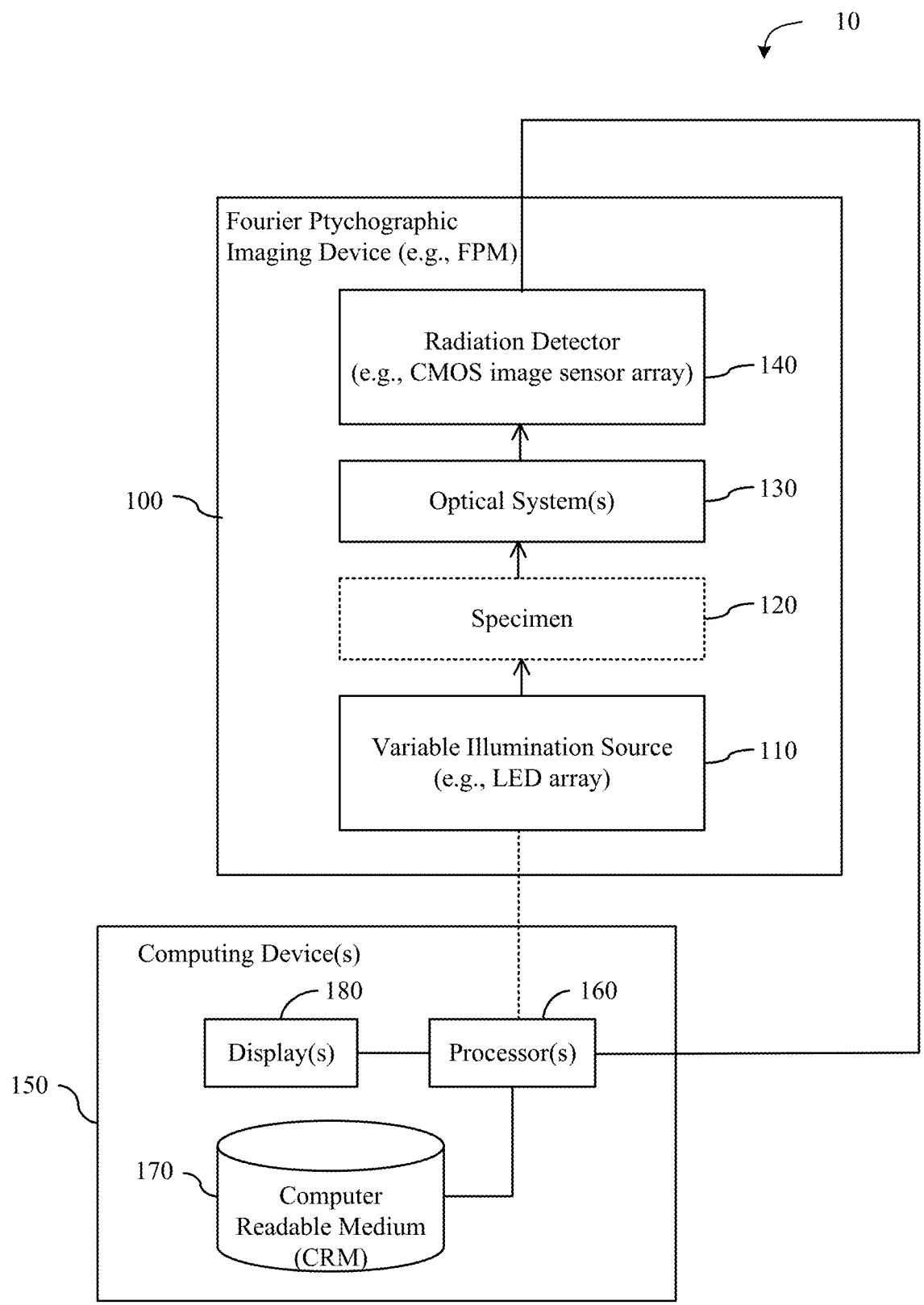
FIG. 1 depicts a block diagram of components of a computational refocusing-assisted deep learning (CRADL) system, according to implementations.

Different aspects are described below with reference to the accompanying drawings. The features illustrated in the drawings may not be to scale. In the following description, numerous specific details are set forth in order to provide a thorough understanding of the presented implementations. The disclosed implementations may be practiced without one or more of these specific details. In other instances, well-known operations have not been described in detail to avoid unnecessarily obscuring the disclosed implementations. While the disclosed implementations will be described in conjunction with the specific implementations, it will be understood that it is not intended to limit the disclosed implementations.

Moreover, although many disclosed implementations of enhanced computational refocusing techniques (e.g., Fourier ptychographic digital refocusing procedure) and associated deep learning or machine learning methods and systems will be described for imaging or detecting portions of interest (e.g., identifying and/or enumerating viable tumor cells), it would be understood that these implementations are not so limited. The presented methods and systems can also have applications in other areas such as, for example, using a trained machine learning model on portions of interest that are different from the task for which the machine learning model was originally tasked to identify and/or enumerate. In some cases, a trained model may be re-trained to identify other portions of interest based on a "transfer learning" approach. In addition, while the training of a model may be performed using enhanced images from the abovementioned enhanced computational refocusing techniques, the trained model may advantageously be used with "standard" microscopy or refocusing technologies.

Certain implementations may provide one or more technical advantages in applying artificial intelligence on histologic/cytologic images. For example, CRADL methods and systems of certain implementations can use raw images acquired at a single focal plane e.g., at high power. As another example, CRADL methods and systems of certain implementations can digitally generate training and/or analysis all-in-focus images for input into deep learning and machine learning models. In certain implementations, CRADL methods and systems may digitally generate image data at multiple focal planes based on a raw images acquired at a single focal plane in a single pass, which utilize less time and less computing power as compared to techniques that acquire raw images at multiple focal planes, which can require large amounts of memory to store and analyze the raw image data at multiple focal planes.

I. Computational Refocusing

FIG. 1 depicts a block diagram of components of a computational refocusing-assisted deep learning (CRADL) system 10, according to implementations. CRADL system 10 includes a Fourier ptychographic imaging device 100 and one or more computing devices 150 in electronic communication with Fourier ptychographic imaging device 100 to receive image data and/or to send control signals. An example of a Fourier ptychographic imaging device 100 is a Fourier ptychography microscope also sometimes referred to herein as an FPM. Computing device(s) 150 can be in various forms such as, for example, a smartphone, laptop, desktop, tablet, etc. Although computing device(s) 150 is shown as separate from Fourier ptychographic imaging device 100, computing device(s) 150 may be in the same housing and/or may share components according to certain implementations.

Fourier ptychographic imaging device 100 includes a variable illumination source 110, one or more optical systems 130, and a radiation detector 140. At a high level, Fourier ptychographic imaging device 100 is configured or configurable to illuminate a specimen from different illumination angles and acquire raw images of the specimen 120. According to certain implementations, each raw image is acquired at one sample time during which the specimen is illuminated at one of the illumination angles by variable illumination source 110. FIG. 1 depicts a specimen 120 being imaged by the Fourier ptychographic imaging device 100 during a raw image acquisition operation. It would be understood that specimen 120 is optional (denoted by a dotted line) and not necessarily present when Fourier ptychographic imaging device 100 is not in operation.

Generally speaking, a variable illumination source may be configured or configurable to provide illumination at a plurality of N illumination angles at, for example, $\theta^i$ where i=1 to N. According to one aspect, a variable illumination source is configured or configurable to illuminate a specimen being imaged in a trans-illumination mode. In these cases, illumination is provided incident to one side of the specimen and light passing through the specimen is collected on the opposing side by collection optics of the optical system(s).

The optical system(s) 130 includes components configured to receive light issuing from (passing through or reflected from) the specimen 20 and propagate the light to the radiation detector 140. Collection optics of the optical system(s) 130 are configured to receive light issuing from the specimen 120. The collection optics and/or another optical element of the optical system(s) 130 may filter or aperture the light collected. For example, in one implementation the collection optics may include an objective lens (e.g., 4×0.2 NA objective such as TL4x-SAP objective made by Thorlab®), that accepts and passes light within its acceptance angle. Radiation detector 140 is configured to receive light passed by the optical system(s) 130 and record intensity distributions of raw images of the specimen 120 being imaged. In one implementation, radiation detector 140 is configured to record intensity distributions of raw images at N sample times, t=1 to N, to capture N raw images of the specimen 120. The intensity distribution of each raw image is sampled while the variable illumination source 110 provides illumination to the specimen 120 at one of the N illumination angles. In one implementation, radiation detector 140 acquires N raw images corresponding to N illumination angles during an image acquisition process. In one aspect, N is at least 40. In one aspect, N is in a range between 50 to 100. In one aspect, N is in a range between 40-50.

In FIG. 1, the computing device(s) 150 includes one or more processors 160 (e.g., microprocessors), a non-transitory computer readable medium (CRM) 170 in communication with the processor(s) 160, and one or more displays 180 also in communication with processor(s) 160. The processor(s) 160 is in electronic communication with the radiation detector 140 to receive signal(s) with image data for the raw images acquired. The image data may include, for example, intensity distributions, associated sample times, illumination angles, dimensions of the field-of-view of the image, the z-dimension of the sample plane, etc.

Processor(s) 160 is in electronic communication with CRM 170 (e.g., memory) to communicate image data and other data to CRM 170. Processor(s) 160 is also in electronic communication with display(s) 180 to send display image data and instructions to control displaying images and other output data to, e.g., a user of CRADL system 10. Optionally (denoted by dotted line), variable illumination source 110 may also be in electronic communication with processor(s) 160 to send instructions for controlling variable illumination source 110. For example, in one implementation, control instructions may be implemented to synchronize N sample times of radiation detector 140 with the illuminations from N illumination angles from variable illumination source 110 in order to sample each raw image at a different illumination angle. The electronic communication between components of CRADL system 10 and other systems and devices described herein may be in wired form, in wireless form, or a combination of wired and wireless.

Processor(s) 160 may retrieve and execute instructions stored on the CRM 170 to perform one or more functions of CRADL system 10. For example, processor(s) 160 may execute instructions to perform one or more operations of an FPM method. As another example, the processor(s) 160 may execute instructions for sending control instructions to components of the CRADL system 10 such as to activate the variable illumination source 110 to provide illumination from certain illumination angles. In some implementations, the processor(s) 160 may execute instructions stored on the CRM 170 to perform one or more other functions of the CRADL system 10 such as, for example, 1) interpreting image data from the plurality of raw images acquired during image acquisition process, 2) perform Fourier ptychographic reconstruction process to generate a plurality of reconstructed images at different z-positions to generate a z-stack image set of reconstructed images, each reconstructed image having a higher resolution than the raw images; 3) using an all-in focus process to generate one or more all-in-focus images, each all-in-focus image generated from a z-stack image set of reconstructed images; 4) use a white balance process to synthesize a color all-in-focus image from multiple all-in-focus images of different colors (red, green, blue); 5) perform a process to generate one or more training image datasets from all-in-focus images; 6) display one or more images or other data on the display(s) 180 of the CRADL system 10; 7) generating a representative image from a pathology image (e.g., abovementioned reconstructed image); 8) automatically enumerating abnormalities present in a sample from which raw images and pathology images were acquired, and/or determining a coverage amount of the abnormalities; 9) generating a diagnostic indicator based on the abnormalities; 10) training a machine learning model, including generating a training segmented image indicative of positions of abnormalities in an image from the training image datasets (where generating the training segmented image may in some implementations include generating convolutional representations of the image using encoder layers, and generating the training segmented image based on the convolutional representations using decoder layer); 11) determining a performance metric (e.g., F1 score) associated with the training segmented image with respect to a ground truth image (e.g., pathologist-annotated image that indicates known locations of portions of interest such as tumor cells); and/or 12) updating a training parameter (e.g., neural network weight) based on the performance metric.

The CRM (e.g., memory) 170 can store instructions for performing one or more functions of the CRADL system 10. These instructions may be executable by processor(s) 170 or other processing components of the CRADL system 10. CRM 170 can also store raw images acquired during the acquisition process, reconstructed images, one or more z-stacks of reconstructed images, one or more all-in-focus images, training image datasets, and other data associated with functions of the CRADL system 10.

CRADL system 10 also includes display(s) 180 in electronic communication with processor(s) 160 to receive image data and provide display data for a user of the CRADL system 10 such as, for example, a pathologist. In one implementation, display(s) 180 is capable of displaying color image data and/or black and white image data. According to one aspect, a display(s) 180 may be a two-dimensional display or a three-dimensional display. According to one aspect, a display(s) 180 may be capable of displaying multiple views simultaneously.

Certain modifications, additions, or omissions may be made to the CRADL system 10 without departing from the scope of the disclosure. In addition, the components of the CRADL system 10 or the components of other CRADL systems may be integrated or separated according to particular needs. For example, computing device(s) 150 or components thereof may be integrated into the Fourier ptychographic imaging device 100. In some cases, the processor(s) 160 or other suitable processor or processors may be part of the Fourier ptychographic imaging device 100.

In another example, a CRADL system may further include a receptacle for receiving the specimen 120. The receptable may include a surface for receiving the specimen 120. The surface may be part of one or more of the components of the CRADL system 10 or may be a separate component.

In certain aspects, the FPM method may divide each raw intensity of the entire field-of-view into multiple tile images of tile sections of the entire field-of-view. In these cases, the FPM method may reconstruct a complex image for each tile independently, and then combine the tile images to generate a full field-of-view image. This ability to process tile images independently allows for parallel computing. In one implementation, each tile may be represented by a two-dimensional area. In polar spatial coordinates, each tile may be a circular area or an oval area. In rectilinear spatial coordinates, the full field-of view low resolution image may be divided up into a two-dimensional matrix of tiles in a rectangular area. In some cases, the dimensions of a two-dimensional square matrix of tiles may be in powers of two when expressed in number of pixels of the radiation detector such as, for example, a 256 by 256 matrix, a 64×64 matrix, etc.

Figure 2:
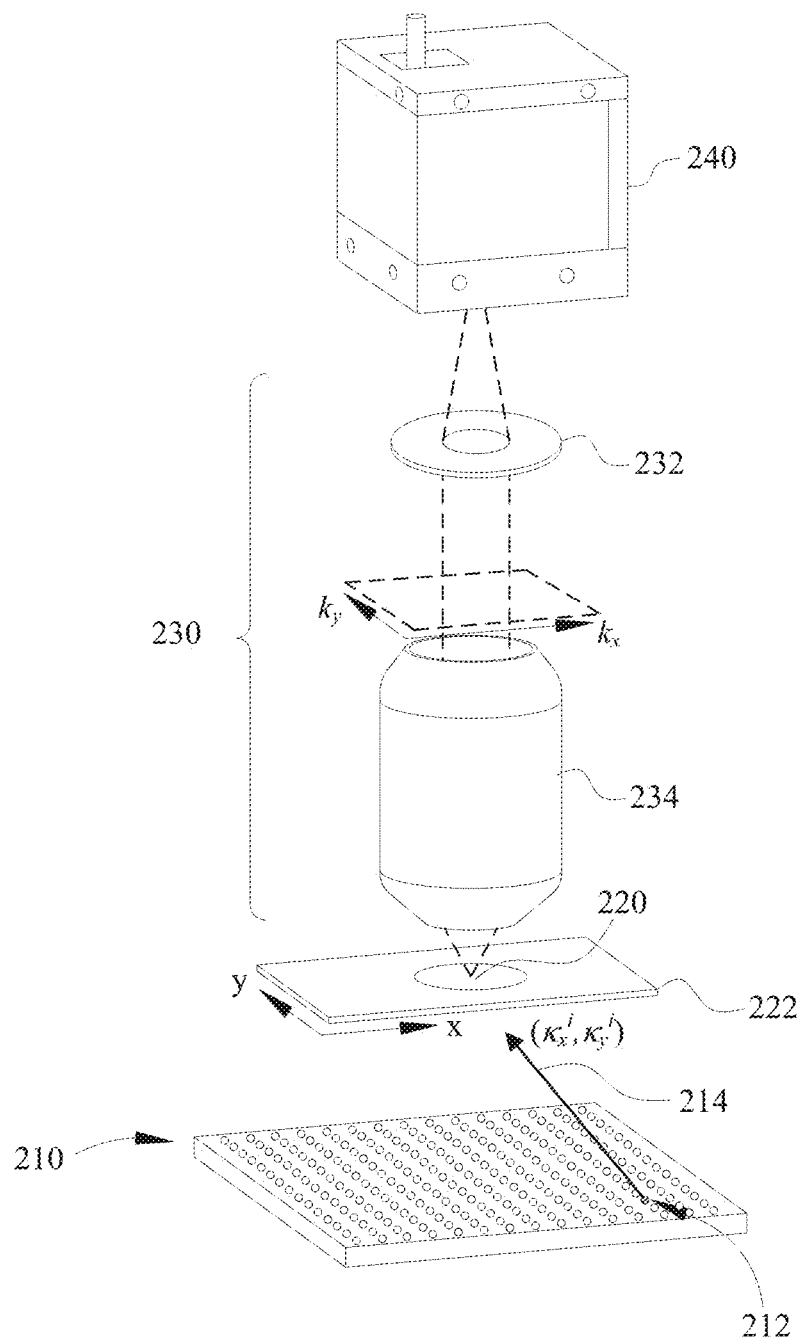
FIG. 2 depicts an orthogonal view of components of a Fourier ptychographic imaging device, according to implementations.

FIG. 2 depicts an orthogonal view of components of an example of a Fourier ptychographic microscope (FPM) 200, according to implementations. FPM 200 is an example of the Fourier ptychographic imaging device 100 in FIG. 1. Fourier ptychographic microscope 200 includes a variable illumination source 210 in the form of a rectangular 15×15 light emitting diode (LED) array. FPM 200 also includes an optical system 230 having an objective 234 (e.g., a microscope objective) and a tube lens 232, and a radiation detector 240 in the form of a camera with a CMOS image sensor array (e.g., pco.edge 26 CLHS camera by pco.). In this illustrated example, objective 234 is the collection optics of the optical system 230. In one aspect, objective 232 has a numerical aperture (NA) in the range of about 0.50 to about 0.75.

FPM 200 is depicted during a sample time of an image acquisition process during which a sample 20 is provided on a surface 126 of the specimen recepticle 222 such as a slide. Variable illumination source 210 is configured to provide illumination 214 in a trans-illumination mode to the sample 220. In another implementation, variable illumination source 210 may be located on the same side of the sample 220 as the objective lens 234 to provide illumination in an epi-illumination mode.

In this illustrated example, variable illumination source 210 includes a rectangular grid arrangement of 225 equi-spaced light elements 212 in a 15×15 rectangular array. Other numbers and arrangements of light elements may be used in other impelementations. Each light element includes at least one radiation source. In one aspect, each light element is a light emitting diode with, for example, a blue light source, a green light source, and a red light source that can be activated individually or in any combination. In one implementation, variable illumination source 210 is a rectangular light emitting diode (LED) array. At the sample time depicted in FIG. 2, one light element 212 is shown activated and providing illumination 214 with a wavevector of ($k_x^n$, $k_y^n$).

The spacing between adjacent light elements 212 in the variable illumination source 210 and the distance d between the variable illumination source 210 and the receptacle 222 determines the variation in illumination angle between adjacent light elements 212. In one example, the spacing between adjacent light elements 212 and the distance d between the variable illumination source 210 and the receptacle 222 are arranged to provide an illumination angle in the range of about 2 degrees to about 40 degrees.

During the raw image acquisition process, a plurality of light elements 212 in variable illumination source 210 are activated individually and sequentially to provide illumination to specimen 220 from different illumination angles at different sample times. The optical system 230 collects light issuing from the illuminated specimen 220, objective lens 234 accepts light issuing from the sample based on its acceptance angle, tube lens 234 focuses the light propagated to radiation detector 240, and radiation detector 240 captures raw intensity images at the sample times. In one aspect, a set of 50 light elements 212 are activated during 50 samples times of a raw image acquisition process. In another example, all 225 light elements 212 are activated during 225 sample times of another raw image acquisition process.

Figure 3:
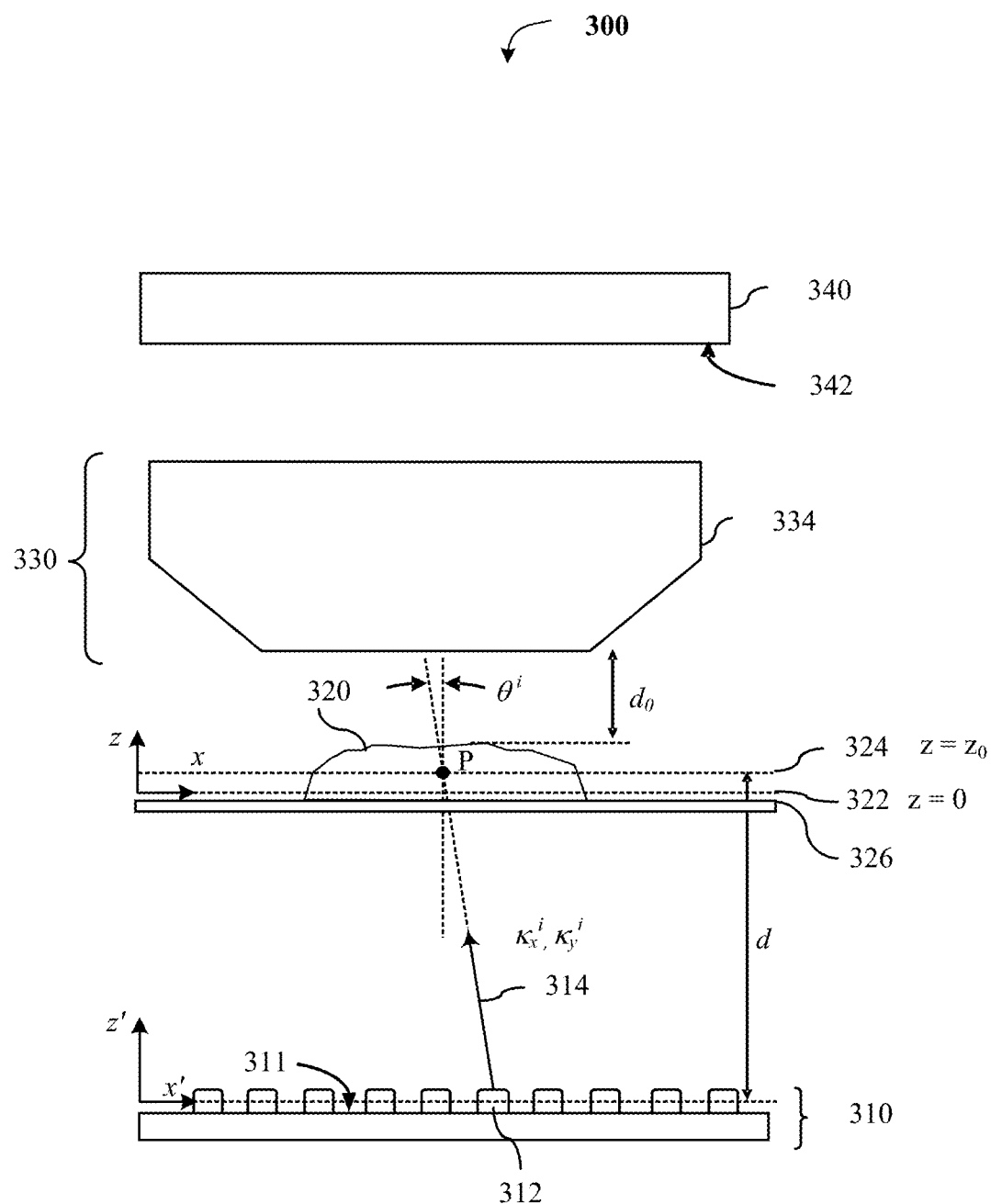
FIG. 3 depicts a schematic diagram of a side view of components of a Fourier ptychographic imaging device, according to implementations.

FIG. 3 depicts a schematic diagram of a side view of components of a Fourier ptychographic imaging device 300 during an image acquisition process, according to implementations. Fourier ptychographic imaging device 300 includes a variable illumination source 310 having a two-dimensional (10×10) array of light elements 312 such as, for example, light emitting diodes (LEDs) of a rectangular LED array. In the illustrated example, one of the light element 312 of the variable illumination source 310 is depicted as providing illumination 314 with a wavevector ($k_x^i$, $k_y^i$) to provide illumination at an illumination angle ($\theta_x^i$, $\theta_y^i$). Variable illumination source 310 also includes an x'-axis passing through the centroids of the light elements, a y'-axis (not shown), and a z'-axis. The two dimensional arrangement of light elements 312 extends in the x'-direction and in the y'-direction. Variable illumination source 310 also includes a surface 311. Although FIG. 3 shows the variable illumination source 310 with a 10×10 array of equally spaced light elements 312, other dimensions can be used in other implementations.

Fourier ptychographic imaging device 300 also includes an optical system 330 with an optical element 334 in the form of a microscope objective lens and a radiation detector 340 having a sensing surface 342. Fourier ptychographic imaging device 300 also includes an in-focus plane 322 at z=0 and a sample plane 324 at z=$z_0$. Fourier ptychographic imaging device 300 also includes an x-axis and ay-axis (not shown) at in-focus plane 322, and a z-axis orthogonal to in-focus plane 322. FIG. 3 also shows a distance d between the variable illumination source 310 and sample plane 324. In FIG. 3, specimen 320 is depicted as located at a surface 326 of a specimen receptable (e.g., slide) during an image acquisition process. In the side view shown in FIG. 3, only the component $\theta x_{i,j}$ of the illumination angle ($\theta_x^i$, $\theta_y^i$) that lies in the x-z plane is shown. The illumination angles ($\theta x_{i,j}$, $\theta y_{i,j}$) are measured relative to an axis normal to the sample plane 324 at z=$z_0$ and through point P.

In FIG. 3, the Fourier ptychographic imaging device 300 is shown at a particular sample time, in the image acquisition process. At sample time, $t_i$, light element 312 is configured to provide illumination at a wavevector $k_x^i$, $k_y^i$ associated with an illumination angle ($\theta_x^i$, $\theta_y^i$). Optical element 334 receives and accepts light issuing from specimen 320 within its acceptance angle. Light collected by the optical element 334 is propagated by the optical system 330 to sensing surface 342 of radiation detector 340. Radiation detector 340 measures the intensity distribution and records a raw intensity image. Although Fourier ptychographic imaging device 300 is shown at a single sample time, $t_i$, Fourier ptychographic imaging device 300 can be implemented to acquire image data at a N sample times, $t_{i=1\ to\ N}$, associated with N illumination angles ($\theta_x^i$, $\theta_y^i$), i=1 to N to acquire N raw two-dimensional intensity images.

A. Fourier Ptychographic Digital Refocusing Methods

A CRADL system may perform a Fourier ptychographic digital refocusing method to generate one or more uniformly focused or substantially uniformly focused images across the field-of-view of a specimen. One or more substantially uniformly focused images generated by the Fourier ptychographic digital refocusing method may be used to generate a training dataset for a deep learning program. Using Fourier ptychographic digitally refocused images as input to deep learning may improve predictive accuracy. The Fourier ptychographic digital refocusing method may also be used to generate an analysis image of the specimen that can be fed back into the trained deep learning program for further analysis, e.g., automated feature recognition. Alternatively, an analysis image of the specimen may be provided by another imaging technique such as conventional microscopy.

According to certain aspects, a Fourier ptychographic digital refocusing method or procedure includes: (a) a raw image acquisition process during which raw intensity images are acquired while illumination is provided at different illumination angles, (b) a Fourier ptychographic image reconstruction process for generating each of a plurality of reconstructed images at different z positions to generate a z-stack image set of reconstructed images, each reconstructed image having a higher resolution than the raw images, and (c) an all-in-focus process or other process involving z-compression and/or focus blending process for generating one or more substantially uniformly focused images (also referred to herein as all-in-focus or fused images). Each substantially uniformly focused image is generated from a z-stack image set of reconstructed images.

Optionally, the Fourier ptychographic digital refocusing method may synthesize a color all-in-focus image from multiple all-in-focus images of different colors (B, G, R) to generate a color all-in-focus image. A white balance process may be used to synthesize the color all-in-focus image. As used herein, an all in-focus image or uniformly focused image may refer to an image resulting from "Z compression" or "focus blending" and is a combination of data from multiple images at different z positions to give a resulting image with a greater sharpness (depth of field) across the combined image than any of the individual source images. As used herein, a z-stack of reconstructed images refers to images that are reconstructed at different z positions using a Fourier ptychographic image reconstruction process. A Fourier ptychographic digital refocusing method that uses raw images captured by a Fourier ptychographic microscope (FPM) may sometimes be referred to herein as an "FPM method."

During the image acquisition process of a Fourier ptychographic digital refocusing method, a specimen is illuminated from N illumination angles using a variable illumination source. In one aspect, an optical system(s) has an optical element such as a collection lens that can pass light received within its acceptance angle or the optical element can otherwise block light received outside a region. The optical system(s) collects light from the specimen and propagate light collected to the radiation detector. The radiation detector is configured or configurable to acquire intensity measurements and record raw images such as a plurality of N raw intensity images. According to one aspect, a variable illumination source is configured to generate illumination at illumination angles that result in raw images being acquired with image data that when transformed into the spatial frequency domain overlaps. In one implementation, multiple pluralities of N raw intensity images are acquired such as, for example, a first plurality of N raw blue images, a second plurality of N raw green images, and a third plurality of N raw red images. For example, the variable illumination source may illuminate blue light sources (e.g., a blue light source from an LED) when capturing the first plurality of N raw blue images, illuminate different green light sources when capturing the second plurality of N raw green images, and illuminate different red light sources when capturing the third plurality of N raw red images.

Generally speaking, the Fourier ptychographic reconstruction process takes low resolution varied angle illumination raw image data acquired in an image acquisition process and stiches the image data together in the spatial frequency domain (also sometimes referred to as Fourier domain) through phase retrieval. The final output is a high resolution image that contains both bright-field intensity and phase information. The phase information can be used to digitally refocus the image. In one aspect, there is an overlap (e.g., at least 50% overlap, or at least 60% overlap, about 65% overlap, between 2% and 99.5% overlap, and between 65% and 75%) of the area of neighboring regions in the spatial frequency domain. During the reconstruction process, N raw intensity images are iteratively combined in the spatial frequency domain to generate image data with higher resolution than the raw images. The N raw intensity images are used to reconstruct phase and amplitude image data to generate reconstructed image data. During each reconstruction process, reconstructed image data is generated for a z-position using a phase factor. The reconstruction process is run multiple times to impose different phase factors corresponding to different z-positions to generate high resolution images at planes with different z-positions. The images at the different z-positions are used to generate a z-stack image set of reconstructed images. In one implementation, multiple pluralities of raw images are used to generate multiple z-stacks. For example, a plurality of blue raw images may be used to generate a first z-stack, a plurality of raw green images may be used to generate a second z-stack, and a plurality of raw red images may be used to generate a third z-stack. Flowcharts of operations of an example of Fourier ptychographic reconstruction procedure is provided in FIG. 8.

In an all-in-focus process, the reconstructed images in each z-stack are compressed into an substantially uniformly focused image (also referred to as an all-in-focus or fused image). In one implementation, areas of the images where sharp features and details are present are detected using wavelet transform (e.g. a complex wavelet transform (CWT)) performed on each image of the z-stack. Each of the images may then be separated into regions that contain details of various sizes to determine wavelet coefficients. A large wavelet coefficient in a region may, for example, indicate more pronounced detail. The images in the z-stack are fused based on the maximum values of the wavelet coefficients. The fused transform can then be inverted to determine a final fused image. An example of an all-in-focus process can be found in B. Forster, D. Van De Ville, J. Berent, D. Sage, M. Unser, "Complex Wavelets for Extended Depth-of-Field: A New Method for the Fusion of Multichannel Microscopy Images," Microsc. Res. Tech., 65, September 2004.

In implementations that generate a color all-in-focus image, a Fourier ptychographic digital refocusing method may generate multiple all-in-focus images of different colors (B, G, R) using the all-in-focus process. The Fourier ptychographic digital refocusing method may then synthesize multiple the all-in-focus images of different colors (B, G, R) to generate a color all-in-focus image. A white balance process may be used to synthesize the color all-in-focus image.

Figure 4:
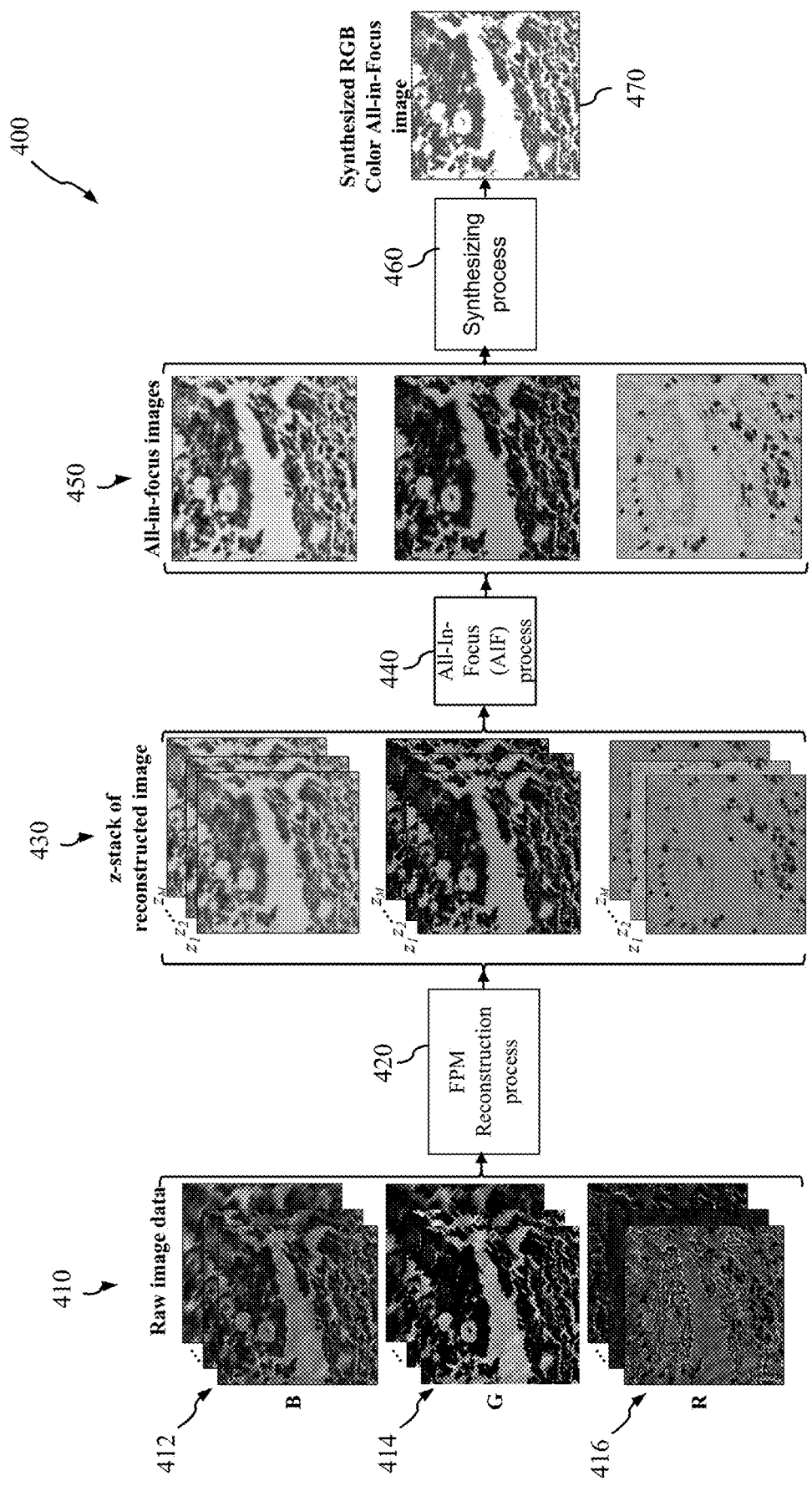
FIG. 4 depicts a schematic diagram of imaging processing operations of a Fourier ptychographic digital refocusing method, according to implementations.

FIG. 4 depicts a schematic diagram of imaging processing operations of an example of a Fourier ptychographic digital refocusing method, according to implementations. In this example, the Fourier ptychographic digital refocusing method generates a synthesized color all-in-focus image. The Fourier ptychographic digital refocusing method includes an image acquisition process 410, a Fourier ptychographic image reconstruction process 420 for generating one or more z-stack image sets 430, an all-in-focus (AIF) process 440 for generating one or more all-in-focus images 450, and a white balance process to synthesize the color all-in-focus image.

In image acquisition process 410, a specimen is illuminated from N illumination angles using a variable illumination source. In this example, each light element of the variable illumination source includes a blue light source, a green light source, and a red light source. Each of the light sources of each LED being used are individually activated during a sample time. The optical system propagates light to the radiation detector and the radiation detector acquires intensity measurements of raw image data for a first plurality of N raw blue images 412, a second plurality of N raw green images 414, and a third plurality of N raw red images 416.

First plurality of N raw blue images 412, second plurality of N raw green images 414, and third plurality of N raw red images 416 are input into a Fourier ptychographic reconstruction process 420. During Fourier ptychographic reconstruction process 420, the image data from the plurality of N blue images 412 is stitched together in the spatial frequency domain to generate an expanded aperture complex blue image with higher resolution than the raw blue images, the image data from the plurality of N green images 414 is stitched together in the spatial frequency domain to generate an expanded aperture complex green image with higher resolution than the raw green images, and the image data from the plurality of N red images 416 is stitched together in the spatial frequency domain to generate an expanded aperture complex red image with higher resolution than the raw red images. The reconstruction process can be run multiple times based on different phase factors for each of the raw blue, green, and red images to generate higher resolution images at different planes with different z-positions to be able to form a z-stack of blue reconstructed images, a z-stack of green reconstructed images, and a z-stack of red reconstructed images.

The z-stack of blue reconstructed images, a z-stack of green reconstructed images, and a z-stack of red reconstructed images from Fourier ptychographic reconstruction process 420 are input into all-in-focus process 440. Alternatively another "z-compression" or a "focus blending" process may be used. In this procedure, the reconstructed images in each z-stack are compressed to form an all-infocus blue image, an all-in-focus green image, and an all-in-focus red image. The all-in-focus blue image, all-in-focus green image, and all-in-focus red image are input into a synthesizing process 460 such as a white balance process to synthesize the all-in-focus blue images, all-in-focus green images, and the all-in-focus red images into a color all-in-focus image 470.

Figure 5:
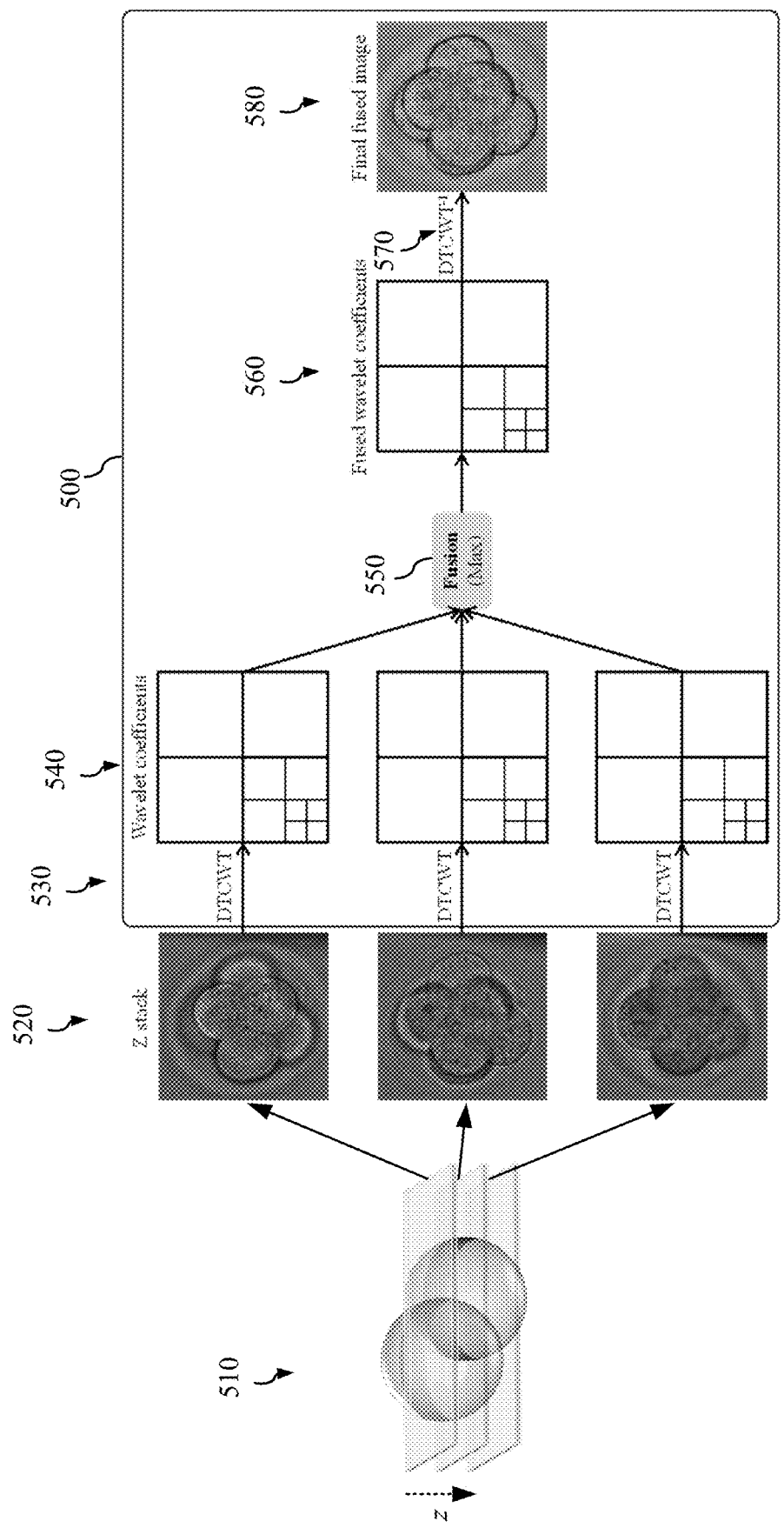
FIG. 5 depicts a schematic diagram of operations of an all-in-focus process for compressing a z-stack into an all-in-focus of fused image, according to implementations.

FIG. 5 depicts a schematic diagram of operations of an example of an all-in-focus process 500 for compressing a z-stack 520 into an all-in-focus or fused image 580, according to an implementation. In this example, images at three different z-positions 510 are used to form a z-stack 530 that is input into all-in-focus process 500. At operation 530, a complex wavelet transform (e.g., a dual-tree complex wavelet transform (DTCWT)) 530 is performed on each image of the z-stack 520 to be able to detect areas of the images where sharp features and details are present. At operation 540, the image data for each of the images is separated into regions that contain details of various sizes to determine wavelet coefficients. A relatively large wavelet coefficient in a region may, for example, indicate more pronounced detail than a region with a smaller wavelet coefficient. At operation 550, the image data from the images is fused together based on the maximum values of the wavelet coefficients. It is determined which image data has the maximum value of wavelet coefficients i.e. the most pronounced detail, in each region. The regions from the image data of all the images having the maximum value of wavelet coefficients are fused into image data having fused wavelet coefficients 560. At operation 570, an inverse complex wavelet transform 570 is applied to generate a final fused image 580.

Figure 6:
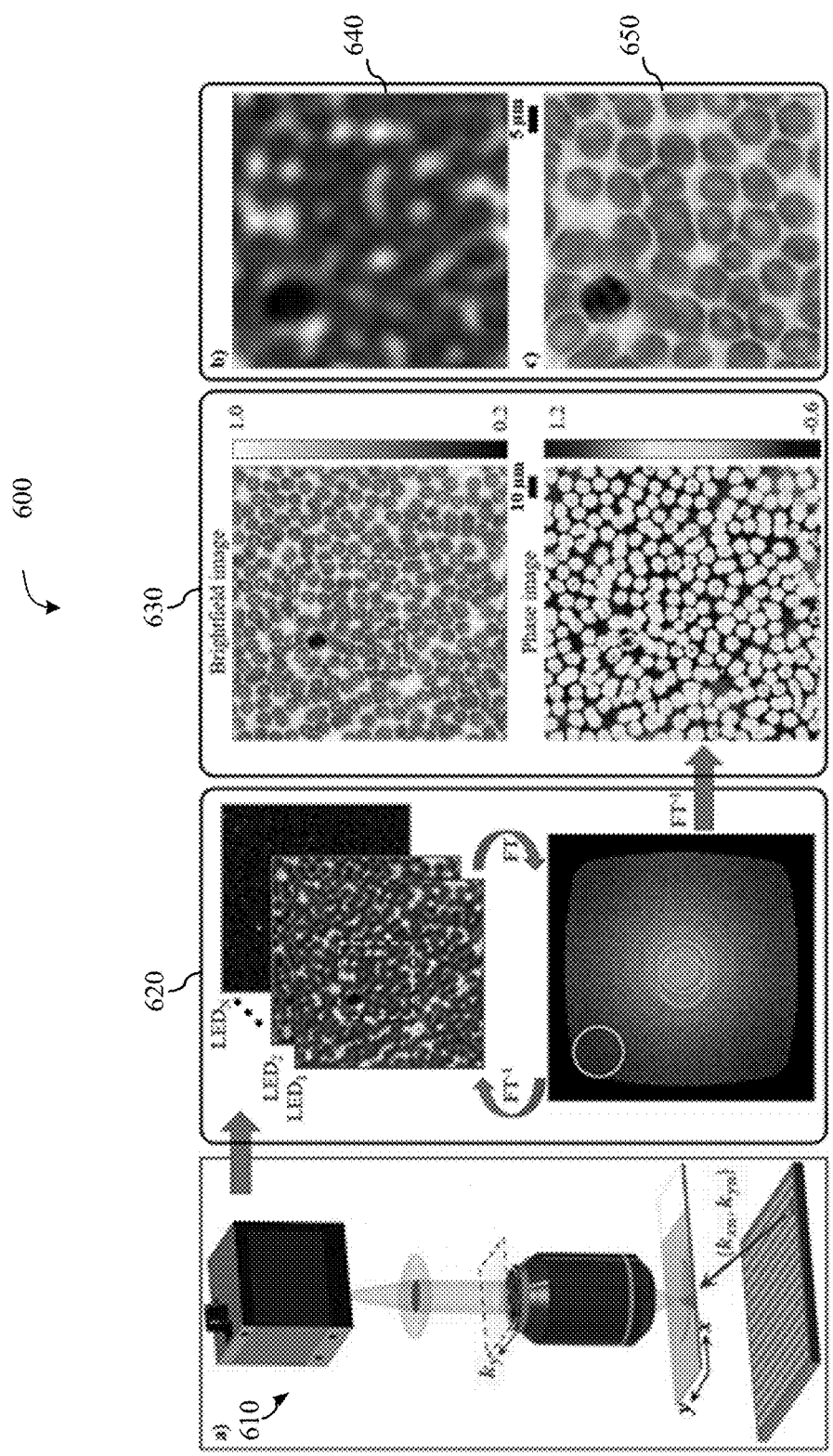
FIG. 6 depicts a schematic diagram of operations of a Fourier ptychographic digital refocusing method, according to implementations.

FIG. 6 depicts a schematic diagram of operations of a Fourier ptychographic digital refocusing method, according to implementation. A Fourier ptychographic imaging device 610 is shown during an image acquisition process during which Fourier ptychographic imaging device 610 takes low resolution varied angle illumination raw data. In this example, Fourier ptychographic imaging device 610 includes an LED array and n LEDs in the array are activated individually and in sequence during which a radiation detector takes the raw intensity images. At operation 620, the intensity measurements are iteratively updated in the spatial frequency domain. The low resolution varied angle illumination raw data is stitched together in the spatial frequency domain through phase retrieval. At operation 630, the final output is a high resoltuion image that contains both bright-field intensity and phase data. An example of a raw intensity image 640 acquired by Fourier ptychographic imaging device 610 and an example of a digitally refocused image 650 are also shown.

Figure 7:
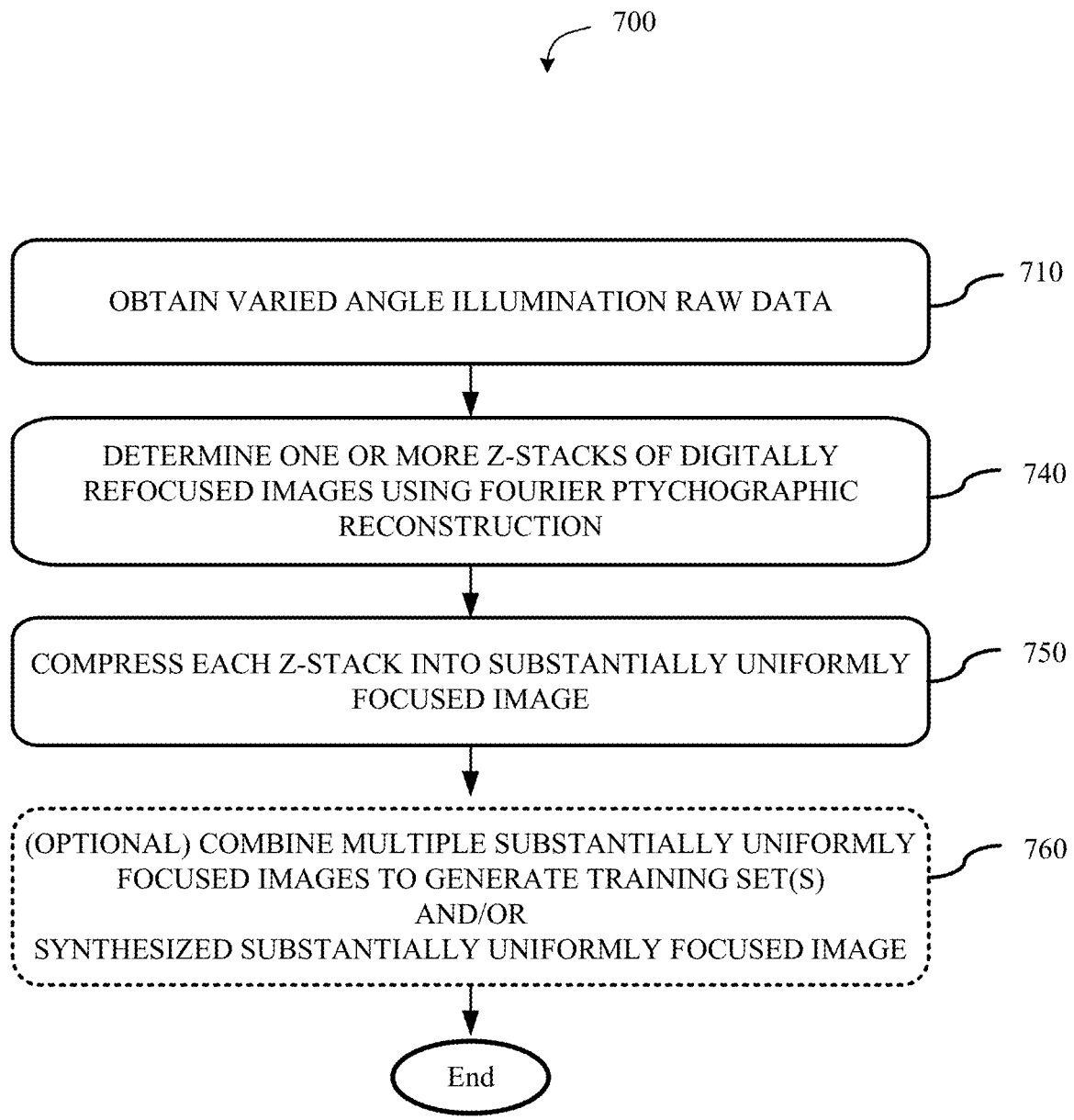
FIG. 7 depicts a flowchart of operations of a Fourier ptychographic digital refocusing method, according to implementations.

FIG. 7 depicts a flowchart of operations of a Fourier ptychographic digital refocusing method, according to implementations. This method is performed by one or more components of a CRADL system such as CRADL system 10 described with reference to FIG. 1.

At operation 710, varied angle illumination raw data is obtained. The varied angle illumination raw data may be commmunicated directly from, e.g., a radiation detector of a pytchographic imaging device, or may be retrieved from memory. According to one aspect, the varied angle illumination raw data may be acquired during an image acquisition process of a Fourier ptychogaphic imaging device such (e.g., Fourier ptychographic imaging device 100 in FIG. 1, FPM 200 in FIG. 2, Fourier ptychographic imaging device 300 in FIG. 3, Fourier ptychographic imaging device 610 in FIG. 6). During the image acquisition process, a variable illumination source provides illumination to a specimen at varied illumination angles at different sample times. In one aspect, the variable illumination source may provide illumination of different colors (wavelengths) at different sample times. For example, the variable illumination source may provide RGB illumination of three wavelengths $2i$, 22, and 23 corresponding to red, green, blue colors, respectively, at different sample times. In certain aspects, the variable illumination source provides plane wave illumination with a wavevector, kx, ky, in the spatial domain, which is equivalent to shifting the center of the image spectrum by (kx, ky) in the spatial frequency domain. The optical system of the CRADL system collects light issuing from the sample and propagates it to the radiation detector. In one aspect, the optical system includes collection optics that only accepts light within its acceptance angle. In the spatial frequency domain this function of the collection optics is represented as a circular pupil with radius of $NA \times k_0$, where $k_0 = 2\pi/\lambda$ is the wave number in vacuum. The radiation detector receives light propagated by the optical system and captures a intensity measurement at each sample time to acquire N intensity images associated with different illumination angles.

Figure 8:
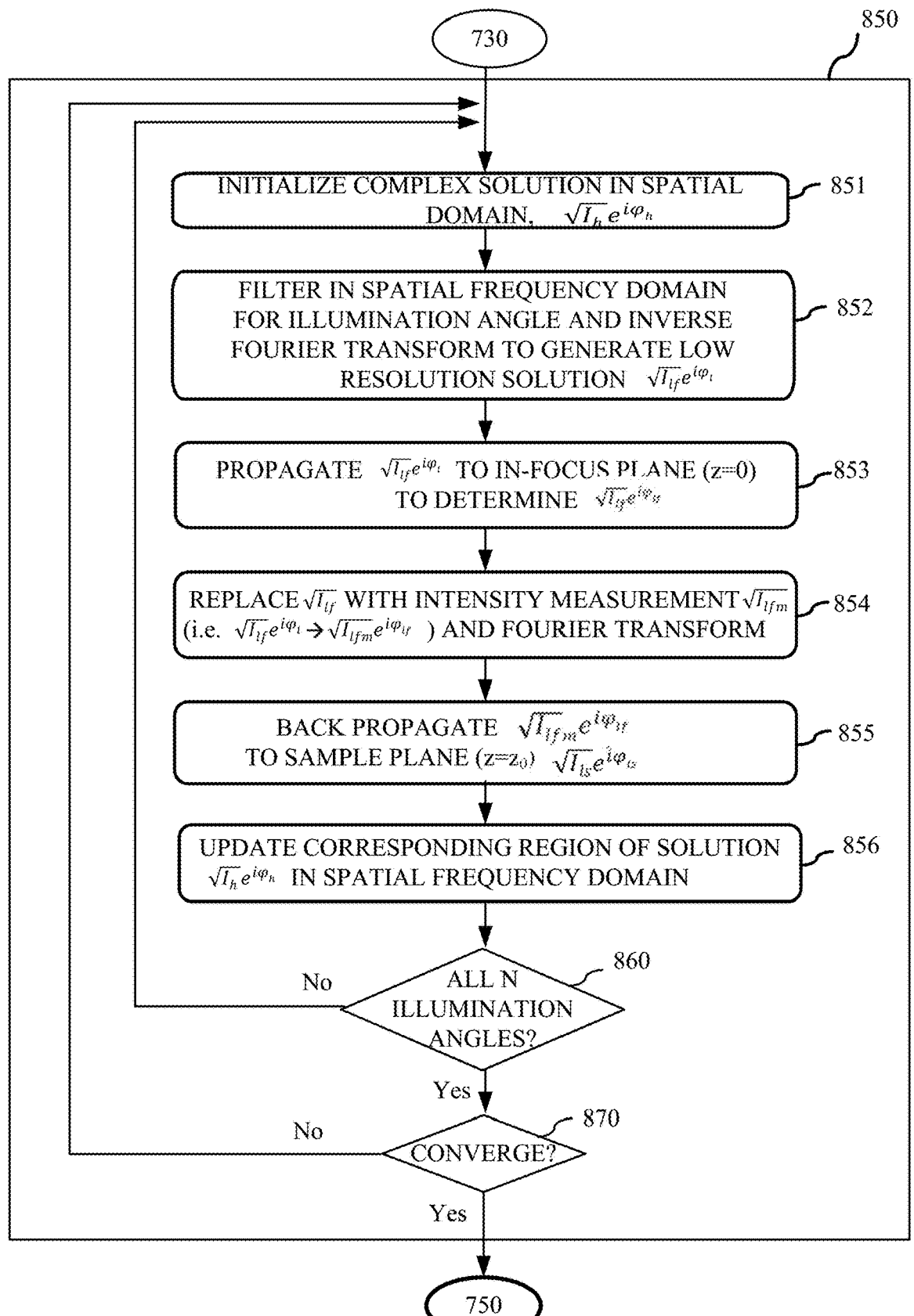
FIG. 8 depicts a flowchart of an example of sub-operations of a Fourier ptychographic reconstruction operation depicted in FIG. 7, according to implementations.

At operation 740, one or more z-stacks of digitally refocused images are determined using a Fourier ptychographic reconstruction process. For each z position in a z-stack, the Fourier ptychographic reconstruction process is performed to generate a high resolution image. The Fourier ptychographic reconstruction process stitches the low resolution varied angle illumination raw image data together in the spatial frequency domain through phase retrieval. For each plurality of raw images input into the reconstruction process, the output is a higher resolution image that contains both bright-field intensity and phase information. Defocusing may be depicted as imposing a phase factor on the spectrum of the sample in the spatial frequency domain. Different phase factors corresponding to different z positions are used in the iterative Fourier ptychographic reconstruction process to get different high resolutions images at different z positions of the z-stack. An example of a phase factor is:

$$e^{i\varphi(k_x,k_y)} = e^{i\sqrt{(2\pi/\lambda)^2 - k_x^2 - k_y^2} \cdot z_0}, \quad k_x^2 + k_y^2 < (NA \cdot 2\pi/\lambda)^2 \qquad \text{(Eqn. 1)}$$

where kx and ky are the wavenumbers at the pupil plane, $z_0$ is the defocus distance, and NA is the numerical aperture of the collection optical element. FIG. 8 illustrates an example of a Fourier ptychographic reconstruction procedure that may be implemented.

At operation 750, the reconstructed images in each z-stack are compressed into an all-in-focus or fused image (also referred to herein as a substantially uniformly focused image). In one implementation, areas of the images where sharp features and details are present are detected by performing a complex wavelet transform on each image of the z-stack. Image data for each of the images is separated into regions that contain details of various sizes based on wavelet coefficients. Image data from the images is fused together based on the maximum values of the wavelet coefficients. It is determined which image data has the maximum value of wavelet coefficients i.e. the most pronounced detail, in each region. The regions from the image data of all the images having the maximum value of wavelet coefficients are fused into image data having fused wavelet coefficients. An inverse complex wavelet transform is applied to generate a final fused image. FIG. 5 illustrates an example of operations of an all-in-focus process that can be used.

At optional operation 760, multiple all-in-focus or fused images may be combined and used to generate one or more training datasets and/or combined to generate a synthesized all-in-focus image. An example of details of a process that can be used to generate one or more training datasets from the all-in-focus or fused images is described with respect to FIG. 19. In addition or alternatively, a color all-in-focus image may be synthesized from multiple all-in-focus images of different colors (B, G, R) to generate a color all-in-focus image. A white balance process may be used to synthesize the color all-in-focus image. In one aspect, multiple synthesized all-in-focus images may be used to generate one or more training datasets.

FIG. 8 depicts a flowchart of an example of sub-operations of a Fourier ptychographic reconstruction operation depicted in FIG. 7, according to implementations. In the iterative sub-operations 852, 853, 854, 855, and 856, a higher resolution image of the specimen is computationally reconstructed by iteratively combining low-resolution intensity measurements in the spatial frequency domain. Sub-operations 853 and 855 may be performed to refocus the image by an amount of $z_0$.

At sub-operation 851, a complex solution $\sqrt{I_h}e^{i\varphi_h}$ is initialized in the spatial domain. A Fourier transform is applied to the initial solution to generate transformed image data $\tilde{I}_h$. In one example, the initial solution may be an initial guess based on the assumption that the sample is located at the out-of-focus plane $z=z_0$. In some cases, the initial guess may be determined as a random complex matrix (for both intensity and phase). In other cases, the initial guess may be determined as an interpolation of the low-resolution intensity measurement with a random phase. An example of an initial guess is $\varphi=0$ and $I_h$ interpolated from any lower-resolution image of the sample area. Another example of an initial guess is a constant value. The Fourier transform of the initial guess may be a broad spectrum in the Fourier domain in some cases.

At sub-operation 852, a low-pass filtering of the high-resolution image $\sqrt{I_h}e^{i\varphi_h}$ in the spatial frequency domain is performed to generate a low-resolution solution $\sqrt{I_l}e^{i\varphi_l}$ for a particular plane wave incidence angle $(\theta_x^i, \theta_y^i)$ with a wave vector $(k_x^i, k_y^i)$ and an inverse Fourier transform is performed. The Fourier transform of the high-resolution image is $\tilde{I}_h$ and the Fourier transform of the low-resolution image for a particular plane wave illumination angle is $\tilde{I}_l$. In the spatial frequency domain, the reconstruction process filters a low-pass region from the spectrum $\tilde{I}_h$ of the high-resolution image $\sqrt{I_h}e^{i\varphi_h}$. In cases with an collection optical element in the form of an objective lens, this region is a circular aperture with a radius of $NA*k_0$, where $k_0$ equals $2\pi/\lambda$ (the wave number in vacuum), given by the coherent transfer function of an objective lens. In the spatial frequency domain, the location of the region corresponds to the illumination angle. For an oblique plane wave incidence with a wave vector $(k_x^i, k_y^i)$, the region is centered about a position $(-k_x^i, -k_y^i)$ in the spatial frequency domain of $\sqrt{I_h}e^{i\varphi_h}$.

At sub-operation 853, the low-resolution image, $\sqrt{I_l}e^{i\varphi_l}$ is propagated in the spatial frequency domain to the in-focus plane at $z=0$ to determine the low-resolution image at the focused position: $\sqrt{I_{lf}}e^{i\varphi_{lf}}$. In one aspect, sub-operation 853 is performed by Fourier transforming the low-resolution image $\sqrt{I_l}e^{i\varphi_l}$, multiplying by a phase factor in the spatial frequency domain, and inverse Fourier transforming to obtain $\sqrt{I_{lf}}e^{i\varphi_{lf}}$. In another aspect, sub-operation 853 is performed by the mathematically equivalent operation of convolving the low-resolution image $\sqrt{I_l}e^{i\varphi_l}$ with the point-spread-function for the defocus. In another aspect, sub-operation 853 is performed as a sub-operation of sub-operation 852 by multiplying by multiplying $\tilde{I}_l$ by a phase factor in the Fourier domain before performing the inverse Fourier transform to produce $\sqrt{I_{lf}}e^{i\varphi_{lf}}$. Sub-operations 853 and 855 may be omitted if, for example, the specimen is located at the in-focus plane ($z=0$).

At sub-operation 854, a computed amplitude component $\sqrt{I_{lf}}$ of the low-resolution image at the in-focus plane, $\sqrt{I_{lf}}e^{i\varphi_{lf}}$, is replaced with the square root of the low-resolution intensity measurement $\sqrt{I_{lfm}}$ as measured by the radiation detector. This forms updated low resolution data: $\sqrt{I_{lfm}}e^{i\varphi_{lf}}$.

At sub-operation 855, the updated low-resolution image $\sqrt{I_{lfm}}e^{i\varphi_{lf}}$ is back-propagated to the sample plane ($z=z_0$) to determine $\sqrt{I_{ls}}e^{i\varphi_{ls}}$. In one aspect, sub-operation 855 is performed by taking the Fourier transform of the updated low-resolution image $\sqrt{I_{lfm}}e^{i\varphi_{lf}}$ and multiplying in the spatial frequency domain by a phase factor, and then inverse Fourier transforming it. In another aspect, sub-operation 855 is performed by convolving the updated low-resolution image $\sqrt{I_{lfm}}e^{i\varphi_{lf}}$ with the point-spread-function of the defocus. In another aspect, sub-operation 855 is performed as part of sub-operation 856 by multiplying by the phase factor after performing the Fourier transform on the updated target image.

At sub-operation 856, a Fourier transform is applied to the updated target image propagated to the sample plane: $\sqrt{I_{ls}}e^{i\varphi_{ls}}$, and this data is updated in the corresponding region of high-resolution solution $\sqrt{I_h}e^{i\varphi_h}$ in the spatial frequency domain corresponding to the corresponding to the incidence wave vector $(k_x^i, k_y^i)$.

At sub-operation 860, it is determined whether sub-operations 852 through 856 have been completed for all illumination angles. If not, sub-operations 852 through 856 are repeated for the next illumination angle.

At sub-operation 870, it is determined whether the high-resolution solution has converged. In one aspect, it is determined whether the high-resolution solution has converged to a self-consistent solution. For example, the previous high-resolution solution of the previous iteration or initial guess may be compared to the present high-resolution solution, and if the difference is less than a certain value, the solution may have converged to a self-consistent solution. If it is determined that the solution has not converged, then sub-operations 852 through 856 are repeated for the illumination angles. In one case, sub-operations 852 through 856 are repeated once. In other cases, sub-operations 852 through 856 are repeated twice or more. If the solution has converged, the processor inverse Fourier transforms the converged solution to the spatial domain to recover a high-resolution image $\sqrt{I_h}e^{i\varphi_h}$ and the process returns to 750.

Other examples of Fourier ptychographic imaging devices and methods can be found in U.S. patent application Ser. No. 14/065,280, filed on Oct. 28, 2013, titled "FOURIER PTYCHOGRAPHIC IMAGING SYSTEMS, DEVICES, AND METHODS," in U.S. patent application Ser. No. 14/466,481, filed on Aug. 22, 2014, titled "VARIABLE-ILLUMINATION FOURIER PTYCHOGRAPHIC IMAGING DEVICES, SYSTEMS, AND METHODS, in U.S. patent application Ser. No. 14/448,850, filed on Jul. 31, 2014, titled "APERTURE SCANNING FOURIER PTYCHOGRAPHIC IMAGING," which are hereby incorporated by reference in their entireties.

II. Usage of Deep Learning for Pathology

Artificial intelligence (AI)-based digital pathology stands to improve accuracy of diagnosis and may be improved by the focus quality of image data utilized. AI-based applications such as deep learning algorithms and machine learning models may be applied, for example, to achieve automatic or automated identification and/or enumeration of abnormalities (e.g., tumor cells in cancer tissue). Depending on the implementation, cancer cells of various may be identified, e.g., non-small cell lung cancer (NSCLC), breast cancer, and so on. In some cases, such machine learning models may enable subsequent generation of a coverage metric, such as an area percentage measure, for the tumor cells. In some implementations, the tumor cells or other abnormalities may be viable tumor cells or benign tumors. For example, a model may be trained (as will be discussed in more detail) to identify and/or enumerate different types of cells depending on the task it is trained for. In some specific cases, enumerating microscopic viable tumor cells is a task that may be suited for deep learning-based automation.

However, pathology slides may not have uniformly flat samples and as a consequence the focus quality of digital pathology images may lack heterogeneity. That is, pathology slides may contain focal variations in the z-level (depth), resulting in simultaneous display of blurry areas and in-focus areas in the pathology image. Focus variability and quality variations within a training dataset can lead to poorly trained models in machine learning applications. Moreover, even assuming that a model is trained to generate accurate results, focus quality variations present in digital pathology images can lead to lower inference accuracy when a trained model is used on test images. For instance, blurry images can be intrinsically lower in data content than well-resolved images.

While human (e.g., lab technician) training can address part of this problem, there is a more fundamental aspect that must be addressed. Specifically, pathology slides are typically not uniformly flat samples and, oftentimes, an optical microscope simply cannot capture and output an image frame where all regions are uniformly in focus. Moreover, acquiring a z-stack of raw images can be prohibitively time-consuming to implement, inefficiently low in its information content to data size ratio (volumetric image data size for what is essentially a 2D image), and incomplete (e.g., the focal plane for a specific location of interest may fall between two planes of the raw images in the z-stack).

In the context of deep learning or machine learning, feeding z-stack raw image sets into an algorithm poses an additional problem. The many-fold increase in sheer data would dramatically compound the training task and subsequent usage of the trained program. Specifically, it would be impractical to collect and work with z-stack of raw images of all pathology slides. Moreover, conventional microscopy may not be best suited for collecting the type of uniform quality data that machine learning demands. Defocus in a conventional microscope is generally a non-issue when a user sitting at a microscope can easily adjust the focus to suit the application. However, a computerized algorithm or program or working with pre-recorded raw image data may not have such recourse.

To that end, an FPM method involving the Fourier ptychographic digital refocusing method described above that implements a Fourier ptychographic microscope (FPM) can provide uniformly focused or substantially uniformly focused images as input. More specifically, the FPM method is capable of acquiring images that can be refocused computationally post-data-acquisition. The FPM data collection process is substantially different from that of a conventional microscope. The FPM raw data collection is performed in such a way that the data is well conditioned for the subsequent defocus. Moreover, the FPM collects redundant data that is typically only a single order of magnitude (e.g., 4×) of the final image information, which is far less than the n-fold data compounding strategy of z-stacking. More importantly, the FPM method can flexibly refocus the image at any lateral scale, unlike a standard microscope which dictates the same focal plane for the entire field-of-view (FOV). The digital refocusing advantage of the FPM method can be leveraged to address focus quality variation in images of pathology slides to enhance deep learning-based pathology analysis.

Moreover, the task of tumor cell enumeration can be laborious, time-consuming and may be highly subjective when performed by humans and thus prone to large variation. This task is remarkably well suited for deep learning-based automation. For example, the labor-intensive pathology task of enumerating viable tumor cells in histology/cytology slides (e.g., from NSCLC patients) can be assisted with a trained machine learning model according to an implementation. From the enumeration, a coverage metric such as an area percentage measure of the viable tumor for the slides can be generated, while requiring less labor from experts such as pathologists.

Figure 9:
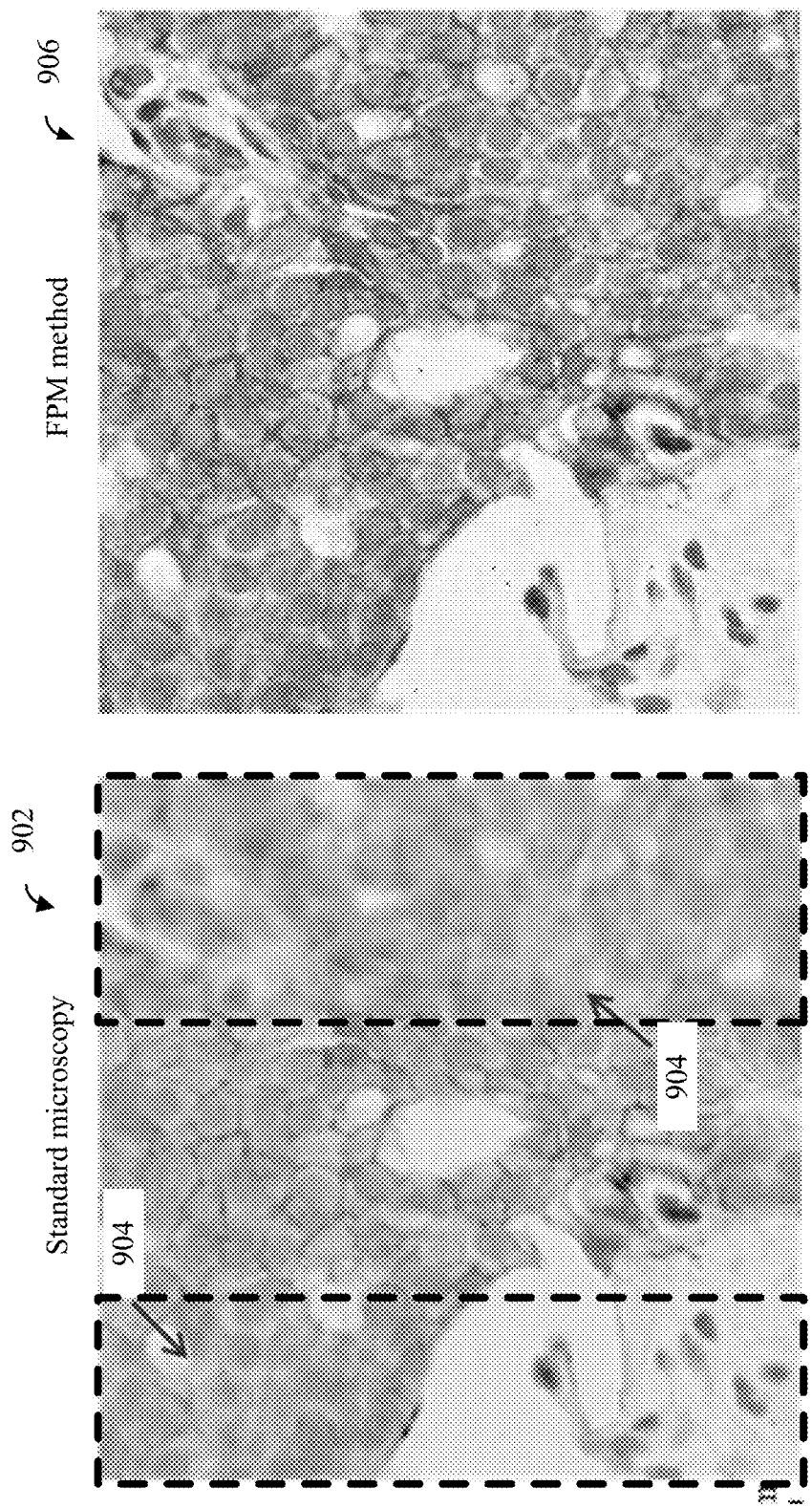
FIG. 9 depicts a comparison between an example pathology slide acquired with standard microscopy and an example pathology slide acquired with a computational refocusing method.

FIG. 9 illustrates a comparison between a digital image 902 of a pathology slide acquired by a slide scanner microscope (e.g. a ZEISS Axio Scan.Z1) and a uniformly focused image 906 of the pathology slide generated by an FPM method. More specifically, a comparison between the digital image 902 acquired by the conventional slide scanner is compared with the uniformly focused image 906 generated by the FPM method for the same field-of-view (FOV) and with the same magnification. The FPM method has the ability to digitally refocus, which can be useful to efficiently address unevenness in the specimen.

The pathology slide imaged in images 902 and 906 is of breast cancer cells stained with antibody to Her2. The left image 902 obtained by the conventional slide scanner microscope shows overexpression of the staining. The existence of out-of-focus areas 1004 in image 902 could change the interpretation (by an observer, researcher, user, etc.) of the staining pattern. Also, the sample unevenness in a pathology slide may be present over a relatively small scale (e.g., small area or FOV). For instance, there are both in-focus and out-of-focus zones 1004 in the slide scanner microscope image 902, and these zones are on the order of microns. There is no direct way to collect a uniformly in-focus image in this relatively small FOV with the slide scanner microscope. Computational refocusing methods such as the Fourier ptychographic digital refocusing procedure described above may be less susceptible to such restrictions, as the image can be digitally refocused at as fine a granular or lateral step as desired.

As discussed above, focus variability may present a problem in adapting deep learning for use in pathology. The vast majority of efforts at addressing this problem can be broken down into three categories. A first option is to simply introduce a human quality control agent into the process to ensure that the inputs to the program have acceptably high image quality. This approach can be time-consuming, subjective and wasteful, and produces images that will be deemed unacceptable and have to be retaken. A second option is to implicitly accept that some images will be defocused and simply provide a very large dataset for deep learning training. This approach increases the training burden tremendously, and there is no expectation that accuracy will increase. Sending a poorly focused image to a trained program will likely still yield a poor-accuracy answer because the image just does not contain accurate or sufficient information for the model to be robustly trained, and therefore, for the trained model to generate an accurate ("correct") result. A third option is to use a z-stack of raw image data as input. For reasons already stated, a z-stack of raw images may not be a practical solution. Z-stack data of raw images may create bulky data files that are space-inefficient and demand large storage servers. Training, for example, a machine learning model with this kind of input data may demand high computational resources as well.

Returning to FIG. 9, the right image 906 obtained by an FPM method (e.g., Fourier ptychographic digital refocusing procedure described above that implements an FPM to acquire raw images) shows all areas in focus and uniform membrane staining. In comparison to the image 902 from the slide scanner microscope, the Fourier ptychographic digital refocusing procedure yields higher-quality image data. Higher image quality data from the Fourier ptychographic digital refocusing procedure would enable defined segmentation of an image (e.g., as generated by a machine learning algorithm) and, in turn, improvement of predictive accuracy (discussed elsewhere below) of diagnosis.

According to certain aspects, computational refocusing methods (e.g., a Fourier ptychographic digital refocusing procedure) may be used to acquire uniformly focused digital images of pathology slides, and the image data is fed into a machine learning model to perform deep learning which can enable, for example, the identification of cells with abnormalities. This in turn would enable time- and resource-efficient and objective enumeration of the types of cells or abnormalities the model is trained to identify (e.g., viable tumor cells) and subsequent determination of a coverage metric (e.g., area percentage). The efficient enumeration of viable tumor cells (e.g., in NSCLC patients treated with neoadjuvant presurgical systemic therapy) may further aid in subsequent remedial measures, such as confirming diagnosis and in subsequent surgery such as, e.g., complete removal of the tumor.

The approaches of certain aspects described in the present disclosure may reduce or eliminate the focus variability issue that has impeded the efficient use of deep learning in pathology slide analysis. These approaches are also substantially different from other attempts in deep learning where deep learning was used to render a sharpened image out of a blurry image.

III. Deep Learning Applications for Use in Pathology

Generally speaking, a deep learning architecture (also referred to herein as a "machine learning model") can be seen as a "black box." In addition, the deep learning architecture can be prone to a host of artifactual problems (e.g., hallucination, overfitting). In contrast, the Fourier ptychographic digital refocusing procedure has a verifiable physics underpinning. According to certain implementations, it is only after one or more uniformly focused images are rendered that the image data is fed into a deep learning model for automated recognition processing.

A deep learning or machine learning model is trained using a set of data ("dataset" or sometimes referred herein to as a "training set" or a "trainset"). Ideally, the dataset contains numerous samples having uniform image quality, and a corresponding "ground truth" sample or a "gold label" for each of the numerous samples. Ground truth may refer to the ideal expected result, or information that is known to be real or true provided by direct observation and measurement, as opposed to information provided by inference (e.g., by a trained machine learning model).

There exist challenges to applying machine learning to pathology such as the variations in sample preparations that may lead to image variations, including poor tissue sectioning during prep, stain variations, tissue folding, etc. Certain implementations may provide one or more technical advantages in applying machine learning to pathology. One advantage may be the ability to flexibly refocus images. An FPM, for example, can collect and process data in the spatial frequency space. Using the FPM as an example, defocus corrections may be performed in that space prior to Fourier transform back to the image spatial space. Because of this, the FPM has the ability to refocus beyond the strict dictates of a standard microscope's depth of field. This advantage means that an otherwise badly placed specimen can be refocused by an FPM method for deep learning use. For example, by training a machine learning model using substantially uniformly focused training images generated using an FPM method, features learned by the machine learning model may be more robust and lead to higher accuracy model outputs. Another advantage may be the ability to tailor focus across an uneven specimen surface. It is common for a pathology slide to present an uneven surface. In contrast to a standard microscope's limit of imposing the same focal plane during the imaging process, the FPM method can easily tailor the focus across the uneven surface so that the entire or substantially the entire area of each training image is in focus simultaneously. This may allow a machine learning model to be trained using substantially uniformly focused training images that contain a high level of information per image, because the entire training image is in focus via utilization of the FPM method, rather than a smaller subset of a pathology image, as would be the case using conventional scanning microscopy techniques.

A. Generation of Training Image Datasets

In order to apply machine learning to a repeatable procedure, including computational refocusing (e.g., Fourier ptychographic digital refocusing) methods as described above, datasets may be obtained to train the program or model, such that an output may be produced based on or during inference (i.e., the process of inputting data points into a machine learning model to determine an output).

In some implementations, a computational refocusing (e.g., Fourier ptychographic digital refocusing) procedure suited for computationally refocusing images of pathology slides may be implemented. An example of pathology slides that may be imaged are histology/cytology slides from non-small cell lung cancer (NSCLC). Raw images of these histology/cytology slides may be acquired at a desired resolution (e.g., 450 nm, under a wavelength of 532 nm) comparable to an image directly acquired with a 0.8 numerical aperture (NA) objective and total FOV of 3.2×3.2 mm with acquisition time of around 2 minutes.

In some aspects, one or more training image datasets may be generated from the same number of slides (e.g., 100 slides). For example, substantially uniformly focused training images for a first dataset may be acquired from an FPM method. For ground truth data, a human annotator (e.g., pathologist) may annotate collections of cells or abnormalities (e.g., viable tumor cells) that are the desired target of the task (e.g., looking for malignant breast cancer tumor cells) in both datasets with the use of z-stack images from the same slides, which may serve as the gold standard.

Pathology slides are available. For example, there is clinical material available from which to draw upon slides for use in generating uniformly focused images for the training datasets. For example, Washington University School of Medicine and the Siteman Comprehensive Cancer Center has an extensive practice in NSCLC surgery and treatment, including neoadjuvant therapy and has a database available of de-identified archived clinical samples.

Moreover, there are a limited number of manually annotated images available in open-source databases from which to draw upon for use in generating training datasets. Some examples include ICIAR (International Conference on Image Analysis and Recognition) BACH (breast cancer histology) image dataset or SPIE (Society of Photo-Optical Instrumentation Engineers)-AAPM (American Association of Physicists in Medicine)-NCI (National Cancer Institute) BreastPathQ dataset.

In some aspects, de-identified and archived clinical histologic/cytologic slides from available databases may be used to take raw images that are used to generate substantially uniformly focused training images for a training dataset. For example a prescribed number (e.g., at least 100) of cases may be selected from, e.g., surgeries from patients (e.g., NSCLC patients) who had previously undergone neoadjuvant therapy. The number may be selected so as to have the full range of response, including no response, partial, near complete response, and complete response.

According to one aspect, a validation set may be constructed to validate a model trained using a training dataset. For example, the validation set may be a subset of the training dataset (e.g., a training dataset generated from substantially uniformly focused training images of de-identified and archived clinical histologic/cytologic slides), where samples of the original training dataset are set aside to form the validation set. In some cases, the allocation between training and validation datasets may be pre-selected (e.g., for 100 slides, 80 slides are allocated to the training dataset and 20 slides are allocated to the validation set).

As an example, a histologic Haemotoxylin and eosin (H&E) slide taken from a tumor bed may be selected from each case of a plurality of cases. When using 100 or more slides, for example, there may be a full range of response to neoadjuvant therapy such as no response, partial, near complete and complete response. In addition, a range of microcellularity may be represented across the cases, including dispersed microscopic deposits. While some cases will have from one (1) to ten (10) slides containing tumor bed in the database, only one slide may be selected per case, such that a determination may be made as to whether the deep learning algorithm can be trained to recognize and quantify tumor deposits in heterogenous ranges of cellularity that is characteristic of neoadjuvant therapy.

According to aspects, one or more types of imaging may be used to generate a training dataset. In certain implementations, for example, different types of imaging may be performed on each of the slides such as, e.g., (a) a substantially uniformly focused image generated by FPM imaging with digital refocusing, (b) a focused image from digital pathology scanning (in some cases, with a commercial scanner such as Leica Aperio® AT2 manufactured by Leica Biosystems) set at prescribed parameters, e.g., a 0.25 µM/pixel resolution with a 24-bit color depth) where the focusing of the image is left to an automatic program of the scanner, and/or (c) a focused image generated from a z-stack image set (in some cases, acquired with a commercial scanner such as Leica Aperio® AT2 manufactured by Leica Biosystems) of raw images generated at a prescribed z-step size, e.g., 10 micron. In one implementation, images of a slide generated by multiple techniques are combined and used in a training dataset. For example, a substantially uniformly focused image from the FPM method and conventional slide scanner microscopy may be combined to generate a training. In this case, the images are collated and position mapped onto each other. Any image stretching that needs to be done to collate and position map can be accomplished with, for example, the aid numerical analysis programs (e.g., MATLAB). Next, a pathologist may annotate and enumerate the portions of interest (e.g., viable tumor cells or collections of cells)

Figure 13:
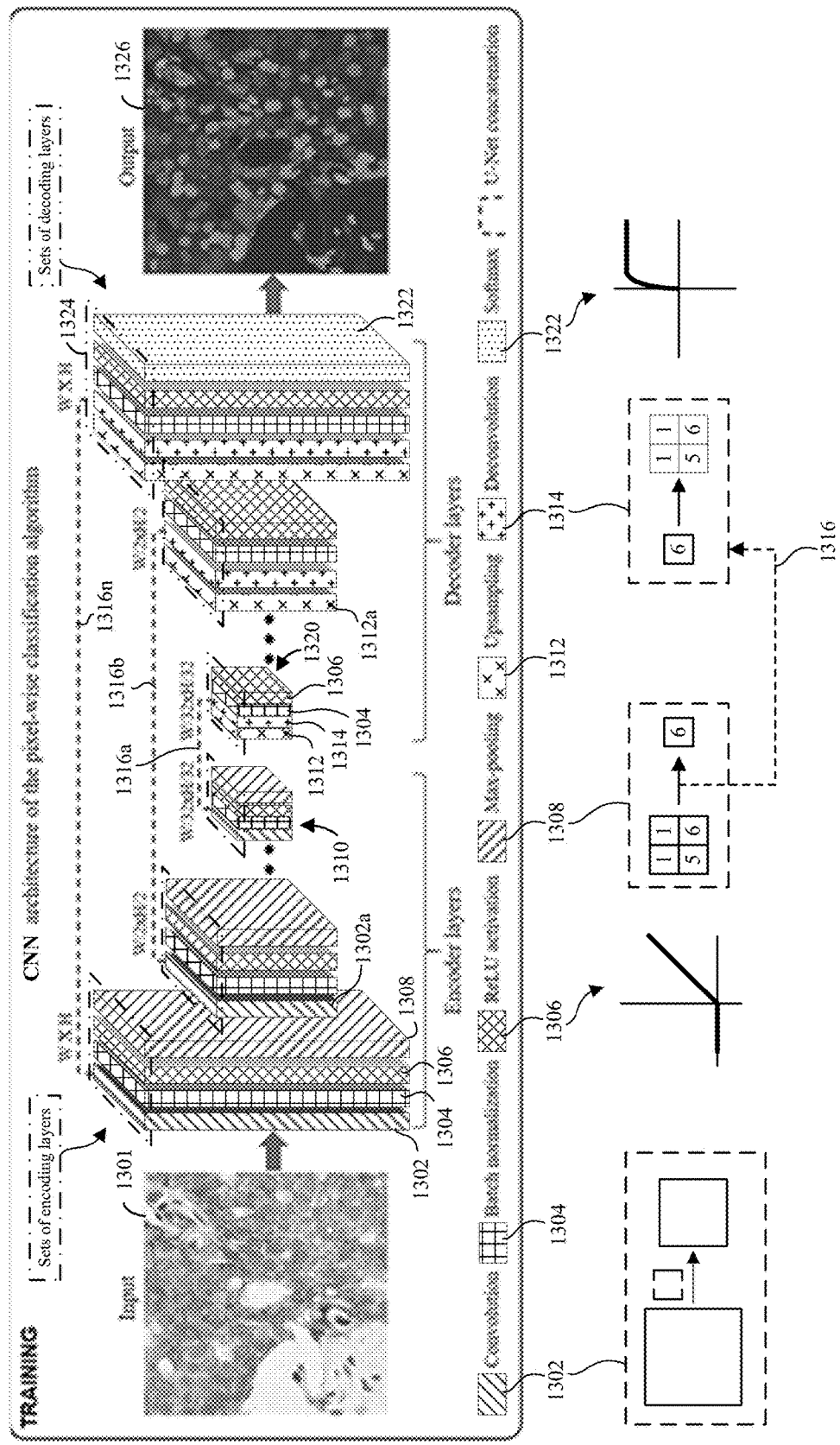
FIG. 13 depicts a block diagram of an architecture for training a machine learning model configured to learn segmentation of images, e.g., histology/cytology images acquired via a computational refocusing procedure such as a Fourier ptychographic digital refocusing method, according to some implementations.

According to an aspect, a human annotator (e.g., pathologist) and/or automated annotator may annotate the training images in a training dataset to identify and/or enumerate one or more portions of interest. For example, an annotator may identify and/or enumerate viable tumor cells or collections of viable tumor cells. The annotation may serve as the gold standard, or ground truth, for training a model. In some cases, the z-stack image set of reconstructed images from a Fourier ptychographic digital refocusing procedure may be annotated. The annotation may involve demarcating or segmentation of the boundary at each site of a portion of interest. A demarcated or segmented image may appear to have clearly defined or delineated boundaries drawn over the image to identify the portions of interest such as, e.g., viable tumor cells. In one example, annotations may be assisted by one or more boundary classification algorithms configured to predict the likelihood of identified demarcation lines belonging to boundaries (e.g., pixels belonging to a boundary, e.g., of tumor cells the model is tasked to identify), which may be useful where lines are blurry or to expedite annotation. In some cases, a human annotator may use the z-stack of reconstructed images generated by a Fourier ptychographic digital refocusing procedure to confirm that the annotations cover all portions of interest such as microcellularity sites. The segmented image 1326 shown in FIG. 13 is an example of a human-annotated image.

For training purposes, a prescribed number of cancer cellularity sites may be used. In one implementation, approximately 5,000 are used. For example, 5,000 cancer cellularity sites may translate to the use of approximately 17 whole slides. In one aspect, 80 slides may be acquired for training so that the heterogenous ranges of cellularity and/or the full range of response may be covered. In another aspect, a smaller number of slides may be used. For example, a small testing set of 20 slides may be generated for validation or accuracy test, where the annotation of the testing set may follow the same protocol as the training dataset (e.g., using the same annotator who annotated the training dataset).

Alternatively or additionally, an annotator may annotate with other information such as an estimation of a coverage metric, such as a percentage area coverage of a viable tumor cells. Tumor cellularity in histology/cytology slides may be quantified (e.g., enumeration of viable tumor cells) and combined with lymph node counts to generate a composite residual cancer burden (RCB) index described at http://www.mdanderson.org/breastcancer_RCB. According to certain aspects, transfer learning training may be implemented. Transfer learning may refer to fine-tuning a learning model by first using, for training the learning model, data (e.g., pathology images) from a first portion of a body (e.g., breast cancer cells), and then repurposing the model for use with a second portion of the body (e.g., lung cancer cells). In such a case, the model may apply one or more weights associated with a training dataset corresponding the training pathology image to a training dataset corresponding to a training pathology image comprising a pathology image from the second portion of the body. However, the training dataset size for subsequent tasks (e.g., second or more body parts)

can be expected to be smaller than usual since the majority of the weights from the first body part may be "transferred" and relatively few weights are re-trained using a new training dataset corresponding to, e.g., the second body part. In particular, a machine learning model corresponding to the second body part may be initialized with weights corresponding to the trained machine learning model of the first body part. Continuing with this example, the initial weights of the machine learning model corresponding to the second body part may be updated based on training of the machine learning model using training images associated with the second body part. In this manner, transfer learning may decrease use of computational resources and model training time (e.g., by requiring less time to train a second machine learning model that utilizes weights obtained from a previously trained model applicable to a different region) and may decrease a number of training images required.

B. Training Deep Learning Model(s)

Figure 10:
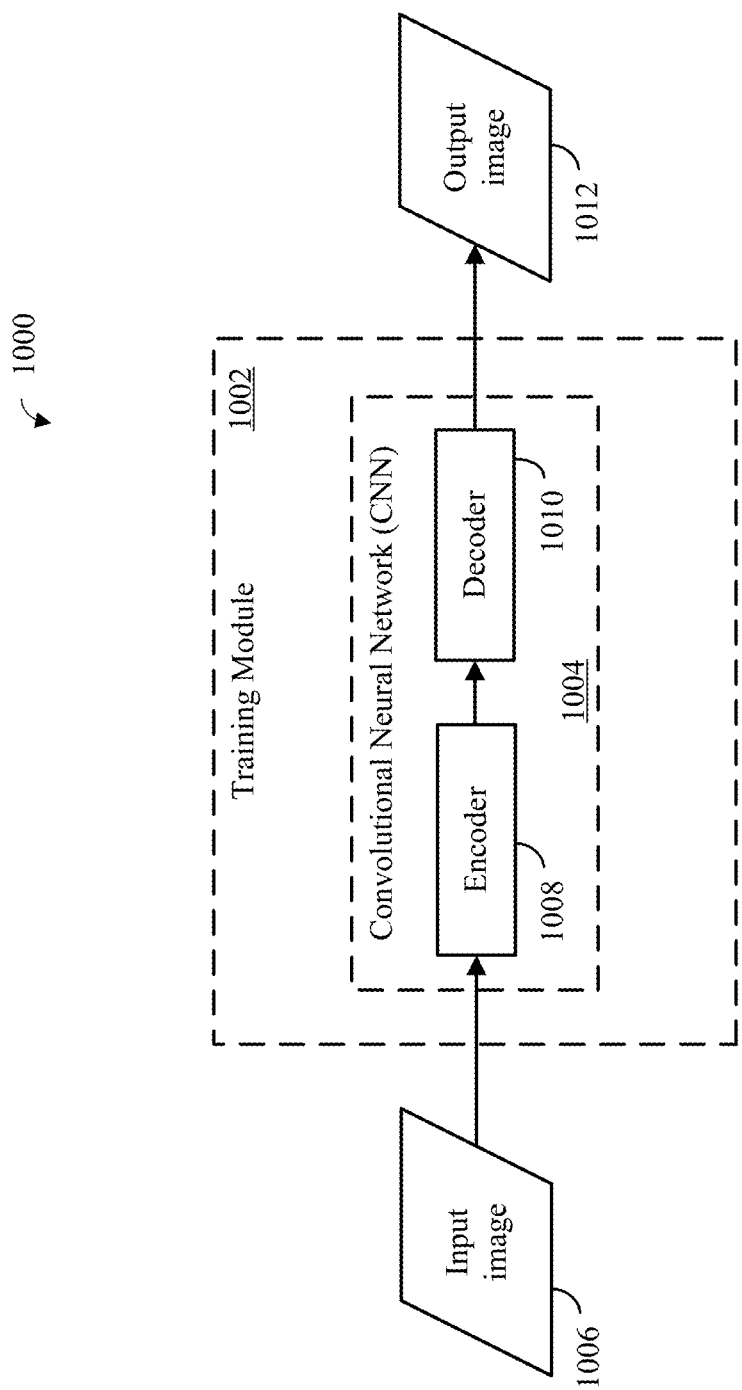
FIG. 10 depicts a block diagram of an architecture of a deep learning or machine learning model, according to some implementations.

FIG. 10 illustrates a block diagram of an architecture of a deep learning or machine learning model 1000, according to implementations. In some implementations, the machine learning model 1000 includes a training module 1002, which may include a neural network such as a convolutional neural network (CNN) 1004. Every image can be represented as a matrix of pixel values. In some cases, the CNN may be configured to apply a filter or a "kernel" over some of the pixels of an input image 1006 to generate a representation of the pixels the kernel is applied to. According to different implementations, the kernel may be a matrix that allows an element-wise multiplication of respective values associated with the pixels. As but one example, the below 3×3 kernel matrix (useful in, e.g., feature edge detection) may be convolved with pixel values of the input image 1006 and generate a sum of the multiplication of the kernel and the pixel values:

$$\begin{bmatrix} 0 & 1 & 0 \\ 1 & -4 & 1 \\ 0 & 1 & 0 \end{bmatrix}$$

A feature map may then be produced, the feature map having the convolved values. The dimensions of the feature map are smaller than those of the kernel (3×3) since the sum of the product of the kernel and the pixels has a 1×1 value.

Continuing with the above in a simple example of an input image, if assumed that the image is a red-green-blue (RGB) image with three values per pixel, three feature maps may be generated, one for each color component. One may consider the dimensions of the kernel to then be 3×3×3. With additional colors, additional feature maps may be generated.

Figure 11:
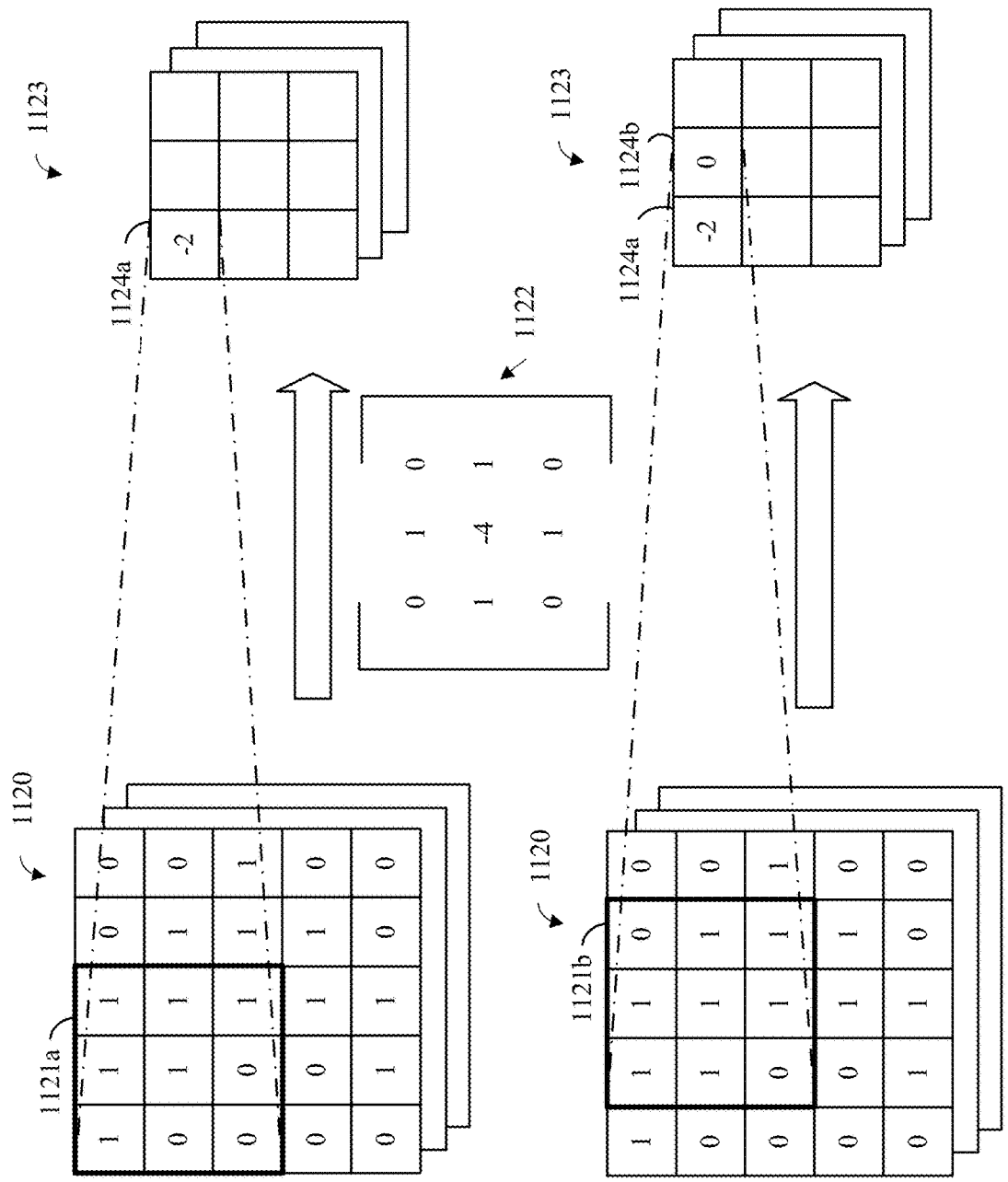
FIG. 11 depicts a block diagram of an architecture of a deep learning or machine learning model, according to some implementations.

FIG. 11 illustrates an example application of a kernel matrix 1122 with pixel values of an image 1120 to generate a portion of a feature map 1123. More specifically, a convolution value 1124a may be determined based on the product of the pixel values 1121a (the nine values within the 3×3 matrix indicated by the square outline). The kernel may take "strides" or steps of one pixel as it moves along the image. As used herein, a "stride" may refer to a parameter utilized to indicate a number of pixels over which the kernel matrix traverses over a training image. Larger values of the stride correspond to skipping over larger numbers of pixels, and vice versa. A larger stride may generate a more compressed image of a given layer of a network relative to a smaller stride. In some examples, the stride may be an integer value, such as 1, 2, 3, 5, etc. In some implementations, strides may be larger, e.g., steps of two pixels. The kernel may then generate another convolution value 1124b based on the pixel values 1121b, and so on. Convolution may be useful for feature detection, feature extraction, reduction of parameters, image classification, and the like.

Returning to FIG. 10, the CNN 1004 may include an encoder portion 1008 and a decoder portion 1010. The encoder portion 1008 may be configured to encode the input image 1006 into feature representations at multiple different levels (e.g., downsampled image dimensions). In some cases, the encoder portion 1008 may include convolution functionality configured to perform convolutions as described above and illustrated with respect to FIG. 10. The decoder portion 1010 may be configured to project the lower-resolution features learned by the encoder onto the pixel space (e.g., upsampled original resolution) to obtain an output representation 1012 of the input image (e.g., a segmentation map, a segmented image). Various layers may be involved in each of the encoder and decoder portions 1008, 1010 as will be discussed below. The segmented image may include blocks of pixels that have been classified (e.g., as a final output of the decoder portion) as belonging to a particular category. Example categories include normal tissue, abnormal tissue, or tumor tissue. In some implementations, various blending or thresholding algorithms may be performed on original pixel classifications, for example, to generate a segmented image with relatively smooth boundaries between clusters of pixels having different classifications.

In some implementations, a deep learning model or a machine learning model may include a neural network such as an encoder-decoder network (including encoder and decoder portions 1008, 1010). In some implementations, the encoder-decoder network may include a network configured to utilize so-called skip connections. In general, a neural network may pass feature information from a first layer to a next layer. Use of skip connections may allow the feature information to be passed from the first layer to one or more other layers other than the next layer. Skip connections may allow layers of the encoder-decoder network to utilize feature information from multiple other layers of the network other than the preceding layer, thereby allowing fine-grained details learned in various layers of the network to be utilized by the decoder portion in generating an output. Moreover, skip connections may reduce the "vanishing gradients" problem that arises with use of backpropagation when updating network weights. In some implementations, relative short skip connections may be implemented using a ResNet architecture, where feature information is passed to relatively nearby layers. In specific cases, the network may include a U-Net convolutional network architecture. A U-Net convolutional network architecture may utilize long skip connections, where feature information is passed to layers that are relatively further away. For example, feature information may be passed from encoder layers to decoder layers. In some situations, such encoder-to-decoder skip connections may better preserve object boundaries. Such a U-Net architecture may be configured for segmentation of images and configured to utilize skip connections.

Figure 12:
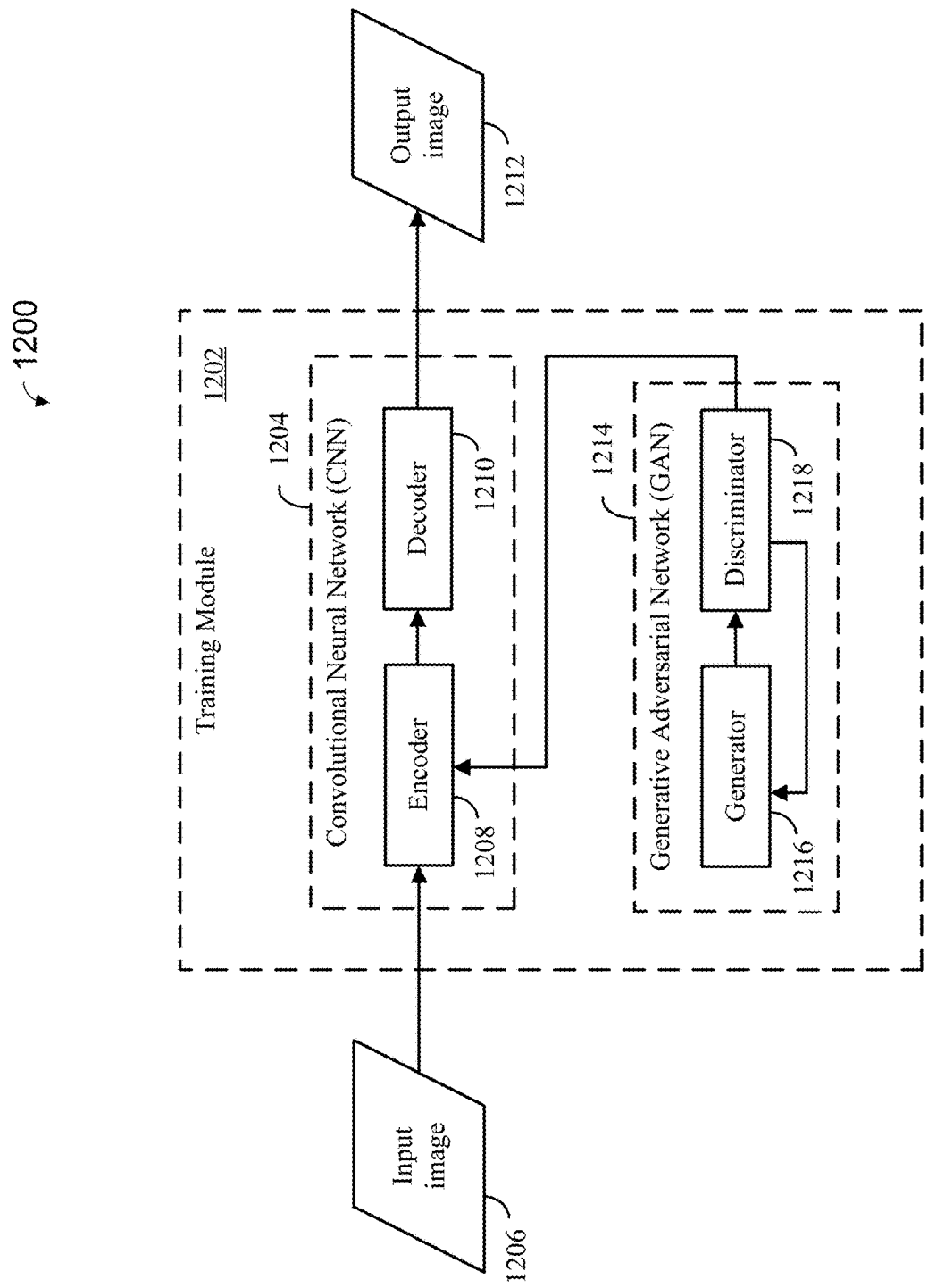
FIG. 12 depicts a block diagram of an architecture of a deep learning or machine learning model, according to some implementations.

FIG. 12 illustrates a block diagram of an architecture of a deep learning or machine learning model 1200, according to some implementations. The machine learning model 1200 includes a training module 1202, which may include a neural network such as a convolutional neural network (CNN) 1204. The CNN 1204 may include an encoder portion 1208 and a decoder portion 1210, which may be examples of encoder portion 1008 and decoder portion 1010 of FIG. 10.

The encoder portion 1208 and the decoder portion 1210 may be configured to obtain an input image 1206 and produce an output representation 1212, respectively.

The training module 1202 may further include a generative adversarial network (GAN) 1214. The GAN 1214 may include a generator 1216 and a discriminator 1218. In this context, a discriminator may refer to a type of neural network which is configured to learn to distinguish fake data from realistic fake data, which may have the same characteristics as the training data. The fake data may be generated by the generator 1216.

In some implementations, GAN-based transfer learning can effectively decrease the amount of required annotated training dataset. Specifically, histopathological images of similar cancer cells (e.g., from the aforementioned second body type, e.g., lung cancer cells) may be passed through the GAN, so that the discriminator 1218 learns an unsupervised abstract representation of the data. In some cases, discriminator weights may then be transferred to the encoder portion 1208. The model 1200 may be further trained with a smaller number of manually annotated images that are available by optimizing at least some weights; transfer learning can enable the model to optimize only some weights rather than the entire network of nodes.

FIG. 13 illustrates a block diagram of an architecture 1300 for training a machine learning model configured to learn segmentation of images, e.g., histology/cytology images acquired via a computational refocusing procedure such as Fourier ptychographic digital refocusing, according to certain implementations. The architecture 1300 may be a CNN based architecture with an encoder-decoder network such as, for example, a U-Net convolutional network architecture. The encoder-decoder network may possess pixel classification accuracy and effectiveness with limited dataset images. This architecture of the encoder-decoder network may include three sections: a contraction section (also referred to as an encoder portion), a bottleneck, and an expansion section (also referred to as a decoder portion).

In the illustrated example, an input image 1301 is obtained and provided to the architecture 1300, e.g., at a convolution layer 1302 of an encoder portion of the architecture 1300. As used herein, a "layer" may refer to a group of nodes of a neural network which are used for a particular task. Some or all nodes of a layer may contain data, such as values, weights, null data, etc., and may form, individually or in combination, vertices and matrices. In some cases, the input image may have a defined image patch size, such as 512×512×3 or 1024×1024×3 pixels. In some implementations, the convolution layer 1302 may be configured to perform convolutions to generate a convolutional representation, e.g., such as the feature map 1123 described with respect to FIG. 10. In some implementations, a 3×3 convolution kernel may be applied. However, it is recognized that other kernel sizes may be selected. In other implementations, additional kernels may be used. For example, the number of kernels may double after a set of encoder layers.

The encoder portion of the architecture 1300 includes a normalization layer 1304, which may be configured to normalize the output of the previous layer, the feature map from the convolution layer 1302. In some cases, the normalization layer 1304 may be configured to perform batch normalization, weight normalization, layer normalization, group normalization, or weight standardization.

The encoder portion of the architecture 1300 also includes an activation layer 1306. In some implementations, the activation layer 1306 may be configured to perform Rectified Linear Unit (ReLU) activation on the normalized feature map. ReLU activation may refer to introduction of non-linearity, useful for backpropagation of errors when training a neural network. That is, all the negative values in the feature map (e.g., feature map 1123 as shown in FIG. 10) are replaced with zeroes, resulting in deactivation of a node if the output of the linear transformation is less than 0. Such functionality may be represented as ReLU(x)=max(0, x).

In some implementations, other types of ReLU functionality may be used. For example, Leaky ReLU may be used, which has a small positive slope in the negative area. Such functionality may be represented as, for example, LReLU $(\lambda)=\alpha x$ for $x<0$; x for $\geq 0$. $\alpha$ may be fractional value, e.g., 0.1, 0.01. Other examples include Parametric ReLU (PReLU) and Exponential Linear Unit (ELU).

The encoder portion of the architecture 1300 also includes a pooling layer 1308, which may be configured to reduce the dimensionality of each rectified feature map from the activation layer 1306, while retaining the most important information. In some implementations, max pooling may be used, which may refer to defining a spatial neighborhood from a rectified feature map (e.g., a 2×2 window), and taking the largest element from the rectified feature map within that window. Similar to the convolution of convolution layer 1302 (and the convolution depicted in FIG. 10), a stride of 1, 2, or more may be taken to obtain the maximum value from the window. In some implementations, a 2×2 window for max pooling may be applied. However, it is recognized that other window sizes may be selected for max pooling. In addition, in some implementations, other types of spatial pooling may be used, e.g., average pooling, mean pooling, sum pooling (sum of inputs). The pooling layer 1308 may thereby generate another convolutional representation, e.g., a downsampled output array of pixel values containing, e.g., maximum values from the window applied across the input rectified feature map. The layers 1302-1308 may collectively be referred to as encoder layers or a set of encoder layers.

The output array may be passed to the next set of layers, starting with another convolution layer 1302a as illustrated in FIG. 13. Substantially similar operations may be performed with the subsequent layers as described above with respect to the convolution layer 1302, normalization layer 1304, activation layer 1306, and pooling layer 1308, further downsampling the input image and generating convolutional representations with reduced dimensions W, W/2, W/4, H, H/2, H/4, etc., where W is the width of the input image and H is the height of the input image.

In some cases, the central bottleneck layer may mediate between the encoder layers (contraction section) and the decoder layers (expansion section). In some cases, a bottleneck layer may refer to a layer that contains fewer nodes compared to the previous (or subsequent) layers. It can be used to obtain a representation of the input with reduced dimensionality. The bottleneck layer may transfer the final convolutional representation (e.g., a matrix that has been max pooled by the final set of layers 1310 of the encoder portion) to an upsampling layer 1312 in the decoder portion of the encoder-decoder network. In some implementations, the upsampling layer 1312 may be configured to upsample the input (e.g., an image represented by pixel values). In some implementations, upsampling may be accomplished via an interpolation filter that is configured to perform, e.g., bilinear interpolation. In some implementations, no fully connected layers are present, and the encoder-decoder network may be entirely convolutional. However, in particular implementations, one or more fully connected layers may be present between the encoder layers and the decoder layers.

A fully connected layer may be configured to further downsample the output of the final pooling layer into, e.g., a single-dimension representation.

The encoder portion of the architecture 1300 also includes a deconvolution layer 1314, which may be configured to use information passed from the corresponding final set of layers 1310 of the encoder portion via a skip connection 1316a between the final set of layers 1310 and the first set of decoder layers 1320. In some implementations, the information passed via the skip connection 1316a may include original values that have been pooled (e.g., values that were max pooled in the pooling layer of the final set of layer 1310). The information may further include other pixel information, transform information (e.g., an indication that max pooling function was used by the pooling layer 1308), and/or feature map information. In some implementations, the filter window for deconvolution may have defined dimensions, e.g., 3×3. In some implementations, the decoder portion may include a normalization layer 1304 and an activation layer (e.g., ReLU activation layer) 1306, which may perform substantially similar functions as those described above. In some implementations, the number of feature maps may be reduced, e.g., halved to maintain symmetry with the encoder layers such that the number of sets of encoder and the number of sets of decoder layers match so as to allow skip connections to be formed between them. In addition, in some implementations, the input may be appended by feature maps of the corresponding encoder layer, ensure that the learned features from encoding will be used for reconstruction.

The first set of decoder layers 1320 may thereby generate a deconvolutional representation, e.g., a segmented image. In some cases, the segmented image may be an upsampled rectified feature map represented by a deconvoluted output array of pixel values, where the array has greater dimensions than the input (e.g., from W/32 to W/16). The output array may be passed to the next set of layers, starting with another deconvolution layer 1312a and passing information via skip connections 1316b, 1316n as illustrated in FIG. 13. Substantially similar operations may be performed with the subsequent layers as described above with respect to the upsampling layer 1312, deconvolution layer 1314, normalization layer 1304, and activation layer 1306, further upsampling the input image and generating deconvolutional representations with increased dimensions.

In some cases, the final layer of the final set of layers 1324 of the decoder portion may include a softmax layer 1322. The softmax layer 1322 may be configured to use a logistic function to classify inputs, producing a probability from 0 to 1. In some implementations, the probability may indicate the probability of the demarcation lines (e.g., the pixels making up the lines) being a valid boundary in a segmented image 1326 that is the same size as the input image 1301. In some cases, the highest-probability pixels (e.g., above a threshold or a prescribed percentile of probability relative to other pixels) may be selected to indicate the demarcation lines belonging to actual boundaries of tumor cells the model is tasked to identify. The layers 1312, 1314, 1304 and 1306 (if implemented in the decoder portion), and 1322 (if implemented in the final set of decoder layers 1324) may collectively be referred to as decoder layers or a set of decoder layers.

Figure 14:
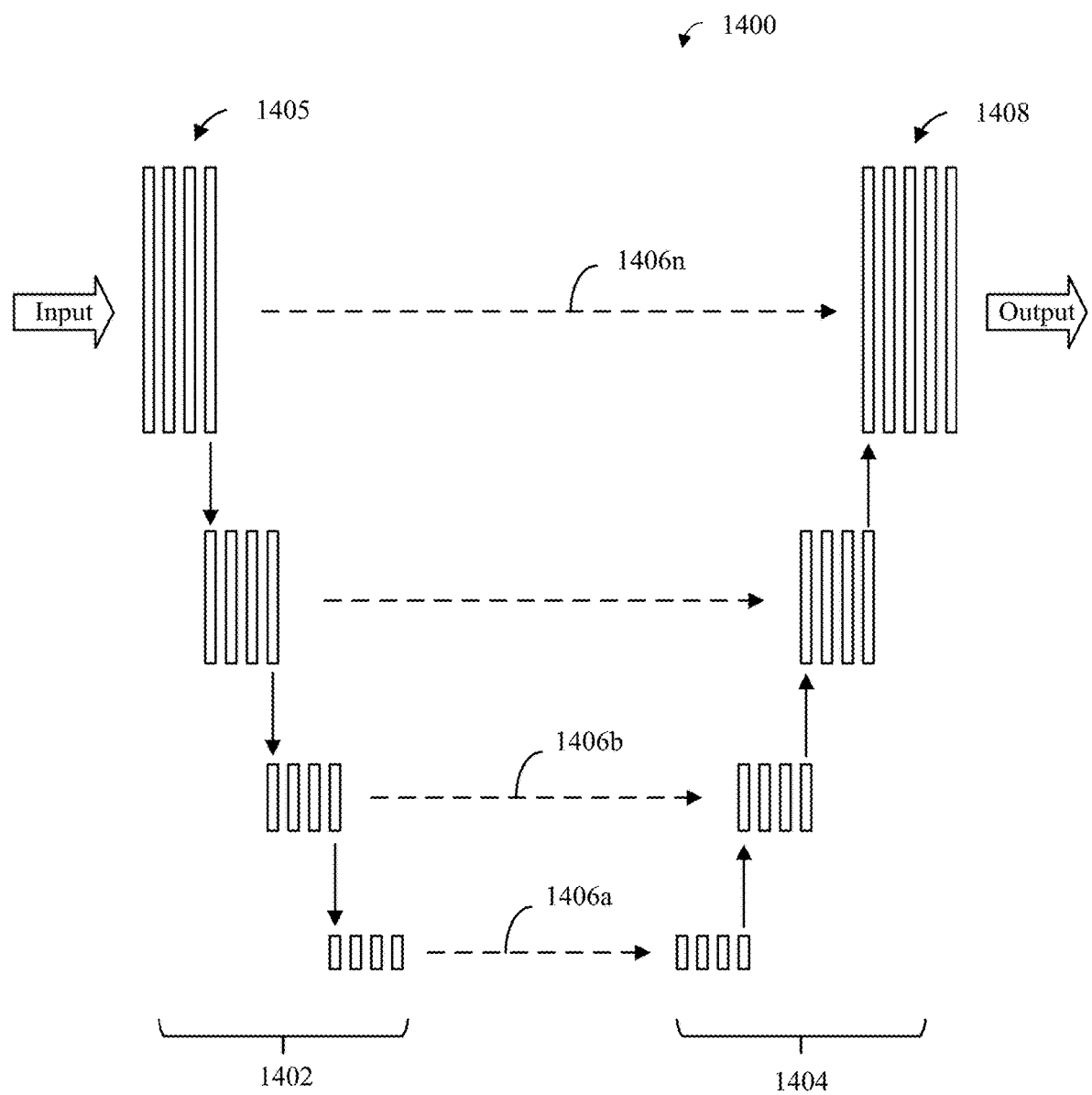
FIG. 14 depicts a block diagram of a U-Net architecture for training a machine learning model configured to learn segmentation of images, e.g., histology/cytology images acquired via a computational refocusing procedure such as a Fourier ptychographic digital refocusing procedure, according to some implementations.

FIG. 14 illustrates a block diagram of a U-Net architecture 1400 for training a machine learning model configured to learn segmentation of images, e.g., histology/cytology images acquired via computational refocusing procedures such as Fourier ptychographic digital refocusing, according to some implementations. In some implementations, the U-Net architecture includes a convolutional network that may be implemented as an encoder-decoder network, such as that described with respect to FIG. 13.

In some implementations, similar to FIG. 13, the U-Net architecture 1400 may include an encoder portion 1402 (including contraction blocks) and a decoder portion 1404 (including expansion blocks). The encoder portion 1402 may include sets of layers. Each set of encoding layers 1405 in the encoder portion may include one or more of a convolution layer, a normalization layer, an activation layer, and/or a pooling layer. These layers may be examples of the layers 1302-1308 as shown in FIG. 13 and discussed above, and may be configured to perform substantially similar functions. Each set of decoding layers 1408 in the decoder portion may include one or more of an upsampling layer, a deconvolution layer, a normalization layer, and/or a pooling layer. These layers may be examples of the layers 1312, 1314, 1304, 1306, respectively, as shown in FIG. 13 and discussed above, and may be configured to perform substantially similar functions. The final set of decoding layers may include a softmax layer, which may be an example of the softmax layer 1322 of FIG. 13. The number of sets of decoding layers may the same as the number of sets of encoding layers.

In some implementations, similar to FIG. 13, skip connections 1406a, 1406b, 1406n may be utilized to transmit information between an encoder layer and a corresponding decoder layer, e.g., between a convolution layer and a deconvolution layer. Such information may include, e.g., original values before pooling, pixel information, transform information (e.g., an indication that max pooling function was used by the pooling layer), and/or feature map information.

In some implementations, GAN-based transfer learning can be used to effectively decrease the amount of required annotated training datasets, especially when the model is being re-trained for pathology images from different portions of the body.

Figure 15:
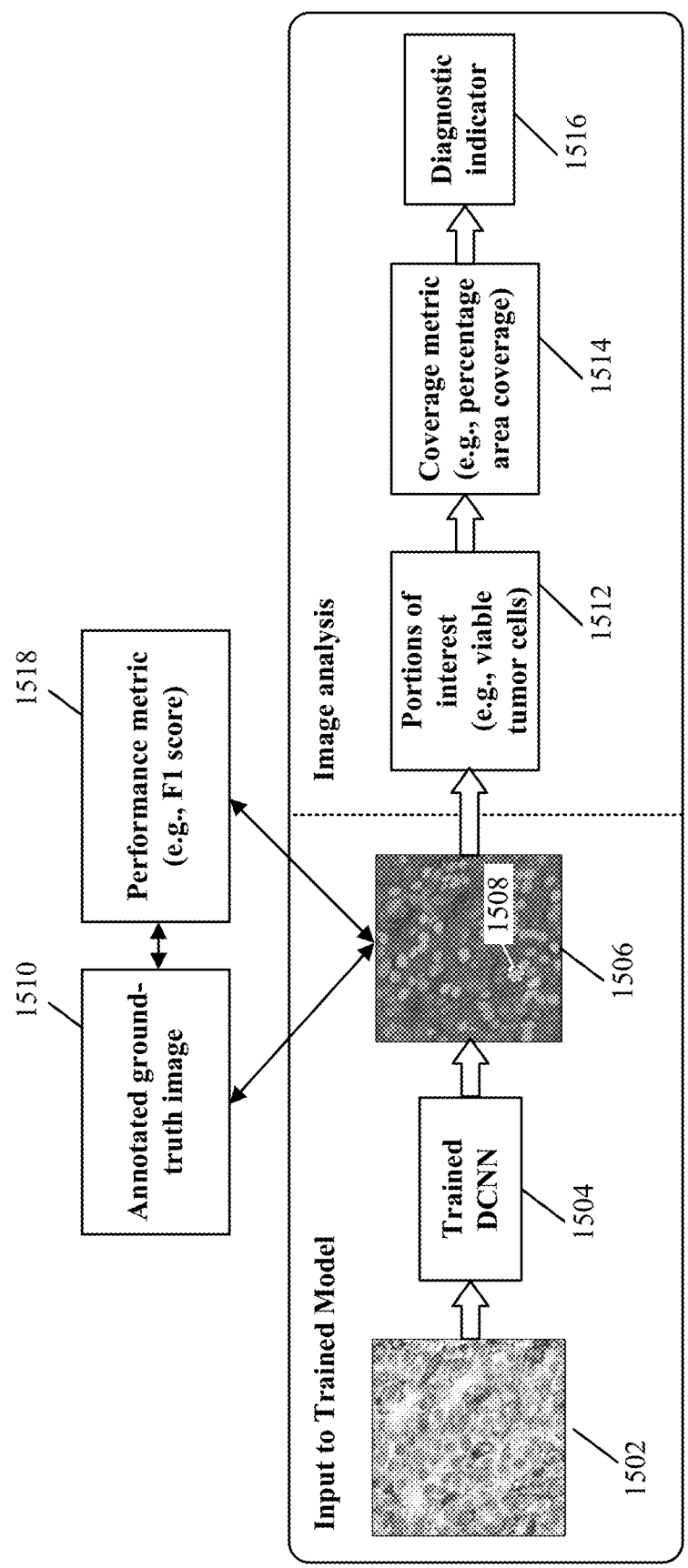
FIG. 15 depicts a block diagram illustrating testing and analysis of a trained machine learning model configured to produce segmented images, e.g., of histology/cytology images acquired via a microscopy procedure, according to some implementations.

FIG. 15 is a block diagram illustrating analysis of an image using a trained machine learning model, according to certain implementations. The method may produce a segmented image of, e.g., a histology/cytology image acquired by an imaging procedure. In the illustrated example, an input histology/cytology image 1502 is provided to a deep convolutional neural network (DCNN) 1504 of a trained machined learning model. In some implementations, the histology/cytology image 1502 being analyzed may be obtained from standard microscopy or from a digital pathology scanner. In other implementations, the histology/cytology image 1502 may be a substantially uniformly focused image obtained from a Fourier ptychographic digital refocusing procedure that uses image data acquired by a Fourier ptychographic imaging device such as an FPM. In yet other implementations, the histology/cytology image 1502 may be obtained from a refocusing procedure different from the Fourier ptychographic digital refocusing procedure.

Note that the DCNN 1504 may have been trained using training images such as all-in focus training images obtained from a Fourier ptychography digital refocusing procedure, e.g., using an FPM. However, in certain aspects the trained DCNN 1504 may be configured to receive input from analysis images that are not acquired based on FPM, which can advantageously provide users the benefit of using a model trained based on images containing a higher amount of information (the FPM-based training image being uniformly in focus).

In some implementations, the model may be trained to identify portions of interest (e.g., viable lung cancer tumor cells) based on, e.g., the procedures described with respect to FIG. 13 or 14. The trained model may generate a convolutional representation of the input histology/cytology image 1502 in the form a segmented image 1506. In one examples, the segmented image 1506 is generated as a result of convolution and deconvolution as discussed with respect to FIGS. 13 and 14 In some cases, the segmented image 1506 may have demarcated boundary lines that identify portions of interest such as, e.g., different types of cells, abnormalities (e.g., viable and/or benign tumor cells). As an example, a demarcated area 1508 in segmented image 1506 is shown. The boundary lines around demarcated area 1508 may indicate a portion of interest such as a tumor cell. In some implementations, the boundary lines may be determined based on a probability of the pixel associated with the boundary line exceeding a threshold or relative threshold compared to other pixels.

In one implementation, the segmented image 1508 may be compared with a ground truth image 1510 to at least determine an accuracy or validity of the segmented image 1506. For instance, the comparison may be performed to reveal whether and to what extent portions of interest (e.g., viable tumor cells, e.g., cancer cells) were identified and/or demarcated with boundary lines such as boundary lines 1508. In one example, the ground truth image 1510 may be obtained from one or more human annotators (e.g., pathologists) who mark or otherwise indicate which areas correspond to the portions of interest.

According to certain aspects, the segmented image 1506 may be analyzed. For example, the image analysis may include identifying or determining portions of interest (e.g., viable tumor cells) 1512. The boundary lines 1508 appearing on the segmented image 1506 may indicate a portion of interest.

In some cases, the image analysis may also include enumeration of portions of interest (e.g., viable tumor cells). In some of these cases, the image analysis may also include determining a coverage metric 1514, e.g., a percentage area coverage, of the portions of interest in the segmented image 1508. Based on the area covered by the identified portions of interest on the segmented image 1506, the coverage metric 1514 may be determined. For example, if the total area occupied by the identified portions of interest is 40% of the segmented image, and the other portions do not correspond to the portions of interest, then the coverage metric 1514, or the percentage area coverage, may be determined to be 40%. Further, a quantity or number of the viable tumor cells may be identified and enumerated based on the demarcation lines (e.g., closed lines indicative of one cell).

In some implementations, the image analysis may include producing a diagnostic indicator 1516. In some implementations, the diagnostic indicator may include one or more possible diagnoses (e.g., a possible diagnosis of NSCLC). In some cases, the likelihood and/or confidence of the likelihood of such diagnoses may be included based on the coverage metric 1514 in the segmented image 1506. In some cases, the likelihood and/or confidence of the likelihood may be determined based on the segmented image 1506 and one or more other segmented images 1506 so as to provide greater n and thereby greater confidence in the likelihood. In some implementations, the diagnostic indicator 1516 may be provided to a user, e.g., on an interface, or stored on a computer-readable medium for later evaluation or use.

In some implementations, other types of cells (e.g., non-tumor cells) may be identified using the aforementioned image analysis process. A coverage or quantity metric may be applied to other such cell populations. Moreover, their locations in the tumor or relative to tumor cells may provide guidance data that may be useful for monitoring the efficacy of treatment, as well as alluding to prognosis, therapy response, and/or outcome. In some cases, identifying spatial orientation (e.g., direction of growth of a group of cells, whether tumors or not) using the aforementioned image analysis process could play a role in determining how a tumor is progressing.

However, the extent to which successful identification of the portions of interest (e.g., viable tumor cells) and provision of accurate diagnostic indicators have been achieved may be based on sufficiently high accuracy of the identification of the portions of interest (e.g., accurate delineation with boundaries so as to produce accurate coverage metrics, e.g., percentage area coverage).

To this end, in some implementations, the accuracy of the resulting trained models may be compared by comparing the results (e.g., coverage metrics) to those of the original pathologist annotation of the sites based on the z-stack data. The predictive accuracy may be evaluated by at least one performance metric 1518, e.g., the Dice similarity index, also referred to herein as a F 1 score.

In some cases, an F1 score may be determined based on precision and recall. In this context, precision may refer to the fraction of relevant instances among the retrieved instances, or in other words, true positive observations over true positive observations and false positive observations. Recall may refer to the fraction of relevant instances that were retrieved, or in other words, true positive observations over true positive observations and false negative observations. In some cases, the F1 score may be represented by the equation F1=2*|A∩B|/(|A|+|B|), where pixels in A belong to all segmented boundaries from the deep learning output (e.g., segmented image 1506) while pixels in B belong to all reference boundaries (e.g., based on annotations of ground truth image 1510). In some cases, the F1 score may be represented by the equation F1=2*(precision*recall)/(precision+recall)=TP/(TP+0.5*(FP+FN), where TP=true positives, FP=false positives, and FN=false negatives, each determined based on a comparison of pixels or pixel locations between A and B.

In some implementations, once the performance metric (e.g., F1 score) associated with the training segmented image with respect to a ground truth image has been determined, one or more training parameters (e.g., weights of nodes of the model) may be updated based on the performance metric. Weights may refer to learnable parameters of a machine learning model, which in some implementations may be the CNN or the encoder-decoder network. In some implementations, weights may include one or more values of the kernel matrix (e.g., 1122 as shown in FIG. 11) used during convolution (e.g., by convolution layers 1302). The kernel matrix plays a factor in determining the convolutional representation (e.g., feature map 1123). In some implementations, weights may include the size of the stride (step) taken across the input image during convolutions. Although larger strides may reduce time spent on convolution, or reduce possibilities of overfitting or overtraining, smaller strides may result in better resolution of the feature map since more pixels will be generated. In some implementations, weights may include the size of filter window used for convolutions and/or deconvolutions.

In some aspects, the machine learning model can perform gradient descent, an iterative error-optimization algorithm used to find a local minimum or maximum of a function, also known as minimization of a cost (error) function. By setting new, different weights in the next iteration, the model can determine whether the error has been lowered, in which case the subsequent iteration may evaluate any new weights compared to the new weights.

In the case of analysis of the segmentation image 1506 produced by trained DCNN 1504 based on an input histology/cytology image 1502, in some cases, the aforementioned performance metric (e.g., F1 score) may be used to evaluate an error in the model. For example, ff the F1 score is higher (better) in a subsequent iteration, then the error may be considered to be lowered, and vice versa. In some cases, the coverage metric (e.g., percentage area coverage) may be used in a similar way to evaluate the error. If the coverage metric is better in a subsequent iteration, then the error may be considered to be lowered, and vice versa.

C. Example Evaluations of Benchmark Data

To experimentally validate the accuracy and performance of a deep learning program or machine learning model used with FPM-based images, two training datasets generated from an FPM and a standard digital pathology scanner may be used to compare the accuracy of a trained model with a similarly generated validation dataset. Further, in some implementations, a coverage metric (such as area percentage measure) or a performance metric (such as an F1 score) of the viable tumor for each slide may be determined.

In some implementations, the image for each slide in a test pool may be decomposed into multiple tiles (e.g., 300 tiles). One or more pairs of F1 scores may be generated for each tile. One of these F1 score may be for the FPM deep learning algorithm slide output as compared to the ground truth pathologist annotated image. The other F1 score may be for the conventional scanner deep learning algorithm. For each tile, it can then be determined which of the algorithms resulted in a better agreement with the ground truth.

In some implementations, a binomial test can then be performed against the null hypothesis that both algorithms are equal in performance. In one example, it can be determined if FPM deep learning outperforms the conventional approach by determining whether the number of instances that FPM deep learning gave a better F1 score is 3077 or greater with a p-value smaller than 0.05. Beyond this null hypothesis test, F1 score pairs can also be examined and identified, where FPM deep learning is able to substantially outperform conventional scanner deep learning. The associated images can provide (e.g., to an annotator, researcher, or other user) qualitative insights into the extent blurring degrades the conventional approach, and whether FPM is indeed sharpening the resolution and improving deep learning accuracy.

The insights derived above may determine whether FPM's digital refocusing capability can improve deep learning accuracy for demarcation of portions of interest (e.g., NSCLC viable tumor cells). Moreover, in some applications, FPM's improved image quality for deep learning based pathology slide analysis can be adapted for other diseases or other information of interest. However, the present disclosure provides techniques for training a neural network (e.g., of a machine learning model) for cellularity enumeration in other cells such as tumor cells.

IV. Methods

Figure 16:
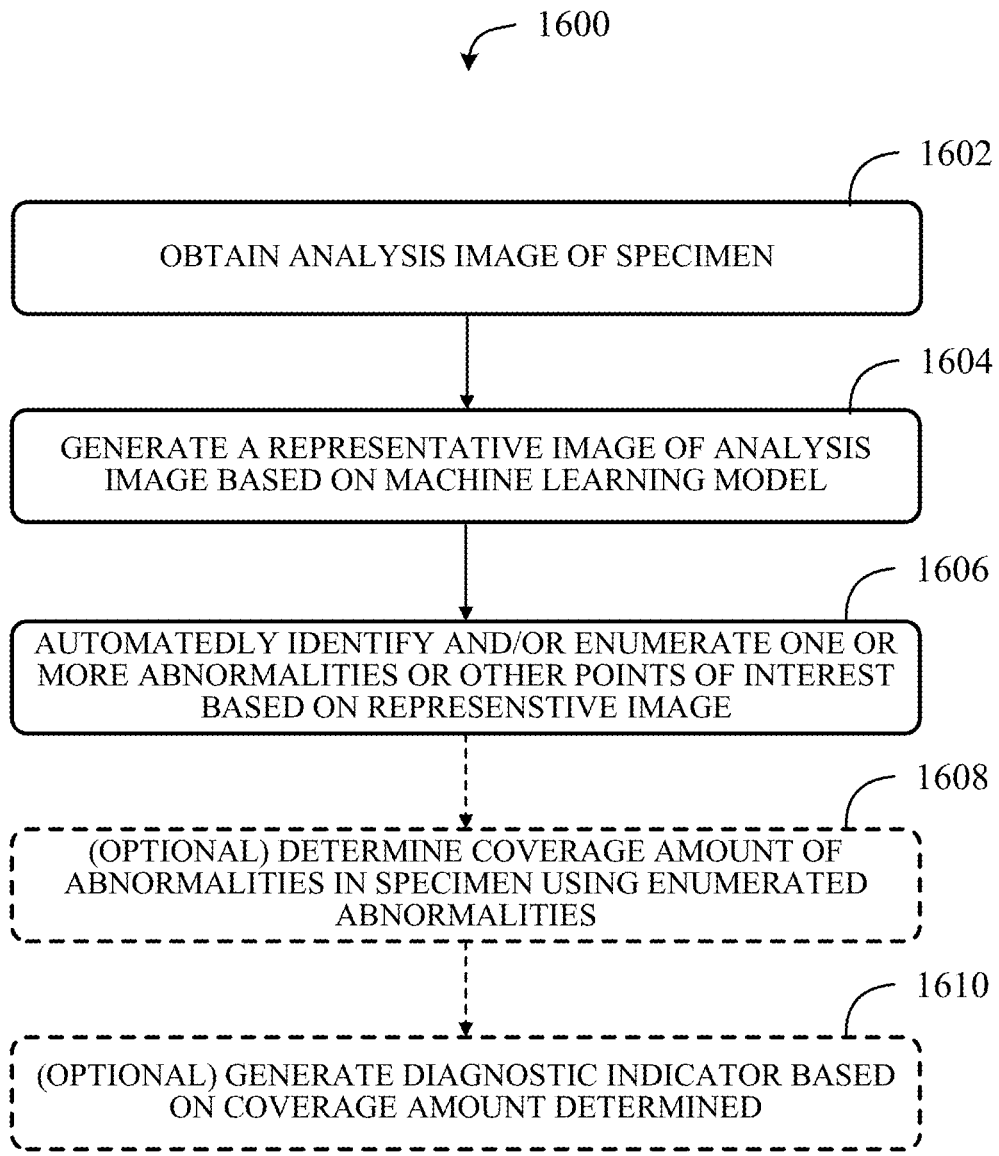
FIG. 16 depicts a flow diagram of an example of a method of computational refocusing-assisted deep learning (CRADL) methodology for identifying and/or enumerating one or more portions of interest in a specimen, according to some implementations.

FIG. 16 is a flow diagram illustrating an example of a computational refocusing-assisted deep learning (CRADL) methodology 1600 for identifying and/or enumerating one or more portions of interest, according to certain implementations. For example, the portions of interest may be abnormalities such as viable tumor cells in a tissue specimen of a pathology slide. One or more of the functions of the methodology 1600 may be performed by a computerized apparatus or system. Means for performing the functionality illustrated in one or more of the steps shown in FIG. 16 may include hardware and/or software components of such computerized apparatus or system, such as, for example, a device, a computer system, or a computer-readable apparatus including a storage medium storing computer-readable and/or computer-executable instructions that are configured to, when executed by a processor apparatus, cause the at least one processor apparatus or another apparatus to perform the operations. Example components of a computerized apparatus or system are illustrated in FIG. 1. A CRADL system may be an example of the computerized apparatus or system.

It should also be noted that the operations of the methodology 1600 may be performed in any suitable order, not necessarily the order depicted in FIG. 16. Further, the methodology 1600 may include additional or fewer operations than those depicted in FIG. 16 to identify abnormalities.

At step 1602, the methodology 1600 may include obtaining an image of a specimen such as a tissue sample. In some cases, the tissue sample may be in the form of a pathology slide. In some implementations, the analysis image of the pathology slide may be acquired determined using a computational or digital refocusing procedure. In one implementation, the computational refocusing procedure includes a Fourier ptychographic digital refocusing procedure such as described with respect to FIGS. 7 and 8 digitally focus the image data to generate an analysis image that is substantially uniformly focused over a field of view of the tissue sample.

In some implementations, the analysis image of the pathology slide may be obtained from a standard microscopy procedure or digital pathology scanner, or a refocusing procedure different from the Fourier ptychographic digital refocusing procedure. As will be touched upon below, one or more training images generated using a Fourier ptychographic digital refocusing procedure that implements an FPM may be provided to a machine learning model. Subsequently providing at inference (of the model trained with Fourier ptychographic all-in-focus images) an image obtained using a procedure that is not based on a Fourier ptychographic digital refocusing procedure may advantageously benefit a user equipped with standard (e.g., non-FPM) equipment with a model trained based on images containing a higher amount of information (the FPM-based training image being uniformly in focus).

At step 1604, the methodology 1600 may include generating a representative image of the analysis image based on a machine learning model. In some cases, the representative image may be a segmented image. Such a segmented image may be generated at least via one or more convolutions and one or more corresponding deconvolutions using a CNN (e.g., a U-Net). The segmented image 1506 output by a trained CNN as shown in FIG. 15 is an example of a segmented image that can be generated. The segmented image may be useful for identifying and/or enumerating cells based on delineations.

At step 1606, the methodology 1600 may include, based on the representative image, automatedly identifying and/or enumerating the abnormalities in the tissue sample from the analysis image. According to various implementations, the abnormalities being identified and/or enumerated may correspond to viable tumor cells, e.g., NSCLC or breast cancer cells, or to a collection of cells. The identification and/or enumeration may be performed based on demarcation lines belonging to boundaries (e.g., pixels belonging to a boundary, e.g., of tumor cells the model is tasked to identify). In certain aspects, one or more boundary classification algorithms (e.g., logistic function used by softmax layer 1322) may be used to predict the likelihood of identified demarcation lines belonging to boundaries.

At step 1608, the methodology 1600 may optionally include determining a coverage amount of the abnormalities in the tissue sample using the identified abnormalities and/or their quantified enumeration. In some implementations, the coverage amount may be based on a coverage metric associated with the segmented image, such as a percentage area coverage metric of portions of interest such as the abnormalities (e.g., viable tumor cells). For example, if the total area occupied by the identified portions of interest is 40% of the segmented image, and the other portions do not correspond to the portions of interest, then the coverage metric, or the percentage area coverage, may be determined to be 40%. Further, in some implementations, a quantity or number of the viable tumor cells may be determined and enumerated based on the demarcation lines (e.g., closed lines indicative of one cell).

At step 1608, the methodology 1600 may optionally include generating a diagnostic indicator based on the coverage amount of the abnormalities in the tissue sample. In some implementations, the diagnostic indicator may include, for example, one or more possible diagnoses (e.g., a possible diagnosis of NSCLC). In some cases, the likelihood and/or confidence of the likelihood of such diagnoses may be included based on the coverage metric in the segmented image. In some cases, the likelihood and/or confidence of the likelihood may be determined based on the segmented image generated at step 1602 and one or more additional segmented images (e.g., also generated at step 1602) so as to provide greater n and thereby greater confidence in the likelihood. In some implementations, the diagnostic indicator may be provided to a user, e.g., on an interface, or stored on a computer-readable medium for later evaluation or use.

Figure 17:
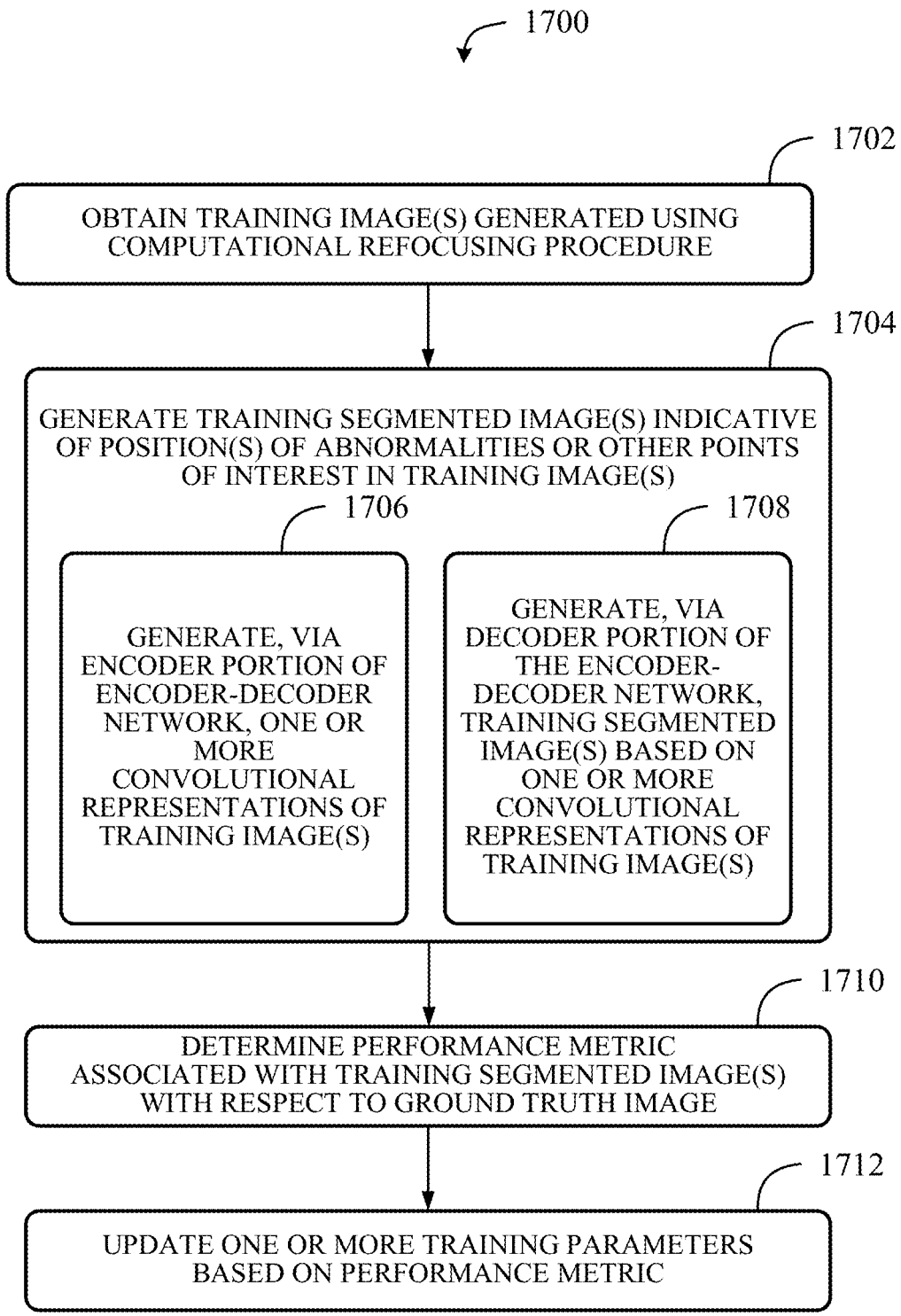
FIG. 17 depicts a flow diagram illustrating a methodology for training a machine learning model for identifying abnormalities (e.g., viable tumor cells) in a tissue sample obtained via a computational refocusing procedure such as Fourier ptychographic digital refocusing procedure, according to some implementations.

FIG. 17 is a flow diagram illustrating a methodology 1700 for training a machine learning model for identifying abnormalities (e.g., viable tumor cells) in a tissue sample or other specimen. The training images may be obtained using a computational refocusing procedure such as Fourier ptychographic digital refocusing, according to some implementations. One or more of the functions of the methodology 1700 may be performed by a computerized apparatus or system. Means for performing the functionality illustrated in one or more of the steps shown in FIG. 17 may include hardware and/or software components of such computerized apparatus or system, such as, for example, a device, a computer system, or a computer-readable apparatus including a storage medium storing computer-readable and/or computer-executable instructions that are configured to, when executed by a processor apparatus, cause the at least one processor apparatus or another apparatus to perform the operations. Example components of a computerized apparatus or system are illustrated in FIG. 1. A CRADL system 10 may be an example of the computerized apparatus or system.

It should also be noted that the operations of the methodology 1700 may be performed in any suitable order, not necessarily the order depicted in FIG. 17. Further, the methodology 1700 may include additional or fewer operations than those depicted in FIG. 17 to train the machine learning model.

In some implementations, the machine learning model may include an encoder-decoder network. In some implementations, the encoder-decoder network may include a convolutional neural network architecture, e.g., a CNN or a DCNN. In some variants, the CNN may include a U-Net architecture.

At step 1702, the methodology 1700 may include obtaining a training dataset of one or more training images. The training image(s) may be generated using a computational refocusing procedure such as, for example, a Fourier ptychographic digital refocusing procedure. In some implementations, the training image(s) may be generated using the Fourier ptychographic digital refocusing procedure to digitally focus the at least one image over a field of view of the tissue sample. FIG. 7 illustrates an example of operations of a Fourier ptychographic digital refocusing procedure.

At step 1704, the methodology 1700 may include generating one or more training segmented images indicative of positions of abnormalities in the training image(s). In some implementations, the training segmented image(s) may be generated at least via one or more convolutions and one or more corresponding deconvolutions using a DCNN (e.g., a U-Net) as described with respect to FIG. 13. An example of the training segmented image(s) is depicted as segmented image 1326 in FIG. 13. The segmented image may be useful for identifying and/or enumerating cells based on delineations. According to certain implementations, the abnormalities may correspond to viable tumor cells, e.g., NSCLC or breast cancer cells.

In some implementations, the generating of the training segmented image(s) may include steps 1706 and 1708. At step 1706, the methodology 1700 includes generating, via an encoder portion of the encoder-decoder network, one or more convolutional representations of the training pathology image(s). In some implementations, the one or more convolutional representations may be feature maps generated via convolution layers of the encoder portion, representative of the training pathology image(s). Each feature map may have different dimensions relative to one another (W, W/2, W/4, H, H/2, H/4, etc.). The feature map 1123 may be an example of a convolutional representation.

At step 1708, the methodology 1700 may include generating, via a decoder portion of the encoder-decoder network, the training segmented image(s) based on the one or more convolutional representations of the training pathology image(s). In some implementations, the training segmented image(s) (e.g., segmented image 1326) may be an output of the decoder portion subsequent to one or more upsampling layers, deconvolution layers, and a softmax layer of the decoder portions.

At step 1710, the methodology 1700 may include determining a performance metric associated with the training segmented image(s) with respect to a ground truth image. In some implementations, the performance metric may include an F1 score, which may be determined based on precision and recall associated with the training segmented image(s) and the ground truth image. In some cases, the F1 score may be mathematically represented with the equation $F1=2*|A \cap B|/(|A|+|B|)$, where pixels in A belong to all segmented boundaries from the training segmented image(s) and pixels in B belong to all reference boundaries (e.g., based on annotations of the ground truth image). In some implementations, the performance metric may include an error with respect to pixels of the training segmented image(s) and corresponding pixels of the ground truth image. In some implementations, the ground truth image may be obtained from one or more human annotators (e.g., pathologists) who mark or otherwise indicate which areas correspond to the abnormalities.

At step 1712, the methodology 1700 may include updating one or more training parameters based on the performance metric. In some implementations, the one or more training parameters may include one or more weights associated with nodes of the model (e.g., the encoder-decoder network), where the weights may include a value of a kernel matrix, the size of the stride (step) taken across the input image during convolutions, and/or the size of filter window used for convolutions and/or deconvolutions.

In some implementations, the one or more training parameters (e.g., weights) may be updated based at least on the performance metric not meeting a criterion. In some implementations, the criterion may correspond to a threshold F1 score. For example, if the F1 score does not exceed the threshold score, then one or more of the weights may be changed to different values. In some implementations, the criterion may correspond to the error with respect to the pixels of the training segmented image and the corresponding pixels of the ground truth image not decreasing. For example, if a step (or change according to, e.g., a learning rate) in one or more weights taken during the minimization of a loss function during gradient descent does not result in a lower error, then one or more of the weights may be changed. Put another way, the weights may be changed when the model does not perform as well as desired.

Figure 18:
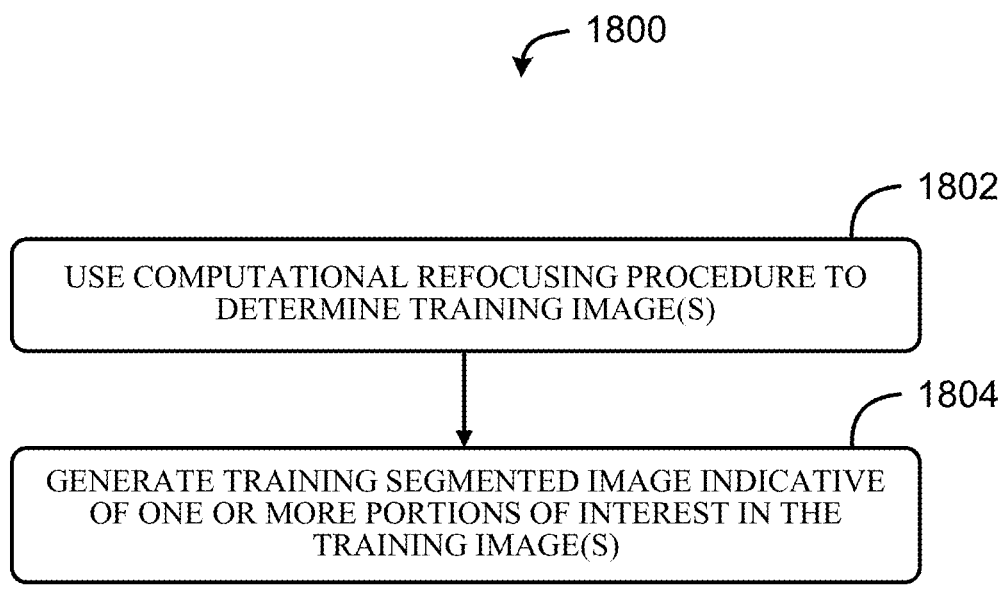
FIG. 18 depicts a flow diagram illustrating a methodology of training a machine learning model for identifying abnormalities in a tissue sample, according to some implementations.

FIG. 18 is a flow diagram illustrating a methodology 1800 of training a machine learning model for identifying abnormalities in a specimen such as a tissue sample on a pathology slide, according to some implementations. One or more of the functions of the methodology 1800 may be performed by a computerized apparatus or system. Means for performing the functionality illustrated in one or more of the steps shown in FIG. 18 may include hardware and/or software components of such computerized apparatus or system, such as, for example, a device, a computer system, or a computer-readable apparatus including a storage medium storing computer-readable and/or computer-executable instructions that are configured to, when executed by a processor apparatus, cause the at least one processor apparatus or another apparatus to perform the operations. Example components of a computerized apparatus or system are illustrated in FIG. 1. A CRADL system may be an example of the computerized apparatus or system.

It should also be noted that the operations of the methodology 1800 may be performed in any suitable order, not necessarily the order depicted in FIG. 18. Further, the methodology 1800 may include additional or fewer operations than those depicted in FIG. 18 to train the machine learning model.

At step 1802, the methodology 1800 may include using the computational refocusing procedure to determine a training dataset with one or more training images. In some implementations, the computational refocusing procedure may be a digital refocusing procedure. For example, a Fourier ptychography digital refocusing procedure that implements an FPM to acquire raw data may be used. The Fourier ptychography digital refocusing procedure is used to generate substantially uniformly focused training images that are combined to form the training dataset. In some implementations, the training image(s) may be generated using the Fourier ptychographic digital refocusing procedure to digitally focus the at least one pathology image over a field of view of the tissue sample. FIG. 7 illustrates an example of operations a Fourier ptychographic digital refocusing procedure.

At step 1804, the methodology 1800 may include generating a training segmented image indicative of positions of abnormalities in the training image(s). In some implementations, the training segmented image may be generated at least via one or more convolutions and one or more corresponding deconvolutions using a CNN (e.g., a U-Net) as described with respect to FIG. 13. An example of the training segmented image is depicted as segmented image 1326 in FIG. 13. The segmented image may be useful for identifying and/or enumerating cells based on delineations. According to certain implementations, the abnormalities may correspond to viable tumor cells, e.g., NSCLC or breast cancer cells.

Figure 19:
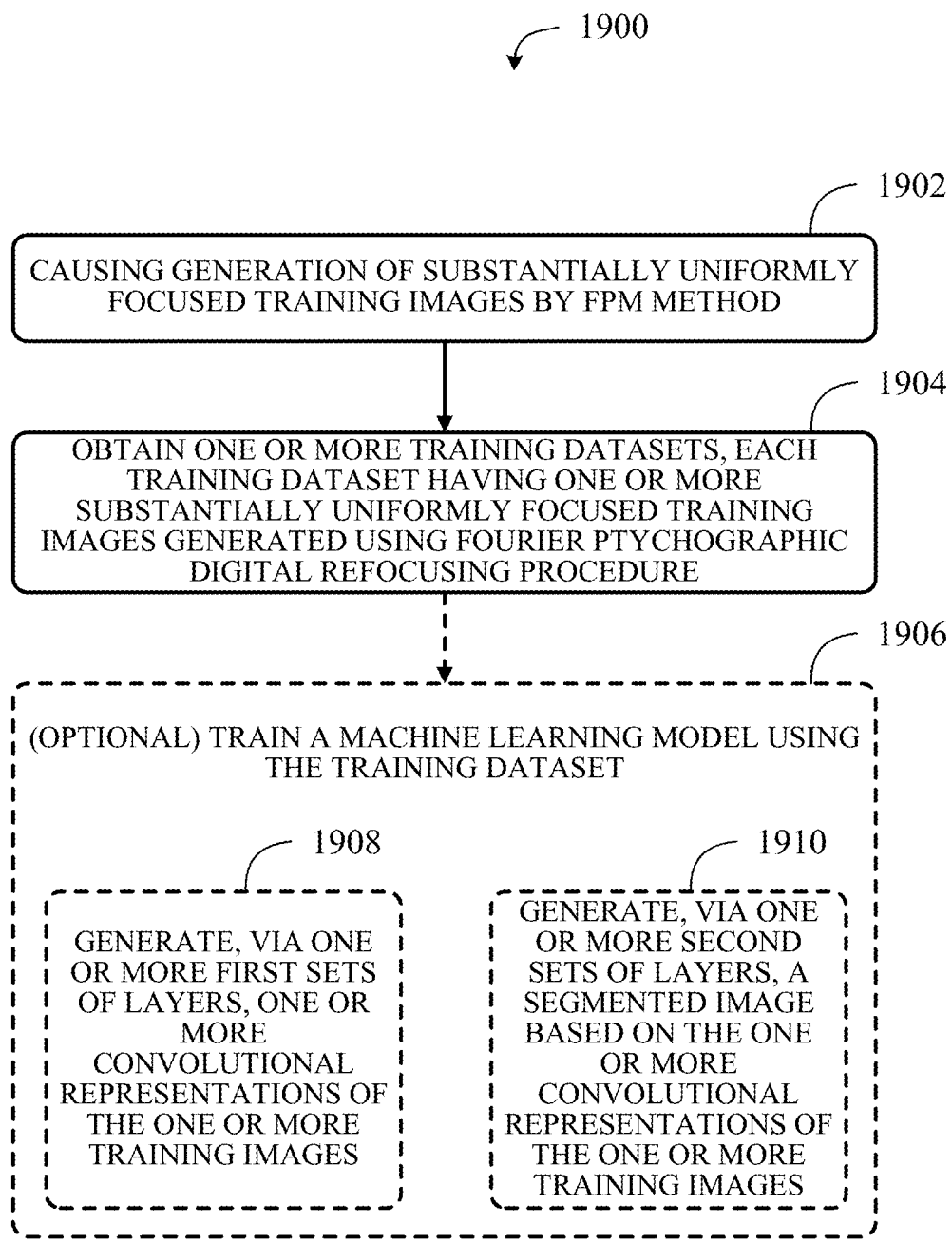
FIG. 19 depicts a flow diagram illustrating a methodology of obtaining a training dataset for training a machine learning model, according to some implementations.

FIG. 19 is a flow diagram illustrating a methodology 1900 of obtaining a training dataset for training a machine learning model, according to some implementations. One or more of the functions of the methodology 1900 may be performed by a computerized apparatus or system. Means for performing the functionality illustrated in one or more of the steps shown in FIG. 19 may include hardware and/or software components of such computerized apparatus or system, such as, for example, a device, a computer system, or a computer-readable apparatus including a storage medium storing computer-readable and/or computer-executable instructions that are configured to, when executed by a processor apparatus, cause the at least one processor apparatus or another apparatus to perform the operations. Example components of a computerized apparatus or system are illustrated in FIG. 1. A CRADL system may be an example of the computerized apparatus or system.

It should also be noted that the operations of the methodology 1900 may be performed in any suitable order, not necessarily the order depicted in FIG. 19. Further, the methodology 1800 may include additional or fewer operations than those depicted in FIG. 19 to obtain the training dataset and train the machine learning model.

At step 1902, the methodology 1900 includes causing operation of a Fourier ptychographic digital refocusing procedure to generate one or more substantially uniformly focused training images of one or more specimens. According to one aspect, the Fourier ptychographic digital refocusing procedure implements an FPM. For example, control instructions may be communicated to the FPM to acquire a plurality of raw images of each specimen and use the raw images to generate a substantially uniformly focused training image from each plurality of raw images. An example of details of a Fourier ptychographic digital refocusing procedure is described with respect to FIG. 7.

At step 1904, the methodology 1900 may include obtaining a training dataset, the training dataset comprising one or more training images generated based on the operation of the Fourier ptychographic digital refocusing procedure at step 1902. In one aspect, each of the one or more training images is a substantially uniformly focused training image (also referred to herein as an all-in-focus image) or that may have a depth of field that provides substantially consistent focus across the image and the images has greater resolution than individual source images acquired by the FPM. Depending on the application, there may be more or fewer training images used in the training datasets (e.g., 100, 1,000, or 10,000), and in some cases, a portion (e.g., 20%) of these training images may be used as part of a validation set for the machine learning model.

According to some implementations, such a training dataset may be stored on a non-transitory computer-readable storage medium. The training dataset may then be used by a computerized apparatus or system (e.g., a CRADL system)

to train a deep learning or machine learning model. Example training steps are described below and elsewhere herein, e.g., with respect to FIGS. 13 and 17.

At step 1906, the methodology 1900 may optionally include training a machine learning model using the obtained training dataset. In some implementations, the training of the machine learning model may be an example of at least a portion of the methodology 1700 of FIG. 17. In some implementations, this training of the machine learning model may include steps 1908 and 1910.

At step 1908, the methodology 1900 may include generating, via one or more first sets of layers, one or more convolutional representations of the one or more training images. In some implementations, the one or more first sets of layers may include one or more sets of encoding layers, each set of encoding layers comprising one or more of: a convolution layer, a normalization layer, an activation layer, or a pooling layer. The foregoing layers may be examples of the encoder layers 1302-1308 described with respect to FIG. 13.

At step 1910, the methodology 1900 may include generating, via one or more second sets of layers, a segmented image based on the one or more convolutional representations of the one or more training images. In some implementations, the one or more second sets of layers may include one or more sets of decoding layers, each set of decoding layers corresponding to one of the one or more sets of encoding layers, each set of decoding layers comprising one or more of: an upsampling layer, a deconvolution layer, the normalization layer, the activation layer, or an output layer, the output layer configured to output the segmented image, the segmented image having dimensions equal to those of the training image. In some implementations, the output layer may include a softmax layer, such as the softmax layer 1322. The foregoing layers may be examples of the decoder layers 1312, 1314, 1304 and 1306 (if implemented in the decoder portion), and 1322 (if implemented in the final set of decoder layers) described with respect to FIG. 13.

In some implementations, the methodology 1900 may further include determining a performance metric associated with the segmented image with respect to a ground truth image. In some implementations, the performance metric may include an F1 score. In some implementations, the ground truth image may include an indication of known locations of one or more cells of interest, e.g., annotated by a pathologist.

In some implementations, the methodology 1900 may further include updating one or more training parameters based on the performance metric. In some implementations, the one or more training parameters may include one or more weights associated with the model, e.g., one or more values of a kernel matrix, the size of the stride (step) taken across the input image during convolutions, and/or the size of filter window used for convolutions and/or deconvolutions.

In some implementations, a trained model may be stored on a non-transitory computer-readable storage medium. The trained model may then be used by a computerized apparatus or system (e.g., a CRADL system) to obtain a segmented image (e.g., 1506) and/or obtain a diagnostic indicator based thereon (e.g., 1516).

In some cases, the trained model may be used by an apparatus or system other than a CRADL system. For example, standard microscopy or refocused images may be input into the trained model to acquire segmented images and/or diagnostic indicators that are more accurate than they otherwise would be.

In some cases, the trained model may be fine-tuned using transfer learning approaches described above so as to use the model for other body parts. For instance, a model trained using pathology images containing lung cancer cells (e.g., NSCLC cells) may be re-trained with a training dataset that is smaller than the training dataset used to train to identify and/or enumerate lung cancer cells because weights from the first body part may be "transferred."

In certain implementations, a CRADL system and method may identify spatial relationships in a specimen of normal and/or abnormal tissue to, e.g., that may define structure and function. Some examples of spatial relationships that can be identified include (a) a relationship of neuronal projections with other structures; (b) a relationship of immune cells of specific phenotypes with cancer cells; and/or (c) the relationship of cells of the tumor microenvironment (TME) with cancer cells. In some cases, a CRADL system and method may generate a diagnostic indicator based on spatial relationships. In some cases, the spatial relationships are associated with structure and function in the specimen.

In certain implementations, a CRADL system and method may identify and/or enumerate abnormalities and or structures in a specimen being analyzed to generate a diagnostic indicator. In some cases, the diagnostic indicator is based on abnormalities and/or spatial relationships identified and/or enumerated.

In certain implementations, a CRADL method may be used to generate one or more all-in-focus images (training and/or analysis) of a cytology specimen. For example, a Fourier ptychographic digital refocusing procedure may be used to obtain an all-in-focus analysis image and/or one or more all-in-focus training images. A representative image of the all-in-focus analysis image may be determined based on the machine learning model and one or more points of interest may be automatedly identified in the cytology specimen based on the representative image. The machine learning is trained by at least one or more all-in-focus training images generated by the Fourier ptychographic digital refocusing procedure and at least one training segmented image indicative of positions of points of interest in the one or more all-in-focus training images. In some cases, the points of interest include one or more abnormalities and/or one more spatial relationships. In one implementation, the CRADL method may generate a diagnostic indicator based on the one or more abnormalities and/or spatial relationships identified.

V. Additional Deep Learning Applications

Although many examples are described herein with respect to utilizing a deep learning or machine learning model to analyze an image of a tissue specimen to identify and quantify abnormalities such as viable tumor cells, it would be understood that other specimens can be used according to other implementations. For example, in one implementation, a specimen may be another type of translucent specimen such as a glass or polymer sheet. As another example, a specimen may be a semiconductor wafer, chip, and/or electronic circuit board. In these examples, a deep learning or machine learning model may be trained on datasets with indicators for feature recognition such as, for example, in identifying defects or damage as part of automated inspection.

According to certain aspects, a deep learning or machine learning model can be used to analyze a raw image of a complex specimen (i.e. a specimen with a non-uniform thickness) acquired at high power.

According to certain aspects, a deep learning or machine learning model may be used to analyze an image for automated feature recognition in order to identify and quantify abnormalities. Examples of types of abnormalities include viable tumor cells and collections of certain types of cells. Another example of a type of abnormality is a defect and damage. As another example, the spatial relationships in complex specimens can be analyzed. Some examples of these relationships include (a) the relationship of neuronal projections with other structures; (b) the relationship of immune cells of specific phenotypes with cancer cells; and/or (c) the relationship of cells of the tumor microenvironment (TME) with cancer cells. These types of relationships do not typically exist on a single focal plane. In certain aspects, CRADL methods and systems may enable the analysis of these relationships. According to certain aspects, CRADL methods and systems may be advantageous in generating all-in-focus images of thick specimens such as thick tissue sections, with application to deep learning/AI models to help in understanding complex spatial relationships and their potential meaning and uses.

Modifications, additions, or omissions may be made to any of the above-described implementations without departing from the scope of the disclosure. Any of the implementations described above may include more, fewer, or other features without departing from the scope of the disclosure. Additionally, the steps of described features may be performed in any suitable order without departing from the scope of the disclosure. Also, one or more features from any implementation may be combined with one or more features of any other implementation without departing from the scope of the disclosure. The components of any implementation may be integrated or separated according to particular needs without departing from the scope of the disclosure.

It should be understood that certain aspects described above can be implemented in the form of logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code using any suitable computer language and/or computational software such as, for example, Java, C, C#, C++ or Python, LabVIEW, Mathematica, or other suitable language/computational software, including low level code, including code written for field programmable gate arrays, for example in VHDL. The code may include software libraries for functions like data acquisition and control, motion control, image acquisition and display, etc. Some or all of the code may also run on a personal computer, single board computer, embedded controller, microcontroller, digital signal processor, field programmable gate array and/or any combination thereof or any similar computation device and/or logic device(s). The software code may be stored as a series of instructions, or commands on a CRM such as a random access memory (RAM), a read only memory (ROM), a magnetic medium such as a hard-drive or a floppy disk, or an optical medium such as a CD-ROM, or solid stage storage such as a solid state hard drive or removable flash memory device or any suitable storage device. Any such CRM may reside on or within a single computational apparatus, and may be present on or within different computational apparatuses within a system or network. Although the foregoing disclosed implementations have been described in some detail to facilitate understanding, the described implementations are to be considered illustrative and not limiting. It will be apparent to one of ordinary skill in the art that certain changes and modifications can be practiced within the scope of the appended claims.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g. "such as") provided with respect to certain implementations herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or implementations of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

What is claimed is:

1. A method of computational refocusing-assisted deep learning, the method comprising:
    (a) generating a segmented image of an analysis image of a specimen using a machine learning model trained by a first training dataset comprising one or more substantially uniformly focused images generated using a Fourier ptychography digital refocusing procedure, the one or more substantially uniformly focused images of the first training dataset annotated to demarcate one or more boundaries of known portions of interest; and
    (b) automatedly identifying one or more portions of interest in the analysis image based on demarcated one or more boundaries of the one or more portions of interest on the segmented image.

2. The method of claim 1, wherein the analysis image is also generated using the Fourier ptychographic digital refocusing procedure.

3. The method of claim 1, wherein the analysis image is of a pathology slide, and the one or more portions of interest identified in (b) comprise tumor cells.

4. The method of claim 3, further comprising (I) determining a percentage area coverage of the tumor cells in the pathology slide based on the tumor cells identified in (b), and (II) automatically generating a diagnostic indicator based on the percentage area coverage determined.

5. The method of claim 1, wherein:
    the one or more substantially uniformly focused images of the first training dataset are used to train an encoder-decoder network and are of a first pathology slide taken from a first portion of a body;

the analysis image is of a second pathology slide taken from a second portion of the body; and the method further comprises training the encoder-decoder network by applying one or more weights associated with a first training dataset to a second training dataset corresponding to the second pathology slide taken from the second portion of the body.

6. A method for analyzing a cytology specimen, the method comprising:

obtaining an all-in-focus analysis image of the cytology specimen using a Fourier ptychographic digital refocusing procedure;

generating a segmented image of the all-in-focus analysis image based on a machine learning model; and automatically identifying one or more points of interest in the cytology specimen based on one or more demarcation lines on the segmented image, the one or more demarcation lines corresponding to the one or more points of interest;

wherein the machine learning model is trained by at least:
one or more all-in-focus training images generated by the Fourier ptychographic digital refocusing procedure; and
at least one training segmented image indicative of positions of points of interest in the one or more all-in-focus training images.

7. The method of claim 6, wherein the points of interest include one or more abnormalities and/or one or more spatial relationships.

8. The method of claim 7, further comprising generating a diagnostic indicator based on the abnormalities and/or the spatial relationships identified.

9. The method of claim 1, wherein the demarcated one or more boundaries comprise a visual indication on the segmented image determined based on a probability of a pixel associated with the visual indication exceeding a threshold compared to another pixel, the probability of the pixel produced by the machine learning model.

10. The method of claim 1, wherein the segmented image comprises one or more demarcated groups of pixels each classified as respective one or more categories of cells.

11. The method of claim 10, wherein the one or more categories of cells comprise benign cells, tumor cells, or a combination thereof.

12. The method of claim 1, wherein the one or more substantially uniformly focused images of the first training dataset are annotated at least in part by one or more boundary classification algorithms.

13. A method for identifying points of interest in a specimen, the method comprising:

obtaining an analysis image of the specimen;

generating a segmented image of the analysis image obtained based on a machine learning model; and automatically identifying one or more points of interest in the specimen based on one or more demarcation boundaries of the one or more points of interest on the segmented image;

wherein the machine learning model comprises an encoder-decoder network trained by at least:
receiving at least one substantially uniformly focused training image determined based on digitally refocused images at different lateral positions; and
generating at least one training segmented image indicative of positions of points of interest in the at least one substantially uniformly focused training image.

14. The method of claim 13, wherein the points of interest include one or more abnormalities and/or one or more spatial relationships.

15. The method of claim 14, further comprising generating a diagnostic indicator based on abnormalities and/or spatial relationships identified.

16. The method of claim 15, wherein the spatial relationships are associated with structure and function.

17. The method of claim 13, wherein the at least one substantially uniformly focused training image is determined using a Fourier ptychographic digital refocusing procedure.

18. The method of claim 17, wherein the analysis image of the specimen is determined based on digitally refocused images at different lateral positions generated using the Fourier ptychographic digital refocusing procedure.

19. The method of claim 13, wherein generating the at least one training segmented image comprises:

generating, via an encoder portion of the encoder-decoder network, one or more convolutional representations of the at least one substantially uniformly focused training image; and generating, via a decoder portion of the encoder-decoder network, the at least one training segmented image based on the one or more convolutional representations of the at least one substantially uniformly focused training image.

20. The method of claim 19, wherein the encoder-decoder network has further been trained by:

determining a performance metric associated with the at least one training segmented image with respect to a ground truth image; and updating one or more training parameters based on the performance metric.

21. The method of claim 20, wherein the performance metric comprises a score determined based on (i) pixels of segmented boundaries of the at least one training segmented image and (ii) pixels of segmented boundaries of the ground truth image.

22. The method of claim 13, wherein:

the points of interest comprise abnormalities; and the method further comprises
automatedly enumerating the abnormalities; and
determining a coverage amount of the abnormalities in the specimen using the enumerated abnormalities based on a percentage area coverage metric.

23. The method of claim 13, wherein the machine learning model has been further trained by implementing a Generative Adversarial Network (GAN), the GAN including a discriminator configured to generate and transfer one or more weights to the machine learning model.

24. The method of claim 13, wherein:

the at least one substantially uniformly focused training image comprises a pathology image from a first portion of a body;

the analysis image of the specimen obtained comprises a pathology image from a second portion of the body; and the method further comprises training the encoder-decoder network by applying one or more weights associated with a first training dataset corresponding to the pathology image from the first portion of the body to a second training dataset corresponding to the pathology image from the second portion of the body.

25. A method of training a machine learning model for identifying abnormalities in a specimen, the method comprising:

using a Fourier ptychographic digital refocusing procedure to determine at least one substantially uniformly focused training image;

generating, using an encoder-decoder convolutional network, at least one training segmented image indicative of positions of abnormalities in the at least one substantially uniformly focused training image; and generating a trained machine learning model based at least on the at least one training segmented image, the trained machine learning model configured to, during inference:

receive an analysis image of the specimen generated using the Fourier ptychographic digital refocusing procedure;

generate a segmented image comprising one or more image segments corresponding to one or more categories of tissue; and automatedly identify one or more abnormalities in the received analysis image based at least on a probability of one or more pixels in the segmented image exceeding a threshold.

26. The method of claim 25, wherein digitally refocused images at different lateral positions are used to determine the at least one substantially uniformly focused training image.

27. The method of claim 25, further comprising:

generating, via an encoder portion of the encoder-decoder convolutional network, one or more convolutional representations of the at least one substantially uniformly focused training image; and generating, via a decoder portion of the encoder-decoder convolutional network, the at least one training segmented image based on the one or more convolutional representations of the at least one substantially uniformly focused training image.

28. The method of claim 25, further comprising:

determining a performance metric associated with the at least one training segmented image with respect to a ground truth image; and updating one or more training parameters based on the performance metric.

29. An apparatus for identifying abnormalities in a specimen, the apparatus comprising:

a machine learning model;

one or more processor apparatus configured to operate the machine learning model; and a non-transitory computer-readable apparatus coupled to the one or more processor apparatus and comprising a storage medium, the storage medium comprising a plurality of instructions configured to, when executed by the one or more processor apparatus, cause the apparatus to:

obtain an analysis image of the specimen;

generate a segmented image of the analysis image obtained of the specimen using the machine learning model, the machine learning model trained by (i) generation of one or more convolutional representations of at least one substantially uniformly focused image obtained using a Fourier ptychography digital refocusing procedure, and (ii) generation of at least one training segmented image based on the one or more convolutional representations of the at least one substantially uniformly focused training image; and based on one or more demarcated boundaries, in the segmented image, of one or more image segments determined to correspond to one or more abnormalities, automatedly identify one or more abnormalities in the specimen.

30. The apparatus of claim 29, wherein the machine learning model has further been trained by (i) determination of a performance metric based at least on an intersection of the at least one training segmented image with respect to a ground truth image.

31. The apparatus of claim 29, wherein the analysis image of the specimen comprises a pathology image acquired using a refocusing procedure other than the Fourier ptychographic digital refocusing procedure, or a pathology image acquired based on a microscopy procedure.

* * * * *